United States Patent
Arai et al.

[19]

[11] Patent Number: 5,966,362
[45] Date of Patent: Oct. 12, 1999

[54] OPTICAL SYSTEM FOR RECORDING AND REPRODUCING FOR USE IN OPTICAL INFORMATION RECORDING MEDIUM

[75] Inventors: Norikazu Arai; Masaya Kobayashi; Hiroyuki Yamazaki, all of Hachioji; Hiroshi Kibayashi, Hino, all of Japan

[73] Assignee: Konica Corporation, Tokyo, Japan

[21] Appl. No.: 08/734,502

[22] Filed: Oct. 21, 1996

[30] Foreign Application Priority Data

Nov. 2, 1995 [JP] Japan .................................. 7-308565
Nov. 28, 1995 [JP] Japan .................................. 7-309189
Dec. 28, 1995 [JP] Japan .................................. 7-352208

[51] Int. Cl.$^6$ ...................................................... G11B 7/00
[52] U.S. Cl. ............................................................ 369/112
[58] Field of Search ........................... 369/112, 44.23, 369/44.24, 110, 118; 359/719

[56] References Cited

U.S. PATENT DOCUMENTS

| | | | |
|---|---|---|---|
| Re. 34,455 | 11/1993 | Arai et al. .............................. | 359/719 |
| 4,577,941 | 3/1986 | Kubota .................................. | 369/112 |
| 4,765,723 | 8/1988 | Takamura ............................. | 350/432 |
| 4,789,978 | 12/1988 | Shikama et al. ..................... | 369/112 |
| 5,311,494 | 5/1994 | Sugita et al. ....................... | 369/44.23 |
| 5,467,335 | 11/1995 | Braat ..................................... | 369/100 |
| 5,475,537 | 12/1995 | Kobayashi et al. .................. | 359/794 |
| 5,602,383 | 2/1997 | Takekoshi et al. ................. | 369/44.12 |
| 5,608,715 | 3/1997 | Yokogawa et al. ................. | 369/275.1 |
| 5,612,942 | 3/1997 | Takahashi ............................. | 369/112 |
| 5,621,714 | 4/1997 | Kobayachi et al. ................. | 369/44.23 |
| 5,657,171 | 8/1997 | Maruyama et al. .................. | 369/112 |
| 5,691,971 | 11/1997 | Kim ...................................... | 369/112 |
| 5,699,341 | 12/1997 | Sugi et al. ........................... | 369/117 |
| 5,703,862 | 12/1997 | Lee et al. ............................. | 369/44.23 |
| 5,724,335 | 3/1998 | Kobayashi ........................... | 369/112 |
| 5,726,436 | 3/1998 | Oka et al. ........................... | 369/44.23 |
| 5,754,504 | 5/1998 | Yamazaki et al. .................. | 369/112 |

FOREIGN PATENT DOCUMENTS

| | | |
|---|---|---|
| 0 146 178 | 6/1985 | European Pat. Off. . |
| 0 610 055 | 8/1994 | European Pat. Off. . |
| 57-76512 | 5/1982 | Japan . |
| 61-56314 | 3/1986 | Japan . |
| 6-258573 | 9/1994 | Japan . |
| 8-203094 | 8/1996 | Japan . |

OTHER PUBLICATIONS

Patent Abstracts of Japan, Kokai No. 63–234418, vol. 13, No. 037, Jan. 27, 1989.
Patent Abstracts of Japan, Kokai No. 62–59804, vol. 18, No. 665, Dec. 15, 1994.

*Primary Examiner*—Nabil Hindi
*Attorney, Agent, or Firm*—Finnegan, Henderson, Farabow, Garrett & Dunner, L.L.P.

[57] ABSTRACT

An optical system for recording or reproducing of information to or from an optical information recording medium, includes: a light source; a coupling lens for converting a diverging light emergent from the light source to a converging light; and an objective lens for further converging the converted converging light and for focusing on an information recording surface of the optical information recording medium. A lateral magnification of the objective lens in which a wavefront aberration within a Marechal criterion is minimum, satisfies the following conditional expression, $$0 < M < 1$$

where M represents the lateral magnification of the objective lens.

11 Claims, 64 Drawing Sheets

16
17

SPHERICAL ABERRATION

OFFENSE AGAINST SINE CONDITION

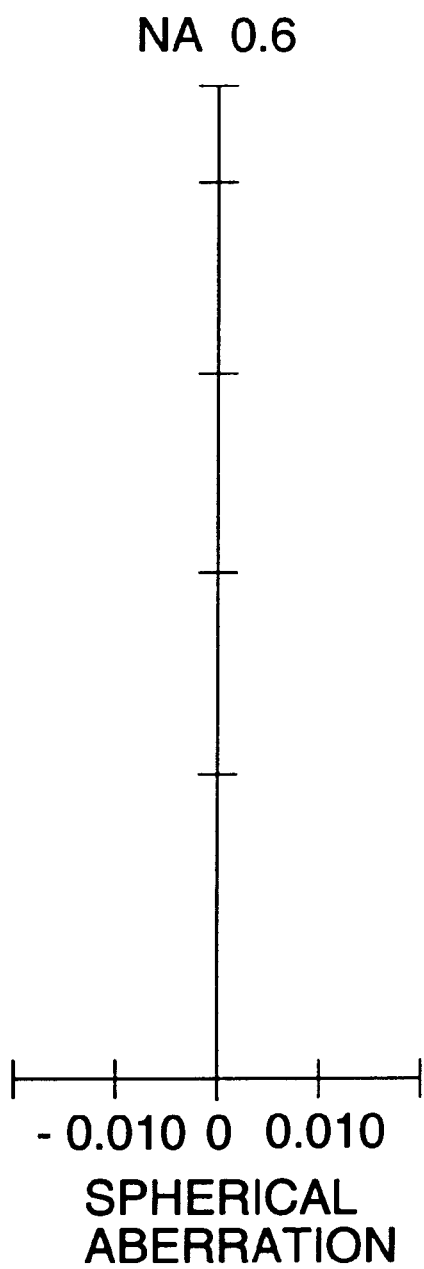
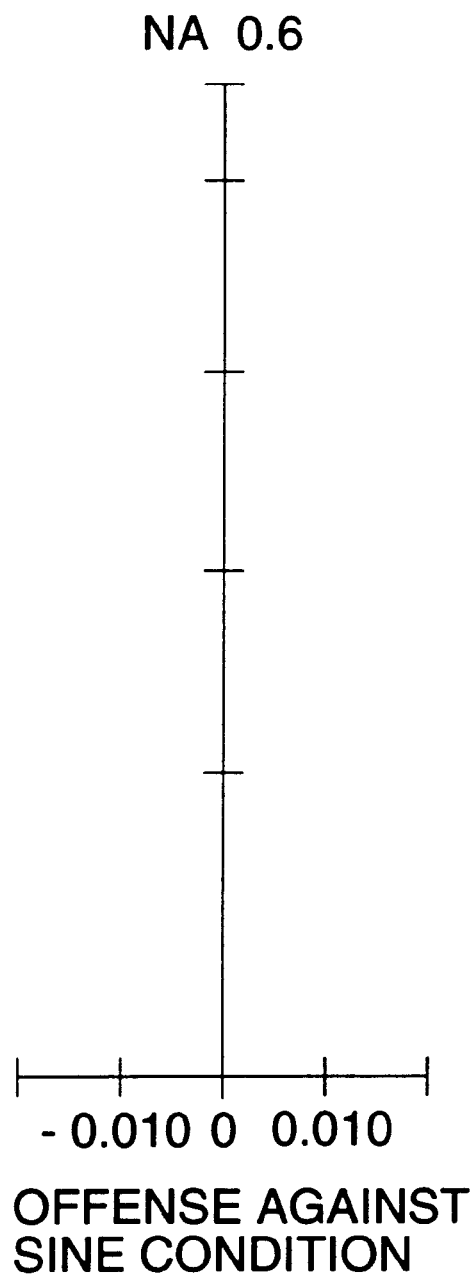

SPHERICAL
ABERRATION

OFFENSE AGAINST
SINE CONDITION

16

17

NA 0.70

- 0.010  0  0.010
SPHERICAL
ABERRATION

NA 0.70

- 0.010  0  0.010
OFFENSE AGAINST
SINE CONDITION

SPHERICAL
ABERRATION

OFFENSE AGAINST
SINE CONDITION

SPHERICAL ABERRATION

OFFENSE AGAINST SINE CONDITION

NA 0.1

-0.010 0 0.010
SPHERICAL
ABERRATION

NA 0.1

-0.010 0 0.010
OFFENSE AGAINST
SINE CONDITION

SPHERICAL
ABERRATION

OFFENSE AGAINST
SINE CONDITION

NA 0.1

-0.010 0 0.010
SPHERICAL
ABERRATION

NA 0.1

-0.010 0 0.010
OFFENSE AGAINST
SINE CONDITION

SPHERICAL
ABERRATION

OFFENSE AGAINST
SINE CONDITION

SPHERICAL
ABERRATION

OFFENSE AGAINST
SINE CONDITION

SPHERICAL ABERRATION

OFFENSE AGAINST SINE CONDITION

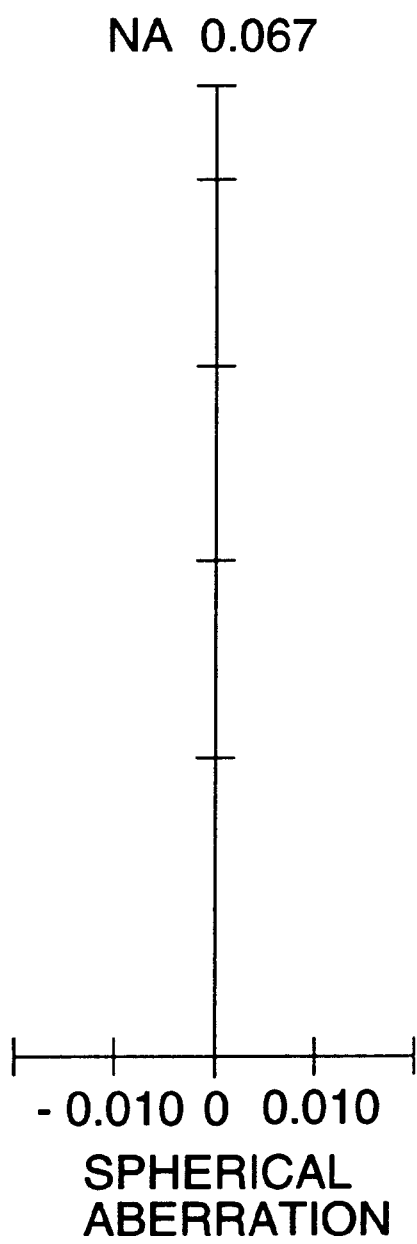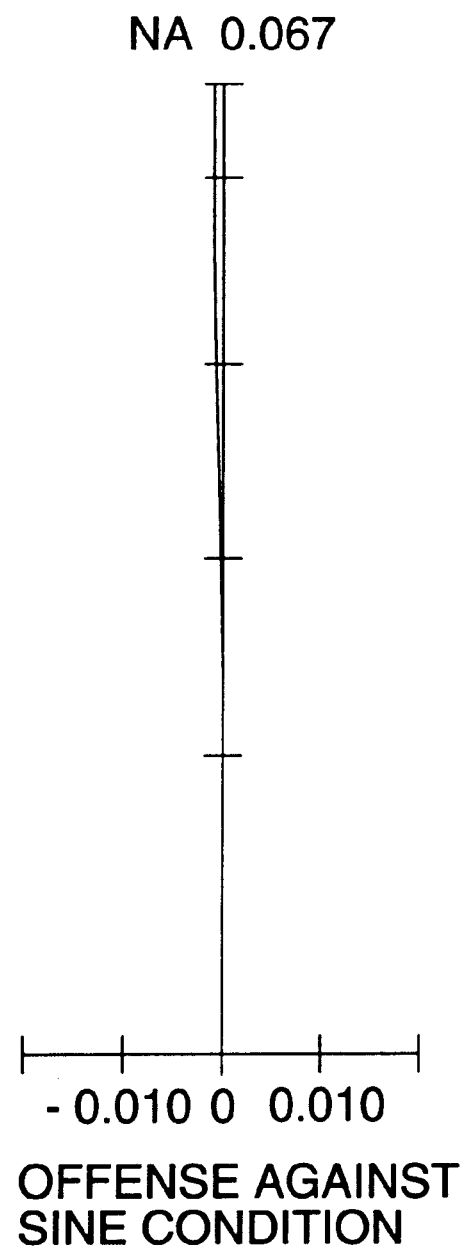

SPHERICAL ABERRATION

OFFENSE AGAINST SINE CONDITION

SPHERICAL
ABERRATION

OFFENSE AGAINST
SINE CONDITION

NA 0.6

-0.010  0  0.010

SPHERICAL ABERRATION

NA 0.6

-0.010  0  0.010

OFFENSE AGAINST SINE CONDITION

OPTICAL SYSTEM FOR RECORDING AND REPRODUCING FOR USE IN OPTICAL INFORMATION RECORDING MEDIUM

BACKGROUND OF THE INVENTION

The present invention relates to an optical system wherein a light beam emitted from a light source is converged on an optical information recording medium and thereby optical information is recorded and reproduced, and particularly, to an optical system wherein a change in temperature has less influence.

As a conventional optical system for recording and reproducing for an optical information recording medium which is required to have accuracy at the level for coping with CD (an optical system for recording and reproducing in the invention includes an optical system for recording, that for reproducing and that for both recording and reproducing), an optical system of an infinite conjugation type is disclosed in Japanese Patent Publication Open to Public Inspection No. 76512/1982 (hereinafter referred to as Japanese Patent O.P.I. Publication), and an optical system of a finite conjugation type is disclosed in Japanese Patent O.P.I. Publication No. 56314/1986. Further, Japanese Patent O.P.I. Publication No. 258573/1994 discloses an optical system wherein a coupling lens is used for preventing the occurrence of aberration caused by temperature change in the case of a lens made of resin used.

Recently, however, high density recording on an information recording medium such as an optical disk is further advancing, and this causes a numerical aperture (NA) value in an optical system or of an objective lens to be higher. In addition to this, requirements for performance aspects such as wavefront aberration (spherical aberration) are becoming more severe.

An optical system wherein diverged light emitted from a light source is focused on a recording surface of an optical information medium by an objective lens of a finite conjugation type whose spherical aberration and sine condition are corrected, is well-known. In this case, however, following problems are caused when numerical aperture NA takes a greater value because a refracting power of each surface is greater.

(1) There is a limitation for higher NA.

(2) An amount of spherical aberration generated when an objective lens is moved in the direction of an optical axis for focusing is large.

(3) Occurrence of spherical aberration caused by a change in refractive index of an objective lens is great.

When coping with such higher NA and higher accuracy, wavefront aberration caused by a change in distance between an object and an image resulted from unintentional movement of a disk, or by a change in refractive index resulted from ambient change such as temperature change in the case of a lens made of resin becomes great. Further, requirements in performance which are becoming more severe cause tolerance for an objective lens to be more severe than in the past, and in certain circumstances, there is a possibility that no error is allowed.

When an objective lens is made of resin, in particular, though the required level of conventional accuracy for coping with CD has been satisfied by a method employing a coupling lens disclosed by Japanese Patent O.P.I. Publication No. 258573/1994 in the case of a finite conjugation type, the performance required for coping with the recent high density recording can not be satisfied.

In the case of an infinite conjugation type, a change in wavefront aberration caused by a change of a distance between an object and an image does not exist. However, when numerical aperture NA is enhanced to a level of about NA 0.60, a tolerance for the change in wavefront aberration caused by its temperature change is made to be severe at the capacity required for coping with high density recording.

As an example, when a lens made of resin having focal length F of 3.36 mm and NA of 0.6 is a lens of an infinite conjugation type (parallel light coming from the light source side), a wavefront aberration changes by about 0.043 $\lambda$ ($\lambda$=635 nm) for the temperature change of 30° C. Even such small change actually causes a considerable restriction in the required accuracy for coping with DVD announced recently.

The invention further relates to an optical system for reproducing of an optical information medium, a pickup device for an optical information medium, an objective lens for optical information recording and reproducing used for the optical information pickup device and for the optical system for recording and reproducing of an optical information medium, and to a converging lens for an optical system for recording and reproducing optical information.

FIG. 63 shows an example of a pickup device for optical information composed of a conventional optical system for recording and reproducing for an optical information medium. In the drawing, a light flux emitted from light source 1 such as a semi-conductor laser or the like enters collimator lens 3 through beam splitter 2 to be converted to a parallel light flux which is stopped down by aperture stop 5 to a prescribed light flux, and it enters objective lens 6. This objective lens 6 forms, when parallel light flux enters it, an image of a light spot which hardly has an aberration on information recording surface 8 through transparent substrate 7 having a prescribed thickness.

A light flux modulated by information pit and reflected on information recording surface 8 passes through objective lens 6 and collimator lens 3 to return to beam splitter 2 where the light flux is separated from a path of light emitted from laser light source 1 and enters light detector 9. The light detector 9 is a multi-split PIN photodiode which outputs from its element an electric current that is proportional to the intensity of an incident light flux and sends the electric current to an unillustrated detecting circuit. In the detecting circuit, the light detector controls objective lens 6 with a 2-dimensional actuator composed of a magnetic circuit and a coil based on focus error signals and track error signals, and thereby makes a position of a light spot to be on an information track constantly.

In the pickup device of optical information medium as in the foregoing, large NA (for example, NA 0.6) is used for making a light spot converged by an objective lens small. Therefore, when a thickness of a transparent substrate placed in such a converged light flux is deviated from a prescribed thickness, a serious spherical aberration is caused.

For example, when a substrate thickness is changed for an objective lens optimized under the conditions of NA 0.6, wavelength of 635 nm for a laser beam emitted from a laser light source, a substrate thickness of 0.6 mm and of substrate refractive index of 1.58, an aberration increases by about 0.01 $\lambda$ rms for a deviation of 0.01 mm in the substrate thickness as shown in FIG. 64. Therefore, when a thickness of a transparent thickness is deviated by ±0.07 mm, it causes an aberration of 0.07 $\lambda$ rms which means that the aberration reaches Marechal criterion (0.07 $\lambda$ rms) that is a standard with which reading can be conducted normally.

In an example shown in FIG. 63, therefore, when a thickness of transparent substrate 7 is changed from 0.6 mm to 1.2 mm, objective lens 6 suitable for 0.6 mm thickness is changed to objective lens 111 suitable for 1.2 mm thickness and aperture stop 10 is changed, for reproduction.

Further, as another method to cope with a change from 0.6 mm to 1.2 mm in terms of a substrate thickness, it is also considered to provide two pickup devices one of which is for a 0.6 mm- thick substrate and the other is for a 1.2 mm-thick substrate.

SUMMARY OF THE INVENTION

The first object of the invention is to obtain an optical system wherein even when an objective lens made of resin is used under enhanced NAs, a change of wavefront aberration caused by a temperature change is restricted to a level at which a tolerance of a lens can be ensured.

In addition, it is predicted that standards for higher density recording may be established in the future, and shorter wavelength such as 450 m to be used and higher NA of a lens up to NA 0.75 may be required. In the case of an objective lens having NA of not less than 0.65, even a glass lens of an infinite conjugation type makes it difficult to maintain it performance unless a thickness on a lens axis is made to be great. The object of the invention is to obtain an optical system which can cope with such requirement.

The second object of the invention is to obtain a simply-structured and compact optical system for recording and reproducing an optical information medium wherein aforesaid drawbacks are overcome, a single pickup device makes recording and/or reproducing optical disk having different substrate thicknesses possible, mutual interchangeability is assured, and a change in wavefront aberration caused by a temperature change is restricted to a level at which a tolerance of a lens can be ensured even when an objective lens made of resin is used under enhanced NAs, a pickup device for optical information medium, an objective lens for recording and reproducing optical information used for the optical system for recording and reproducing an optical information medium and the pickup device for optical information medium and a converging lens for the optical system for recording and reproducing an optical information.

Structure of an optical system for recording and reproducing an optical information medium attaining the first object of the invention is represented by an optical system which is provided with at least a light source, a coupling means and an objective lens and conducts information recording on an optical information recording medium and/or information reproducing, wherein aforesaid coupling means converts diverged light emitted from the light source to converged light, and aforesaid objective lens converging further the converged light so that it forms an image on an optical information medium is characterized in that wavefront aberration is made to be minimum and yet to be within Marechal criterion with incident converged light, and lateral magnification M corresponding to wavefront aberration that is minimum and is within Marechal criterion is within the following range;

$$0.05 \leq M \tag{1}$$

wherein M is a lateral magnification of an objective lens.

Aforesaid objective lens is movable at least in its axial direction, and under the assumption that $D_{co}$ represents a distance between a surface of the coupling means facing an image and a surface of the objective lens facing a light source and F represents a focal length of the objective lens, $$0.1 \leq D_{co}/F \leq 5.0 \tag{2}$$

is an range of $D_{co}/F$, and $$1.0 \leq D_{co}/F \leq 5.0 \tag{3}$$

is preferable, and $$1.0 \leq D_{co}/F \leq 3.0 \tag{4}$$

is more preferable to be satisfied.

Aforesaid objective lens is characterized to satisfy the following conditions;

$$0.05 \leq M \leq 0.23 \tag{5}$$

$$NA \cdot (1-M) \leq 0.65 \tag{6}$$

$$0.48 \leq NA \tag{7}$$

wherein, NA represents a numerical aperture on the image side of an optical system.

However, $$0.05 \leq M \leq 0.125 \tag{8}$$

is generally preferable, but in the case of $$0.65 \leq NA \leq 0.8 \tag{9}$$

the preferable is $$0.125 \leq M \leq 0.23 \tag{10}$$

These objective lenses are preferably made of resin, but they may also be made of glass.

Further, from the viewpoint of compactness, it is preferable that an objective lens satisfies the following condition.

$$(1-M) \cdot F \leq 6.0 \text{ mm} \tag{11}$$

It is preferable that the coupling means is a coupling lens which is a refracting optical system. To be concrete, it can be composed of one or plural spherical lenses. In some cases, it is preferable that at least one surface is aspherical.

When aforesaid objective lens is made of resin, it is preferable that at least one of the coupling lenses is a resin-made lens having positive refracting power. It is further preferable that at least one surface thereof is aspheric, and aforesaid coupling lens is a resin-made single lens at least one surface of which is aspheric.

Aforesaid coupling lens is characterized to satisfy the following condition;

$$-0.10 \leq Mt \cdot M \cdot Fcp/F \leq -0.04 \tag{12}$$

wherein,

Mt: Lateral magnification of overall optical system

Fcp: Focal length of resin lens in coupling lens

In the condition mentioned above, when a coupling lens is a resin-made single lens, the relation of Fc=Fcp is naturally satisfied under the assumption that Fc represents a focal length of the coupling lens.

Though aforesaid optical system satisfies the following condition, $$0.06 \leq |Mt| \cdot NA \leq 0.21 \tag{13}$$

an optical system for reproduction preferably satisfies the following condition, $$0.06 \leq |Mt| \cdot NA \leq 0.12 \tag{14}$$

and an optical system for recording preferably satisfies the following condition.

$$0.12 \leq |Mt| \cdot NA \leq 0.21 \tag{15}$$

The objective lens is characterized to be a single lens wherein when a converged light flux enters therein, the wavefront aberration is minimum, and lateral magnification that is within Marechal criterion and numerical aperture NA are respectively within ranges of objective lens of $$0.05 \leq M \tag{1}$$

$$0.3 \leq NA \tag{16}$$

and, at least the surface at the light source side is aspheric, and both surfaces are preferably aspheric.

When aforesaid objective lens is not used, aforesaid converged light flux is converged to one point with a diffraction limit spot.

It is preferable that aforesaid objective lens satisfies all or some of the following conditions;

$$-0.25 \leq F \cdot (n-1)/r_2 \leq 0.7 \tag{17}$$

wherein, n: refractive index of a material forming a lens
$r_2$: radius of curvature at an apex on the image side surface of a lens $$-0.045 \leq x_2 \cdot (n-1)/\{F \cdot (NA)^2\} \leq 0.1 \tag{18}$$

wherein, NA: numerical aperture at image side of objective lens
$x_2$: difference in the optical axis direction between peripheral point of effective diameter of on-axis ray of light on the image side surface of a lens (position on the image side surface where peripheral ray of light of aforesaid NA enters) and an apex on the surface, and the direction of deviation toward the image side for farther distance from the optical axis is assumed to be positive, and $$-0.005 \leq \Delta_2 \cdot (n-1)^3/\{F \cdot (NA)^4\} \leq 0.018 \tag{19}$$

wherein, $\Delta_2$: difference in the optical axis direction between an aspheric surface on peripheral point of effective diameter of on-axis ray of light on the image side surface of a lens (position on the image side surface where peripheral ray of light of aforesaid NA enters) and a standard spherical surface having radius of curvature $r_2$ at an apex on that surface.

Further, an objective lens for recording and reproducing of optical information recording medium of the invention satisfies the following conditions, $$(1-M) \cdot F \leq 6.0 \text{ mm} \tag{11}$$

$$0.05 \leq M \leq 0.23 \tag{5}$$

$$NA \cdot (1-M) \leq 0.65 \tag{6}$$

$$0.48 \leq NA \tag{7}$$

and when it is made of resin, it is preferable that the following conditions are satisfied, $$0.05 \leq M \leq 0.125 \tag{8}$$

$$NA \cdot (1-M) \leq 0.65 \tag{6}$$

and, in the case of $$0.65 \leq NA \leq 0.8 \tag{9}$$

it is preferable that the following condition is satisfied.

$$0.125 \leq M \leq 0.23 \tag{10}$$

These objective lenses are preferably made of resin, and they may also be made of glass.

The coupling lens for recording and reproducing of the invention is characterized in that it is a coupling lens arranged between an objective lens wherein when a converged light flux enters therein, the wavefront aberration is minimum, and an image is formed on optical information recording medium within Marechal criterion and a light source, and a diverged light flux emitted from the light source is converted to a converged light flux, and further the following conditions are satisfied;

$$-7.0 \leq Mc \leq -0.5 \tag{20}$$

$$0.06 \leq NAo \leq 0.21 \tag{21}$$

wherein,
Mc: lateral magnification of the image side to the light source side of the coupling lens, and
NAo: numerical aperture at the light source side.

An objective lens to be combined with this coupling lens satisfies the following conditions.

$$0.05 \leq M \tag{1}$$

$$0.3 \leq NA \tag{16}$$

This coupling lens may also be either a lens system composed of one or plural spherical surface systems, or one composed of one lens whose at least one surface or preferably both surfaces are aspheric.

These coupling lenses may be made either of glass or of resin.

When this coupling lens is a single lens, it may be a lens whose both sides are convex or a meniscus lens whose surface at the light source side is convex, or a meniscus lens whose surface at the light source side is concave.

It is possible to reduce refracting power borne by an objective lens by providing, as a coupling means, a means for changing a divergence degree of diverged light emitted from a light source between the light source and the objective lens. In particular, it is possible to optimize refracting power of the objective lens when NA is great, by making the coupling means to have functions for converting diverged light emitted from the light source to a converged light flux.

Numerical aperture of an objective lens, having a lateral magnification of M, of a finite conjugation type converted to parallel light incidence (hereinafter referred to as converted NA) which is symbolized as $NA^\infty$ can be expressed as follows.

$$NA^\infty = (1-M) \cdot NA \qquad (22)$$

When this converted NA takes a large number, it causes difficulty in lens design and maintenance of capability, and it also makes an influence of environmental change such as temperature characteristics to be great. In this case, it is possible to make the converted NA to be small by making M to be positive, namely by employing converged light incidence.

Further, when an objective lens is adjusted so that wavefront aberration is minimum and is within Marechal criterion with converged light incidence wherein lateral magnification M is within a range of condition expression (1), aberration caused by deviation between an optical axis of a coupling means and that of the objective lens is less deteriorated, resulting in preferable constitution as an optical system for recording and reproducing of optical information.

As the coupling means as that mentioned above, there are considered a lens, a mirror, a diffraction element of a transmission type and a diffraction element of a reflection type.

By making an objective lens to be movable at least in the direction of an optical axis, movable parts can be lightened and focusing can be done on a recording surface of an optical information medium with less amount of movement.

When NA is large, occurrence of spherical aberration caused by a change of distance between an object and an image and by a temperature change is increased. However, for overcoming the problem above, when a light source and a coupling means in addition to the objective lens are moved independently in the same manner as in the objective lens, or they are moved integrally with the objective lens, focusing can be done.

In conditional expression (2) about a distance between a coupling means normalized by a focal length of an objective lens and the objective lens, when the distance exceeds the upper limit, a size in the direction perpendicular to an optical axis of the coupling means grows greater, while, when the distance exceeds the lower limit, realization becomes problematic due to mechanical interference even in the case of movable mechanism wherein the coupling means and a coupling element move integrally.

When the distance exceeds the lower limit of the conditional expression (3), there is a possibility that the coupling element interferes mechanically with a movable mechanism around the objective lens when only the objective lens is attached to the movable mechanism. Further, when the distance is kept within the upper limit of conditional expression (4), it is possible to shorten a distance from a light source to an optical information recording medium in the fixed specification such as magnification.

An optical system of the invention can be used advantageously when a spot of diffraction limited performance is formed as an image on a recording surface of an optical information recording medium under the conditions of great NA and short wavelength of light used, and the optical system proves to be optimum when NA is not less than 0.48.

Under the condition mentioned above, it is preferable that lateral magnification M of an objective lens satisfies conditional expression (5). When the magnification exceeds the upper limit, a size in the direction perpendicular to an optical axis of the coupling means grows greater, while, when the magnification exceeds the lower limit, an error in the case of high NA, especially, spherical aberration caused by an error of a refractive index of the objective lens grows greater.

When the upper limit of conditional expression (6) is exceeded, a thickness of the objective lens increases. For ensuring the necessary working distance, therefore, it is necessary to increase the size of an overall optical system.

When the magnification exceeds the upper limit of conditional expression (8), occurrence of spherical aberration in the case of focusing by moving an objective lens in its optical axis increases under the condition of a change in a distance between an object and an image caused by a movement of an optical information medium or the like. When it exceeds the lower limit, an error in the case of high NA, especially, occurrence of spherical aberration caused by an error of a refractive index of the objective lens increases.

In the case of resin material, in particular, a refractive index is changed greatly by a change in temperature. In the case of resin, when the following expression is established under the assumption that $\Delta T$ represents a change in temperature, and $\Delta n$ represents a change in refractive index caused by a change in temperature, $$\Delta n / \Delta T = \alpha \qquad (23)$$

$\alpha$ is mostly constant and its value is negative for the range from 0° C. to almost 60° C. under the condition of the same material.

Wavefront aberration (spherical aberration) change $\Delta WT$ corresponding to refractive index change $\Delta n$ is proportional to the fourth power of converted NA, and it is proportional to focal length F and $\Delta n$, which results in the following expression;

$$\Delta WT = \beta \cdot (NA^\infty)^4 \cdot F \cdot \Delta n \qquad (24)$$

wherein, $\beta$ represents a proportional coefficient.

Results of substituting expressions (22) and (23) for expression (24) are as follows.

$$\Delta WT = \beta \cdot \{NA \cdot (1-M)\}^4 \cdot F \cdot \alpha \cdot \Delta T \qquad (25)$$

It is understood from expression (5) that an influence of a change in temperature grows smaller corresponding to the fourth power of M when M is made to be positive.

By satisfying aforesaid conditional expression (8) and (6), therefore, it is possible to realize a compact optical system for recording and reproducing with an objective lens made of resin which is light in weight and low in cost.

When realizing NA which is unconventionally high as shown in conditional expression (9) as an objective lens for recording and reproducing for an optical information recording medium, it is preferable that conditional expression (10) is satisfied. When NA exceeds the upper limit, a size in the direction perpendicular to an optical axis of the coupling means grows greater, while, when the NA exceeds the lower limit, a thickness of the objective lens increases. For ensuring the necessary working distance, therefore, it is necessary to increase the size of an overall optical system. In addition, by using a lens made of resin under the condition mentioned above, it is possible to achieve lighter weight and lower cost.

When the upper limit of conditional expression (11) is exceeded, a size of an objective lens is increased, which causes an overall optical system to be larger accordingly.

As a coupling means, there may be considered various means, and a reflection type system has a weak point in manufacturing errors, while, a diffraction means has a problem of diffraction efficiency and it requires a light source with large power. Using a coupling lens which is a refraction optical system is preferable as an optical system for recording and reproducing for an optical information recording medium.

When a coupling lens is a spherical lens system with one or more pieces, it is possible to manufacture a coupling means in the same manufacturing method as that for a conventional collimator.

However, a coupling lens has a function to convert diverged light emitted from a light source to converged light. Therefore, its refracting power is greater than that of a conventional collimator, and when it is needed to take in a large amount of light of a light source, NA at the light source side is needed to be larger. Therefore, with a spherical surface system only, the number of lenses to be used can not be small. For this reason, it is preferable that spherical aberration is corrected by taking in at least one aspherical surface.

When an objective lens is made of resin, it is possible to reduce a change in spherical aberration caused by a change in refractive index corresponding to a change in temperature, by means of an optical system of the invention. It is further possible to correct a change in spherical aberration of an overall optical system caused by a change in refractive index corresponding to a change in temperature by making at least one piece of lens constituting a coupling lens and having positive refracting power to be made of resin.

In the foregoing, when a temperature rises by $\Delta T$ ($0<\Delta T$), refractive index change $\Delta nt$ of a coupling lens is negative ($\Delta nt<0$). Therefore, refracting power of the coupling lens is lowered, and convergence degree of a light flux emitted from the coupling lens is smaller than that before temperature rise. Accordingly, lateral magnification M of the objective lens itself is changed toward the reduction thereof ($\Delta M<0$).

When $\Delta M$ is changed toward negative for magnification M which causes wavefront aberration of the objective lens to be minimum, the spherical aberration moves toward the under side. Refractive index change $\Delta n$ of the objective lens itself proves to be $\Delta n<0$ because refractive index is lowered when temperature rises, and at this moment, the spherical aberration moves toward the over side.

Therefore, an influence on spherical aberration caused by a change in lateral magnification of an objective lens corresponding to a change in refractive index of a coupling lens and an influence of a change in refractive index of the objective lens itself offset each other. Therefore, it is further possible to lessen an influence caused by temperature change by using a resin-made lens having positive refracting power as a coupling lens.

Correction effect in the foregoing is greater compared with an occasion wherein at least one piece of collimator lens is a lens made of resin having positive refracting power in the constitution of a conventional collimator and a single objective lens made of resin. The reason for this is that even when NA at the light source side is the same as aforesaid collimator, converted NA of a coupling lens grows greater because the coupling lens has negative magnification, and an absolute value of magnification change $\Delta M$ of the objective lens itself grows greater accordingly.

In this case, it is preferable to use an aspherical surface in a coupling lens as stated above because NA at the light source side is great in the coupling lens and yet the coupling lens has a negative magnification.

When a coupling lens is made to be a single aspherical lens made of resin, a lens which is inexpensive and has necessary functions can be obtained. From the image-forming magnification of the coupling lens, it is preferable that at least one surface at the objective lens side is aspherical.

Further, when the lateral magnification Mc of the coupling lens grows greater, both surfaces are required to be aspheric when spherical aberration needs to be corrected properly. For this purpose, technologies of design and manufacture for a known objective lens of a finite conjugation type can be applied.

When the upper limit of conditional expression (12) is exceeded, a change in magnification of an objective lens by resin coupling lens caused by a change in temperature grows smaller, and an effect of offsetting a change in refractive index of the objective lens grows smaller.

When the lower limit thereof is exceeded, though a change in magnification of an objective lens by resin coupling lens caused by a change in temperature grows smaller, a change in wavefront aberration caused by a refractive index change taking place in the resin coupling lens grows to be impossible to ignore, exceeding the extent of aforesaid merit of reduced change in magnification, offsetting effect is eliminated, and a change in wavefront aberration of an overall optical system based on temperature characteristics grows greater than that in the case where a coupling lens is made of glass, in some cases.

$|Mt| \cdot NA$ in conditional expression (13) corresponds mostly to numerical aperture NAo on the light source side on an optical system. If the lower limit of the conditional expression (13) is exceeded, sufficient light amount can not be obtained. When the upper limit is exceeded, an influence of astigmatism of a laser grows greater, and an influence of uneven light amount also grows greater.

When the upper limit of conditional expression (14) is exceeded, a concave lens is needed in the detecting system for an optical system for reproduction, which leads to cost increase.

In consideration of an optical system for recording, when the lower limit of conditional expression (15) is exceeded, sufficient amount of light can not be obtained.

When causing converged light to enter an objective single lens while satisfying conditional expression (1), it is possible to increase NA without increasing a lens thickness, and an influence of a change in refractive index or the like is made smaller. The reason for this is that $0<M$ (converged light incidence) makes converted NA small as shown in aforesaid expression (22).

When NA is not less than 0.3, it is possible to correct spherical aberration while satisfying the sine condition and to make the wavefront aberration to be within Marechal criterion.

When wavefront aberration of an objective lens is made to be within Marechal criterion with converged light incidence within a range of conditional expression (1) of lateral magnification M of the objective lens, the objective lens can maintain its performance independently. Therefore, combination with a means for converting diverged light emitted from a light source to converged light is easy, and error sensitivity for arrangement including eccentricity is lowered.

Aforesaid objective single lens can easily be combined with a means for converting diverged light emitted from a light source to converged light, by conducting aberration correction for a virtual light source and by keeping its wavefront aberration within Marechal criterion, and thereby it becomes a lens having a wide range of application. Although the virtual light source is an imaginary one, it is practically equivalent to that its incident light flux is converged to one point at the diffraction limited spot.

It is possible to correct spherical aberration and sine condition by making both sides of an objective single lens to be aspherical. Therefore, it is possible to lessen occurrence of aberration even in the case of tracking conducted by moving an objective lens in the direction perpendicular to its optical axis, like an objective lens of an optical system for recording and reproducing for an optical information recording medium, for example.

When the refracting power of an objective single lens at the image side is negative and strong exceeding the upper limit of conditional expression (17), an amount of negative spherical aberration on the surface on the converged light incidence side grows greater and an amount of aspherical surface on the converged light incidence side grows greater, resulting in a lens which is difficult to be manufactured. When the refracting power of an objective single lens at the image side is positive and strong exceeding the lower limit, negative spherical aberration on the surface at the image side becomes great and an amount of aspherical surface on the converged light incidence side becomes great, resulting in a lens which is difficult to be manufactured.

In order to correct spherical aberration and offense against sine condition when the upper limit of conditional expression (18) is exceeded, the surface at the image side needs to be aspherical, and an amount of aspherical surface on each of both sides needs to be great, resulting in a lens which is difficult to be manufactured. In order to correct spherical aberration and offense against sine condition when the lower limit is exceeded, the surface at the image side also needs to be aspherical, and an amount of aspherical surface on each of both sides also needs to be great, resulting in a lens which is difficult to be manufactured.

When the upper limit of conditional expression (19) is exceeded, the sine condition is corrected excessively, and when the lower limit thereof is exceeded, the sine condition is corrected insufficiently.

When using a single objective lens whose aberration is corrected for such converged light flux as an objective lens of an optical system for recording and reproducing for an optical information recording medium, there is needed a coupling means which converts a diverged light flux emitted from a light source into a converged light flux.

In an optical system wherein NA is as large as 0.48 or more and a wavelength of light to be used is short, it is preferable that lateral magnification M of an objective lens satisfies conditional expression (5). When the upper limit is exceeded, a size in the direction perpendicular to an optical axis of an coupling means grows greater, and when the lower limit is exceeded, an amount of spherical aberration caused by an error resulted from high NA, especially by a refractive index error of the objective lens grows larger.

When the upper limit of conditional expression (6) is exceeded, a thickness of an objective lens is increased, and an overall optical system is required to be larger when ensuring a necessary working distance, accordingly.

Further, when the upper limit of conditional expression (11) is exceeded, an objective lens needs to be larger, which makes an overall optical system to be larger.

When focusing by moving an objective lens in its optical axis direction, it is preferable that lateral magnification M of the objective lens itself satisfies conditional expression (8). When the upper limit is exceeded, an amount of spherical aberration generated when focusing by moving the objective lens in its optical axis direction grows larger. When the lower limit is exceeded, an amount of spherical aberration caused by an error resulted from high NA, especially by a refracting power error of the objective lens grows larger.

In the case of a resin material, a change of refractive index caused by temperature is great. Therefore, when conditional expressions (8) and (6) are satisfied, it is possible to obtain a light and inexpensive objective lens which is needed for a compact optical system for recording and reproducing for an optical information recording medium. When the upper limit of conditional expression (6) is exceeded, a thickness of an objective lens is increased, and an overall optical system is required to be larger accordingly when ensuring a necessary working distance.

When realizing high NA which satisfies conditional expression (16) and has never been experienced in the past as an objective lens for recording and reproducing for an optical information recording medium, it is preferable that conditional expression (10) is satisfied. When the upper limit is exceeded, a size in the direction perpendicular to an optical axis of an coupling means grows greater, and when the lower limit is exceeded, a thickness of an objective lens is increased, and an overall optical system is required to be larger accordingly when ensuring a necessary working distance.

When using a resin-made lens under the condition mentioned above, it is possible to achieve light weight and low cost.

As stated above, when there is used an objective lens which has minimum wavefront aberration when converged light enters therein and forms an image on an optical information recording medium within Marechal criterion, it is possible to reduce refracting power of the objective lens. In order to realize an optical system employing such objective lens, a coupling lens having positive refracting power which converts diverged light emitted from a light source into a prescribed converged light can be used.

Based on Mt representing magnification of an optical system and M representing magnification of an objective lens, magnification of a coupling lens Mc is determined as follows, $$Mc=Mt/M$$

and it is preferable that wavefront aberration for a coupling lens is minimum and is within Marechal criterion under the magnification Mc above. Due to this, deterioration of aberration caused when an objective lens is deviated from an optical axis can be lessened.

Coupling lens magnification Mc is preferably within a range of conditional expression (20). When the upper limit is exceeded, a burden for the refracting power of the coupling lens is increased, an influence of error sensitivity or the like grows greater, and requirements for accuracy for mounting and manufacturing are more severe than those for a conventional collimator. Thus, a size of a coupling lens in the direction perpendicular to its optical axis needs to be larger, compared with an objective lens.

When the lower limit is exceeded, a share of the refracting power of the objective lens is increased, which eliminates a difference in terms of effect from an objective lens of a infinite conjugation type employing a collimator.

NAo representing numerical aperture at the light source side preferably satisfies conditional expression (21). When it exceeds the lower limit, a sufficient light amount can not be obtained. If it exceeds the upper limit, an influence of astigmatism of a laser grows greater and an influence of uneven intensity distribution of light also grows greater.

In this case, when an objective lens satisfies conditional expression (1), it is possible to make numerical aperture NA at the image side large without increasing a lens thickness. When the NA exceeds the lower limit of conditional expression (16), it is possible to maintain the performance sufficiently through a known method such as a combination of a collimator and an objective lens accepting collimated light, without using aforesaid coupling lens and the objective lens accepting converged light. In addition, even in the case of a resin-made lens., a change in performance caused by a change in temperature can also be lessened.

When a coupling lens is made to be a spherical lens system composed of one or more pieces, it can be manufactured in the same manufacturing method as that for a conventional collimator.

However, since a coupling lens is one having a function to convert diverged light emitted from a light source into converged light, it has greater refracting power compared with a conventional collimator, and when taking in sufficient light amount from a light source, NA at the light source side needs to be greater. Therefore, in the case of a spherical lens system only, the number of lenses to be used needs to be large. Therefore, it is preferable to correct spherical aberration by using at least one aspherical surface.

When an objective lens is made of glass, it is possible to make a performance change caused by a temperature change to be small by making also a coupling lens to be made of glass, which is useful to be used especially in a lens having high NA such as NA 0.65 or higher.

When both sides of a coupling lens are made to be a convex surface, its form provides excellent molding property and easy manufacturing of the coupling lens. In addition, the form satisfies the sine condition.

By making a coupling lens to be a meniscus lens whose surface at the light source side is a convex surface, it is possible, especially when the coupling lens is made of resin, to obtain greater effect to change magnification of an objective lens caused by a temperature change, compared with other forms, under the specifications where distance Dco between the coupling lens and an objective lens, magnification M of the objective lens and magnification Mt of an overall optical system are the same as those in other forms, thus, the extent of offsetting for a change in capacity caused by a change in refractive index of the objective lens itself can be enhanced.

By making a coupling lens to be a meniscus lens whose surface at the light source side is a concave surface, it is possible to shorten a length of an overall optical system for the reason of the position of a principal point, compared with other forms.

In the first structure for attaining the second object of the invention, an optical system for recording and reproducing for an optical information medium is provided with the first lens group converting a light flux emitted from a light source into a converged light, an objective lens which converges the converged light from the first lens group on a recording surface of an information recording medium having a transparent substrate through the transparent substrate, and an optical means wherein light convergence conducted by aforesaid objective lens is converted into two types of light convergences depending on at least two type of the transparent substrate thickness so that information can be recorded and/or reproduced on at least two types of information recording media having thereon transparent substrates differing each other in terms of thickness.

The second structure is represented by the first structure wherein plural concentric and adjacent ring-shaped lenses having their centers on an optical axis each having different refracting power are formed on at least one lens surface among those constituting aforesaid first lens group and objective lens of aforesaid optical means, and a light flux emerging from aforesaid objective lens is converged in at least two types of convergences.

The third structure is represented by the first structure wherein plural concentric and adjacent ring-shaped lenses having their centers on an optical axis each having different refracting power are formed on at least one surface of the objective lens of the optical means, and the objective lens converges a converged light entering therein through at least two types of convergences.

The fourth structure is represented by the first structure wherein plural concentric and adjacent ring-shaped lenses having their centers on an optical axis each having different refracting power are formed on at least one surface of the first lens group, and the objective lens converges at least two types of converged light which are emerged from the first lens group and differ each other in terms of convergence degree through at least two types of convergences.

The fifth structure is represented by the first structure wherein a hologram is formed on at least one lens surface among those constituting the first lens group and objective lens, and a light flux emerged from the objective lens is converged through at least two types of convergences corresponding to transmitted light and diffracted light both by the hologram.

The sixth structure is represented by the fifth structure wherein when forming a hologram on at least one lens surface among those constituting the first lens group and objective lens, the hologram is formed on at least one lens surface of the objective lens.

The seventh structure is represented by the fifth structure wherein the hologram is formed on at least one lens surface of the first lens group.

The eighth structure is represented by the first structure wherein the optical means is constituted by a hologram element provided in the optical path of the light source and the objective lens, and the objective lens converges converged light entering therein through at least two types of convergences corresponding to light transmitted through the hologram element and light diffracted by the hologram element.

The ninth structure is represented by the first structure wherein the optical means is constituted by an optical element having thereon plural, concentric, adjacent and ring-shaped lens faces each having different refracting power provided in the optical path of the light source and the objective lens.

The tenth structure is represented by an optical system for recording and reproducing for an optical information medium wherein there are provided the first lens group converting a light flux emitted from a light source into converged light in which the direction and position of an optical axis are changed for changing convergence degree for the converged light, and an objective lens which converges the converged light from the first lens group on a recording surface of an information recording medium having thereon a transparent substrate through the transparent substrate, and convergence by the objective lens is made to be at least two types of convergences corresponding to different transparent substrate thickness of at least two types of information recording media by changing the direction and position of the optical axis of the first lens group, and thereby, information recording and/or reproducing on at least two types of information recording media having transparent substrates differing each other in terms of thickness can be conducted.

The eleventh structure is represented by any of the 4th and 7th–10th structures wherein aforesaid objective lens has the positive lateral magnification with which the wavefront aberration satisfies Marechal criterion and is minimum.

The twelfth structure is represented by either of the 3rd and 6th structures wherein aforesaid objective lens has the positive lateral magnification with which the wavefront aberration satisfies Marechal criterion and is minimum for each of at least two types of convergences mentioned above.

The thirteenth structure is represented by a pickup device for an optical information medium composed of a light source, a converging optical system which converges a light flux emitted from the light source on a recording surface of an information recording medium having a transparent substrate through the transparent substrate, and an optical detector which receives a light flux reflected on the recording surface of the information recording medium and outputs electric signals corresponding to an amount of light of the light flux, wherein aforesaid converging optical system is any of aforesaid optical systems for recording and reproducing for an optical information medium.

The fourteenth structure is represented by an objective lens for recording and reproducing optical information which has concentric, adjacent, plural and ring-shaped lens faces having their centers on an optical axis each having different refracting power, on at least one side thereof and converges a light flux transmitted through the ring-shaped lens surface, wherein the objective lens has the positive lateral magnification with which the wavefront aberration satisfies Marechal criterion and is minimum for each of at least two types of convergences.

The fifteenth structure is represented by an objective lens for recording and reproducing optical information which has a hologram on at least one lens surface thereof and converges light through at least two types of convergences corresponding to light transmitted through the hologram and light diffracted by the hologram, wherein the objective lens has the positive lateral magnification with which the wavefront aberration satisfies Marechal criterion and is minimum for each of at least two types of convergences.

The sixteenth structure is represented by a converging lens of an optical system for recording and reproducing optical information which converts light emitted from a light source into converged light, wherein at least one surface of the converging lens has concentric, adjacent, plural and ring-shaped lens faces having their centers on an optical axis each having different refracting power, and a light flux transmitted through each ring-shaped lens surface is emerged as at least two converged light each having different convergence degree.

The seventeenth structure is represented by a converging lens of an optical system for recording and reproducing optical information which converts light emitted from a light source into converged light, wherein a hologram is formed on at least one surface of the converging lens, and a light flux entering the converging lens is emerged as converged light having at least two convergence degrees corresponding to light transmitted through the hologram and light diffracted by the hologram.

In the optical system for recording and reproducing for an optical information medium in the invention described in the first structure, an optical means which makes convergence by an objective lens to be at least two types of convergences corresponding to at least two types of thicknesses of transparent substrate of an information recording medium is provided, and the first lens group which converts a light flux emitted from a light source into converged light is provided to make its converged light to enter the objective lens, thus, recording and/or reproducing of information to at least two types of information recording media each having different thickness is possible in a single optical system for recording and reproducing for an optical information medium, and refracting power shared by the objective lens can be reduced, and even when a resin-made objective lens is used as an objective lens, a change of wavefront aberration caused by a temperature change can be held down to a level at which a tolerance of a lens can be ensured.

In the optical means in the optical system for recording and reproducing for an optical information medium of the invention described in the 2nd, 3rd and 4th structures, concentric, adjacent, plural and ring-shaped lens faces having their centers on an optical axis each having different refracting power are formed on at least one surface out of lens surfaces constituting the first lens group and the objective lens, or at least one surface of the objective lens, or on at least one surface of the first lens group. Therefore, it is possible to obtain at least two types of convergences corresponding to two types of transparent substrate thicknesses in at least two types of information recording media each having different thickness within a range of movement of focus adjusting mechanism of an objective lens which has been used, without increasing the number of optical elements and without providing a special lens moving mechanism when conducting recording and/or reproducing of information on at least two types of information recording media each having different thickness, and thereby it is possible to conduct recording and/or reproducing of information on at least two types of information recording media each having different thickness. Further, in the structure mentioned above, a light flux can be divided by plural ring-shaped lens surfaces into light fluxes for obtaining at least two types of convergences. Therefore, it is possible to reduce useless light fluxes which can not be used for recording and/or reproducing of information on at least two types of information recording media, which results in effective use of light emitted from a light source.

In the optical means in the optical system for recording and reproducing for an optical information medium of the invention described in the 5th, 6th and 7th structures, a hologram is formed on at least one surface out of lens surfaces constituting the first lens group and the objective lens, or at least one surface of the objective lens, or on at least one surface of the first lens group. Therefore, it is possible to obtain at least two types of convergences corresponding to two types of transparent substrate thicknesses in at least two types of information recording media each having different thickness within a range of movement of focus adjusting mechanism of an objective lens which has been used, without increasing the number of optical elements and without providing a special lens moving mechanism when conducting recording and/or reproducing of information on at least two types of information recording media each having different thickness, and thereby it is possible to conduct recording and/or reproducing of information on at least two types of information recording media each having different thickness, and further, it is possible to obtain a beam spot which is less influenced by a side lobe.

In the optical means in the optical system for recording and reproducing for an optical information medium of the invention described in the 8th structure, a hologram element is provided in the optical path from the light source to the objective lens. Therefore, it is possible to obtain at least two types of convergences corresponding to at least two types of transparent substrate thicknesses in at least two types of information recording media each having different thickness within a range of movement of focus adjusting mechanism of an objective lens which has been used, without providing a special lens moving mechanism when conducting recording and/or reproducing of information on at least two types of information recording media each having different thickness, and thereby it is possible to conduct recording and/or reproducing of information on at least two types of information recording media each having different thickness. and to obtain a beam spot influenced less by a side lobe.

In the optical means in the optical system for recording and reproducing for an optical information medium of the invention described in the 9th structure, concentric, adjacent, plural and ring-shaped lens faces having their centers on an optical axis each having different refracting power are provided in the optical path from the light source to the objective lens. Therefore, it is possible to obtain at least two types of convergences corresponding to two types of transparent substrate thicknesses in at least two types of information recording media each having different thickness within a range of movement of focus adjusting mechanism of an objective lens which has been used, without providing a special lens moving mechanism when conducting recording and/or reproducing of information on at least two types of information recording media each having different thickness, and thereby it is possible to conduct recording and/or reproducing of information on at least two types of information recording media each having different thickness. Further, in the structure mentioned above, a light flux can be divided by plural ring-shaped lens surfaces into light fluxes for obtaining at least two types of convergences. Therefore, it is possible to reduce useless light fluxes which can not be used for recording and/or reproducing of information on at least two types of information recording media, which results in effective use of light emitted from a light source.

In the optical system for recording and reproducing for an optical information medium of the invention described in the 10th structure, there are provided the first lens group which converts a light flux emitted from a light source into converged light and is subjected to the change of the direction and position of its optical axis for changing the convergence degree of the converged light, and an object lens which converts the converged light from the first lens group on a recording surface of an information recording medium having a transparent substrate through the transparent substrate, and at least two types of convergence degrees can be selected for the converged light emitted from the first lens group by changing the direction and position of an optical axis of the first lens group, and thereby the convergence by the objective lens can be made to be two types of convergences corresponding to at least two types of transparent substrate thicknesses of an information recording medium, thus, there is conducted recording and/or reproducing of information on at least two types of information recording media having transparent substrates each having different thickness. Therefore, a single optical system for recording and reproducing for an information medium makes it possible to conduct recording and/or reproducing of information on at least two types of information recording media each having different thickness. Further, refracting power shared by the objective lens can be reduced, and even when a resin-made objective lens is used as an objective lens, a change of wavefront aberration caused by a temperature change can be held down to a level at which a tolerance of a lens can be ensured. In addition, loss of an amount of light is less, and an amount of light needed for recording and/or reproducing of information on at least two types of information recording media each having different thickness can be made optimum, and a beam spot influenced less by side lobe can be obtained.

In the optical system for recording and reproducing for an optical information medium in the invention described in the 11th structure, an objective lens has positive lateral magnification with which the wavefront aberration satisfies Marechal criterion and is minimum. Therefore, it is possible to reduce refracting power shared by the objective lens even when NA at the image side (at the optical information recording medium side) of the objective lens in use is great, and even when a resin-made objective lens is used as an objective lens, a change in wavefront aberration caused by a temperature change can be held down to a level at which a tolerance of the lens can be ensured.

In the optical system for recording and reproducing for an optical information medium in the invention described in the 12th structure, an objective lens has positive lateral magnification with which the wavefront aberration satisfies Marechal criterion and is minimum for each of at least two types of convergences. Therefore, it is possible to reduce refracting power shared by the objective lens even when NA at the image side (at the optical information recording medium side) of the objective lens in use is great, and even when a resin-made objective lens is used as an objective lens, a change in wavefront aberration caused by a temperature change can be held down to a level at which a tolerance of the lens can be ensured.

In the pickup device for an optical information medium of the information described in the 13th structure, a single optical system for recording and reproducing for an optical information medium makes it possible to record and/or reproduce information on at least two types of information recording media each having different thickness, and it is possible to reduce refracting power shared by the objective lens, and even when a resin-made objective lens is used as an objective lens, a change in wavefront aberration caused by a temperature change can be held down to a level at which a tolerance of the lens can be ensured, thus, it is possible to obtain a compact and highly reliable pickup device.

The objective lens for recording and reproducing optical information of the invention described in the 14th structure makes it possible to record and/or reproduce information on at least two types of information recording media each having different thickness, and even when it is made of resin, a change in wavefront aberration caused by a temperature change is small, and a light flux is divided by plural ring-shaped lens surfaces as light fluxes for obtaining at least two types of convergences. Therefore, it is possible to lessen a useless light flux which can not be used for recording and/or reproducing information on at least two types of information recording media, and thereby to utilize light emitted from a light source effectively.

The objective lens for recording and reproducing optical information of the invention described in the 15th structure makes it possible to record and/or reproduce information on at least two types of information recording media each having different thickness, and even when it is made of resin, a change in wavefront aberration caused by a temperature change is small, and it is further possible to obtain a beam spot which is less influenced by a side lobe.

The converging lens for recording and reproducing optical information of the invention described in the 16th structure makes it possible, in combination with an objective lens, to record and/or reproduce information on at least two types of information recording media each having different thickness, and even when the objective lens is made of resin, a change in wavefront aberration caused by a temperature change can be made small, and a light flux is divided by plural ring-shaped lens surfaces as light fluxes for obtaining at least two types of convergences. Therefore, it is possible to lessen a useless light flux which can not be used for recording and/or reproducing information on at least two types of information recording media, and thereby to utilize light emitted from a light source effectively.

The converging lens for recording and reproducing optical information of the invention described in the 17th structure makes it possible, in combination with an objective lens, to record and/or reproduce information on at least two types of information recording media each having different thickness, and even when the objective lens is made of resin, a change in wavefront aberration caused by a temperature change can be made small, and a beam spot which is less influenced by a side lobe can further be obtained.

BRIEF DESCRIPTION OF THE DRAWINGS

FIGS. 5(a) and 5(b) respectively represent a diagram of spherical aberration of the objective lens in aforesaid Example 2 and a diagram of offense against sine condition thereof.

FIGS. 45(a) and 45(b) respectively represent a diagram of spherical aberration of the coupling lens in aforesaid Example 16 and an aberration diagram of offense against sine condition thereof.

DETAILED DESCRIPTION OF THE PREFERRED EMBODIMENT

Figure 1:
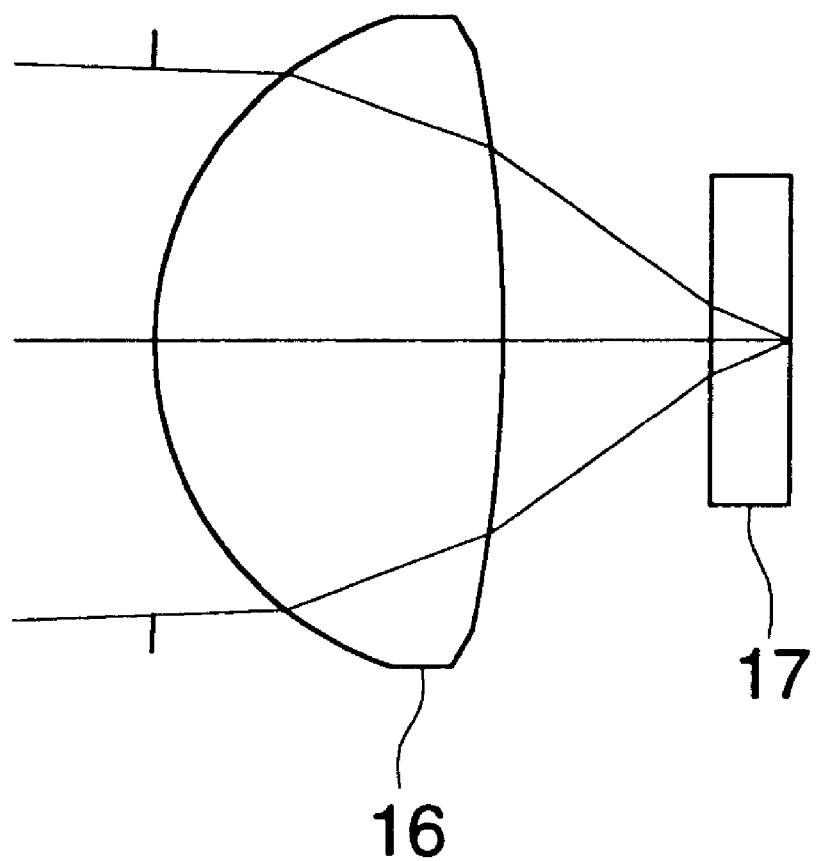
FIG. 1 is a diagram of an optical path in Example 1 of an objective lens in an optical system for recording and reproducing on an optical information recording medium of the invention.

Examples 1–19 for attaining the first object will be explained as follows. For each example, those having numerical aperture NA of 0.6 or more are used under the assumption of an optical system for recording and reproducing on a high density optical information recording medium having a transparent substrate. Further, a thickness of every transparent substrate 17 is made to be 0.6 mm.

Examples 1–5 and Example 8 and 19 show only objective lens 16, and Examples 6 and 7 show an optical system wherein objective lens 16 of Example 1 and coupling lens 13 are used. Examples 9–18 show single coupling lens 13 and an optical system wherein the single coupling lens 13 and the objective lens 16 are combined. In this case, in Examples 9–16 employ an objective lens of Example 1, Example 17 employs an objective lens of Example 2, and Example 18 employs an objective lens of Example 3.

With regard to symbols in tables, a focal length of objective lens 16 is represented by F (mm), a radius of curvature of the i-th surface from the light source side 11 successively is represented by ri, a distance on an optical axis between the i-th surface and (i+1)th surface is represented by di, a refractive index in wavelength of light source of medium located between the i-th surface and the (i+1)th surface is represented by ni, lateral magnification of objective lens 16 is represented by M, a numerical aperture at the image side is represented by NA, and a wavelength used is represented by $\lambda$.

In Examples 6 and 7, Ft represents a focal length of an overall optical system, Mt represents lateral magnification of an overall optical system, T represents is a distance to light source 11 viewed from the first surface, and the direction of advancing light is assumed to be positive. U represents an object-image distance, and Examples 1 to 5, 8 and 19 show only objective lens 16, and the distance is negative because incident light is a converged light flux.

In Examples 6 and 7, and in Examples 9–18, Ft represents a focal length of an overall optical system, Mt represents lateral magnification of an overall optical system, U represents an object-image distance, and T represents a distance to a light source viewed from the first surface of coupling lens 13.

In coupling lens 13 in Examples 9–18, Fc is a focal length of a single coupling lens, Mc is lateral magnification of a coupling lens, Uc is an object-image distance of a coupling lens in the then arrangement, and NAc is a numerical aperture at the light source side.

With regard to temperature characteristics, when an objective lens or a coupling lens is made of resin, it is assumed that a change for temperature rise by 1° C. is $-12 \times 10^{-5}$. When an objective lens or a coupling lens is made of glass, it is assumed that a change for temperature rise by 1° C. is $39 \times 10^{-7}$.

Temperature characteristics are evaluated by wavefront aberration rms value. For this wavefront aberration, its rms value is calculated through ray tracing in a known method. Marechal criterion means that the wavefront aberration rms value is 0.07 $\lambda$. Further, the wavefront aberration can be measured by the use of an interferometer capable of analyzing numerical values.

Incidentally, an influence of linear expansion of a material caused by a temperature change is considerably small compared with an influence caused by a change in refractive index. Therefore, it is not considered in calculation in this case.

When assuming that $\kappa$ represents a conical coefficient, Ai represents aspherical coefficient, and Pi (4≦Pi) represents an exponent in the rectangular coordinates wherein its origin is an apex of the aspherical surface and its X-axis is in the optical axis direction, an aspherical form of a lens surface is represented as follow.

$$x = \frac{C\phi^2}{1 + \sqrt{1 - (1+\kappa)C^2\phi^2}} + \sum A i \phi^{Pi}$$

$$\phi = \sqrt{y^2 + z^2}, \ C = 1/r$$

EXAMPLE 1

| F = | 3.7685433 | M = | +1/12 | U = | −37.068 |
|---|---|---|---|---|---|
| NA: | 0.60 | $\lambda$ = | 635 nm | | |
| i | ri | | di | | ni |
| 1 | 2.165 | | 2.60 | | 1.49810 |
| 2 | −8.480 | | 1.57 | | |
| 3 | ∞ | | 0.60 | | 1.58000 |
| 4 | ∞ | | | | |

Aspherical data

First surface

| $\kappa$ = | −8.36770 × 10$^{-1}$ | | |
|---|---|---|---|
| $A_1$ = | 5.07210 × 10$^{-3}$ | $P_1$ = | 4.0000 |
| $A_2$ = | 3.24900 × 10$^{-4}$ | $P_2$ = | 6.0000 |
| $A_3$ = | 2.11340 × 10$^{-5}$ | $P_3$ = | 8.0000 |
| $A_4$ = | −3.96600 × 10$^{-6}$ | $P_4$ = | 10.0000 |

Second surface

| $\kappa$ = | −2.25490 × 10 | | |
|---|---|---|---|
| $A_1$ = | 1.27980 × 10$^{-2}$ | $P_1$ = | 4.0000 |
| $A_2$ = | −5.04840 × 10$^{-3}$ | $P_2$ = | 6.0000 |
| $A_3$ = | 1.03830 × 10$^{-3}$ | $P_3$ = | 8.0000 |
| $A_4$ = | −9.09990 × 10$^{-5}$ | $P_4$ = | 10.0000 |

Figure 2:
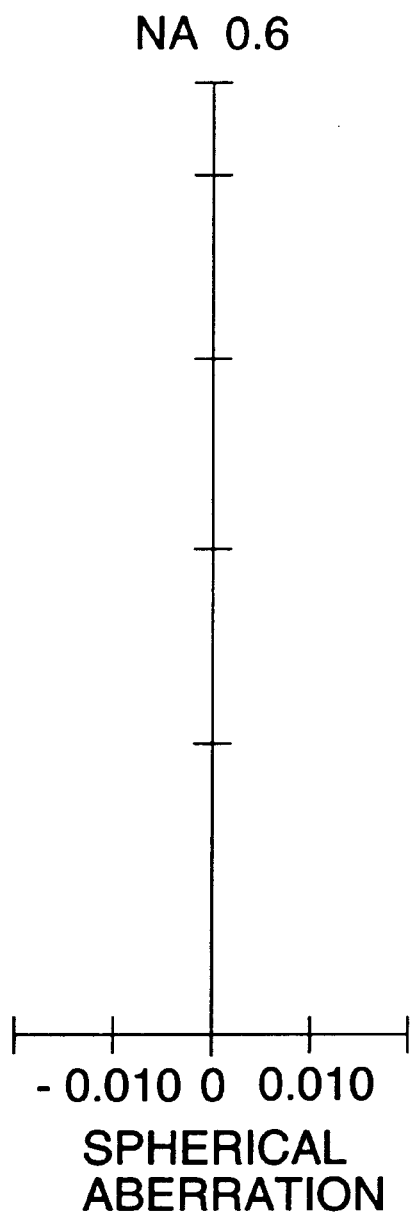
FIGS. 2(a) and 2(b) respectively represent a diagram of spherical aberration of the objective lens in aforesaid Example 1 and a diagram of offense against sine condition thereof.
Figure 2:
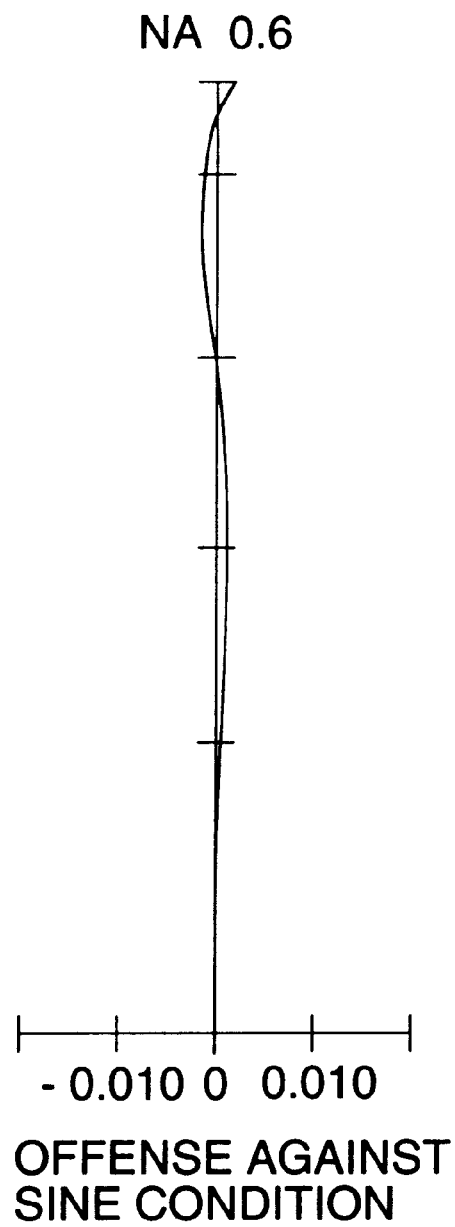
Figure 3:
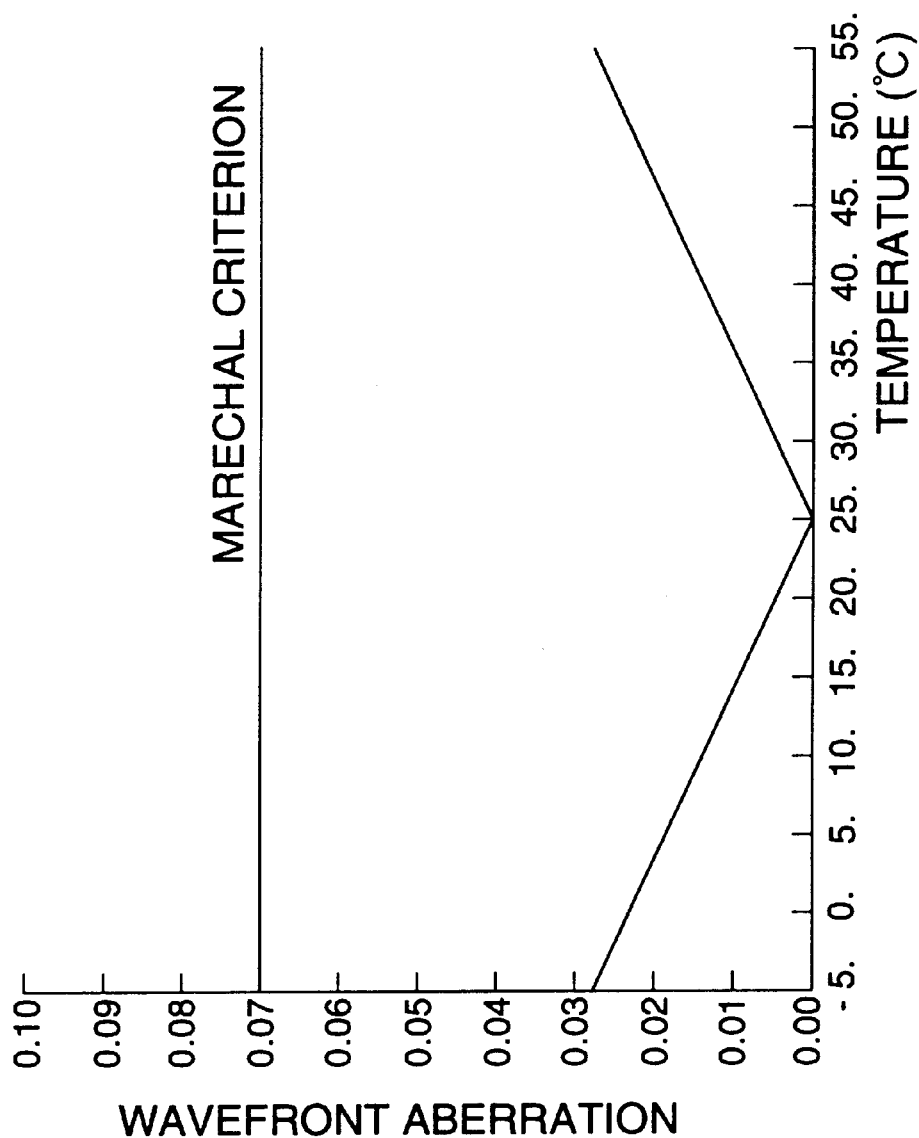
FIG. 3 is a diagram of temperature characteristics of the objective lens in aforesaid Example 1.

This example represents an example wherein objective lens 16 is made of resin. An optical path of the objective lens 16 is shown in FIG. 1, a diagram of its spherical aberration and a diagram of offense against sine condition thereof is shown in FIG. 2, and temperature characteristics are shown in FIG. 3.

Temperature characteristics represent a 30° C. change and wavefront aberration is just a change of 0.028 $\lambda$, thus, an influence of a temperature change is small compared with an objective lens of an infinite conjugation type.

This example includes the following.

$$x_2 = -0.08606 \quad \quad \Delta_2 = 0.04569$$

$$x_2 \cdot (n-1) / \{F \cdot (NA)^2\} = -0.03160$$

$$\Delta_2 \cdot (n-1)^3 / \{F \cdot (NA)^4\} = 0.01156$$

EXAMPLE 2

| F = | 4.5893756 | M = | +1/5 | U = | −13.610 |
|---|---|---|---|---|---|
| NA: | 0.60 | $\lambda$ = | 635 nm | | |
| i | ri | | di | | ni |
| 1 | 2.304 | | 2.60 | | 1.49810 |
| 2 | −179.922 | | 1.57 | | |
| 3 | ∞ | | 0.60 | | 1.58000 |
| 4 | ∞ | | | | |

Aspherical data

First surface

| $\kappa$ = | −8.28170 × 10$^{-1}$ | | |
|---|---|---|---|
| $A_1$ = | 5.44340 × 10$^{-3}$ | $P_1$ = | 4.0000 |
| $A_2$ = | 4.26990 × 10$^{-4}$ | $P_2$ = | 6.0000 |
| $A_3$ = | 2.89730 × 10$^{-5}$ | $P_3$ = | 8.0000 |
| $A_4$ = | 3.55070 × 10$^{-6}$ | $P_4$ = | 10.0000 |

Second surface

| $\kappa$ = | −2.25490 × 10 | | |
|---|---|---|---|
| $A_1$ = | 7.41970 × 10$^{-3}$ | $P_1$ = | 4.0000 |
| $A_2$ = | −1.45950 × 10$^{-3}$ | $P_2$ = | 6.0000 |
| $A_3$ = | 1.25000 × 10$^{-5}$ | $P_3$ = | 8.0000 |
| $A_4$ = | 2.08630 × 10$^{-5}$ | $P_4$ = | 10.0000 |

Figure 4:
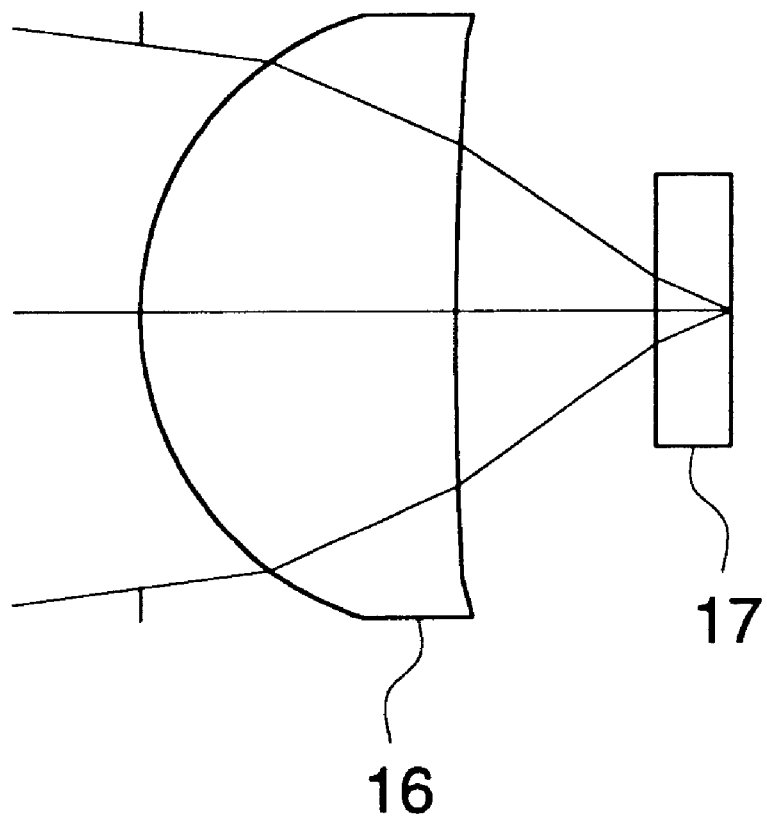
FIG. 4 is a diagram of an optical path in Example 2 of an objective lens in an optical system for recording and reproducing on an optical information recording medium of the invention.
Figure 6:
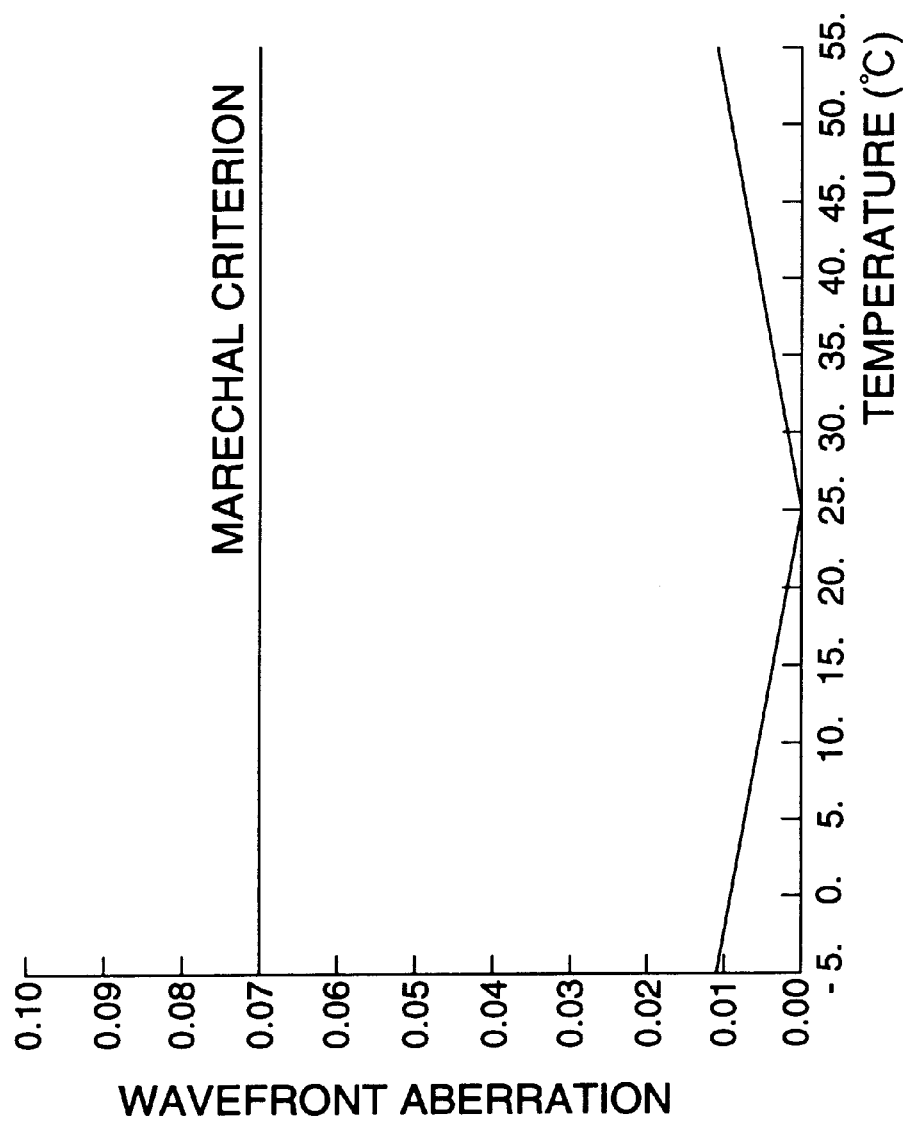
FIG. 6 is a diagram of temperature characteristics of the objective lens in aforesaid Example 2.

In this example, objective lens 16 is made of resin as in Example 1. An optical path of the objective lens 16 is shown in FIG. 4, a diagram of its spherical aberration and a diagram of offense against sine condition thereof is shown in FIG. 5, and temperature characteristics are shown in FIG. 6. Since M in Example 2 is greater than that in Example 1, an effect is greater.

This example includes the following.

$$x_2 = 0.01337 \quad \quad \Delta_2 = 0.01894$$

$$x_2 \cdot (n-1) / \{F \cdot (NA)^2\} = 0.00403$$

$$\Delta_2 \cdot (n-1)^3 / \{F \cdot (NA)^4\} = 0.00394$$

EXAMPLE 3

| F = | 3.6959252 | M = | +1/15 | U = | −47.370 |
|---|---|---|---|---|---|
| NA: | 0.60 | $\lambda$ = | 635 nm | | |
| i | ri | | di | | ni |
| 1 | 2.130 | | 2.60 | | 1.49810 |
| 2 | −8.053 | | 1.57 | | |

-continued

| | | | |
|---|---|---|---|
| 3 | ∞ | 0.60 | 1.58000 |
| 4 | ∞ | | |

Aspherical data

First surface $\kappa =$ $-5.06170 \times 10^{-1}$
$A_1 =$ $8.72330 \times 10^{-4}$ $P_1 =$ 4.0000
$A_2 =$ $8.86100 \times 10^{-5}$ $P_2 =$ 6.0000
$A_3 =$ $7.50840 \times 10^{-6}$ $P_3 =$ 8.0000
$A_4 =$ $-1.22820 \times 10^{-6}$ $P_4 =$ 10.0000

Second surface $\kappa =$ $-2.25510 \times 10$
$A_1 =$ $1.31840 \times 10^{-2}$ $P_1 =$ 4.0000
$A_2 =$ $-3.62900 \times 10^{-3}$ $P_2 =$ 6.0000
$A_3 =$ $6.28660 \times 10^{-4}$ $P_3 =$ 8.0000
$A_4 =$ $-4.99790 \times 10^{-5}$ $P_4 =$ 10.0000

Figure 7:
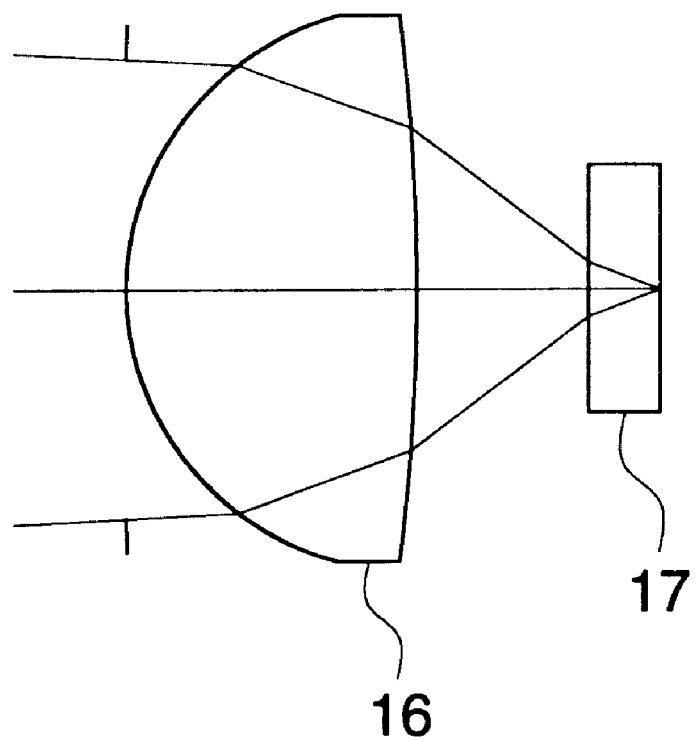
FIG. 7 is a diagram of an optical path in Example 3 of an objective lens in an optical system for recording and reproducing on an optical information recording medium of the invention.
Figure 8A:
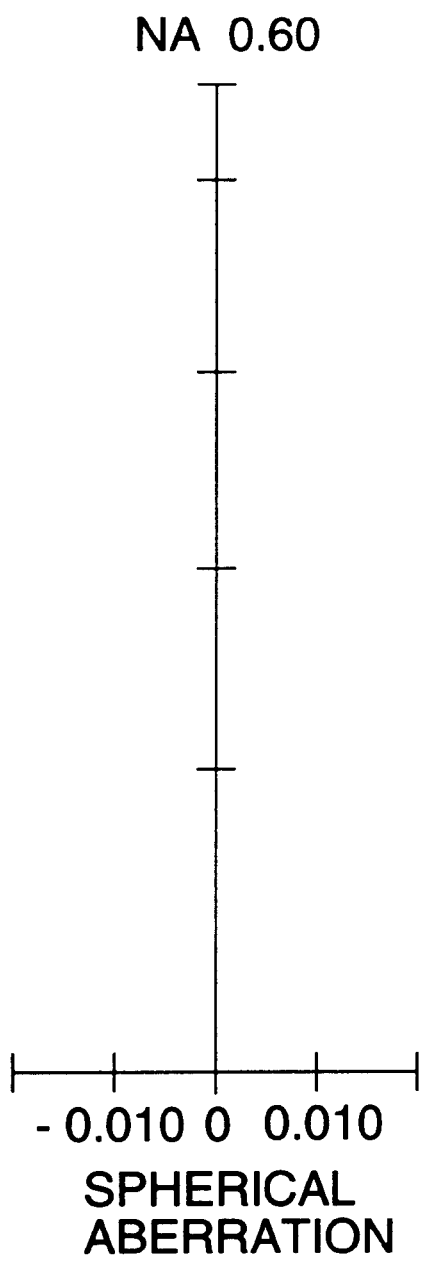
FIGS. 8(a) and 8(b) respectively represent a diagram of spherical aberration of the objective lens in aforesaid Example 3 and a diagram of offense against sine condition thereof.
Figure 8B:
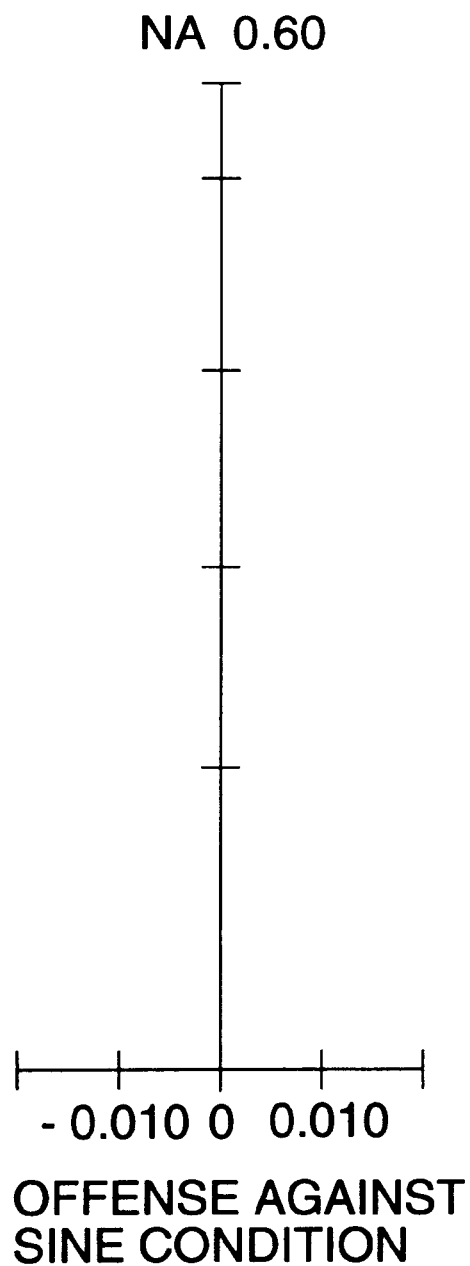
Figure 9:
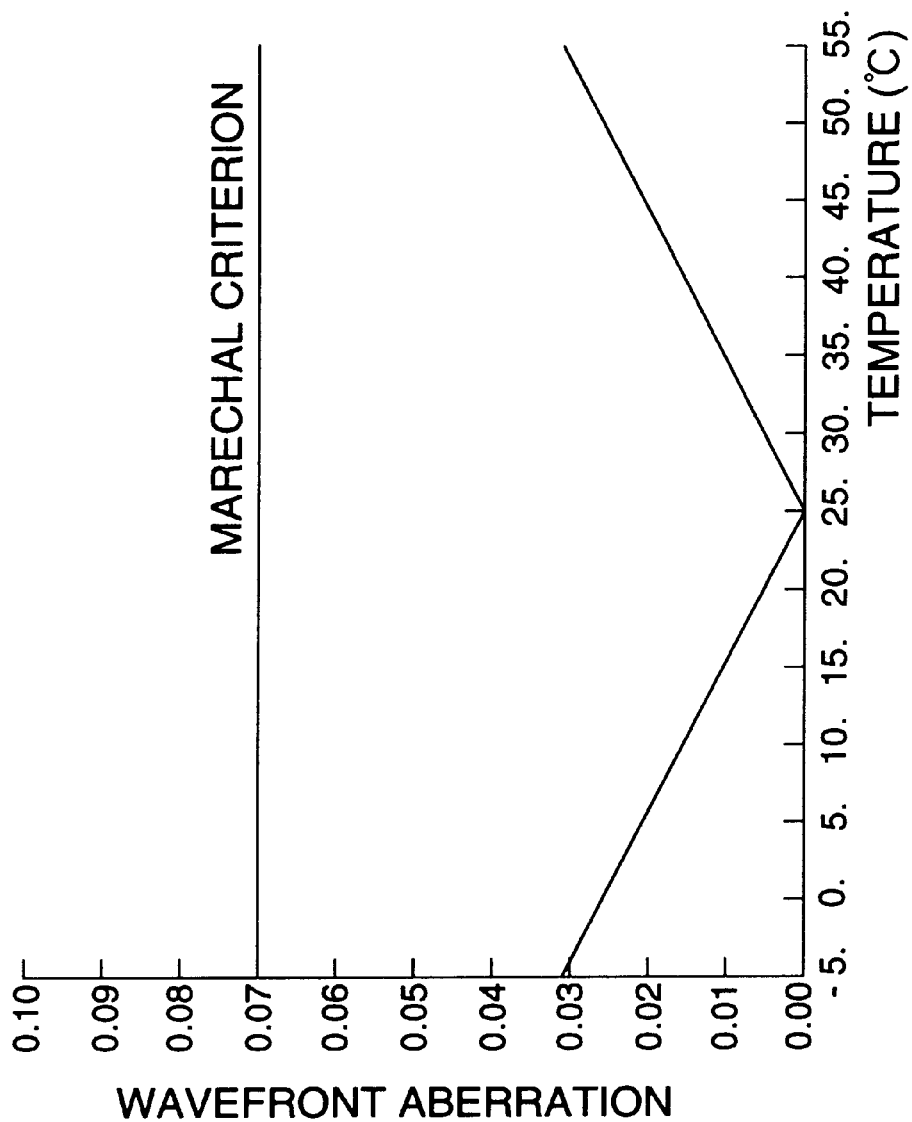
FIG. 9 is a diagram of temperature characteristics of the objective lens in aforesaid Example 3.

Objective lens of this example is also made of resin, and its optical path is shown in FIG. 7, a diagram of its spherical aberration and a diagram of offense against sine condition thereof are shown respectively in FIG. 8(a) and FIG. 8(b), and temperature characteristics are shown in FIG. 9.

This example includes the following.

$x_2 = -0.08076 \qquad \Delta_2 = 0.05734$ $x_2 \cdot (n-1)/\{F \cdot (NA)^2\} = -0.03023$ $\Delta_2 \cdot (n-1)^3 / \{F \cdot (NA)^4\} = 0.01479$

EXAMPLE 4

| F = | 4.6109005 | M = | +1/5 | U = | -13.641 |
|---|---|---|---|---|---|
| NA: | 0.7 | λ = | 450 nm | | |
| i | ri | | di | | ni |

| | | | |
|---|---|---|---|
| 1 | 2.318 | 2.60 | 1.50870 |
| 2 | 123.320 | 1.57 | |
| 3 | ∞ | 0.60 | 1.60000 |
| 4 | ∞ | | |

Aspherical data

First surface $\kappa =$ $-8.09110 \times 10^{-1}$
$A_1 =$ $5.22310 \times 10^{-3}$ $P_1 =$ 4.0000
$A_2 =$ $4.60510 \times 10^{-4}$ $P_2 =$ 6.0000
$A_3 =$ $1.66010 \times 10^{-5}$ $P_3 =$ 8.0000
$A_4 =$ $7.33260 \times 10^{-6}$ $P_4 =$ 10.0000

Second surface $\kappa =$ $-2.25490 \times 10$
$A_1 =$ $6.72560 \times 10^{-3}$ $P_1 =$ 4.0000
$A_2 =$ $-6.93750 \times 10^{-4}$ $P_2 =$ 6.0000
$A_3 =$ $-1.29380 \times 10^{-4}$ $P_3 =$ 8.0000
$A_4 =$ $2.24440 \times 10^{-5}$ $P_4 =$ 10.0000

Figure 10:
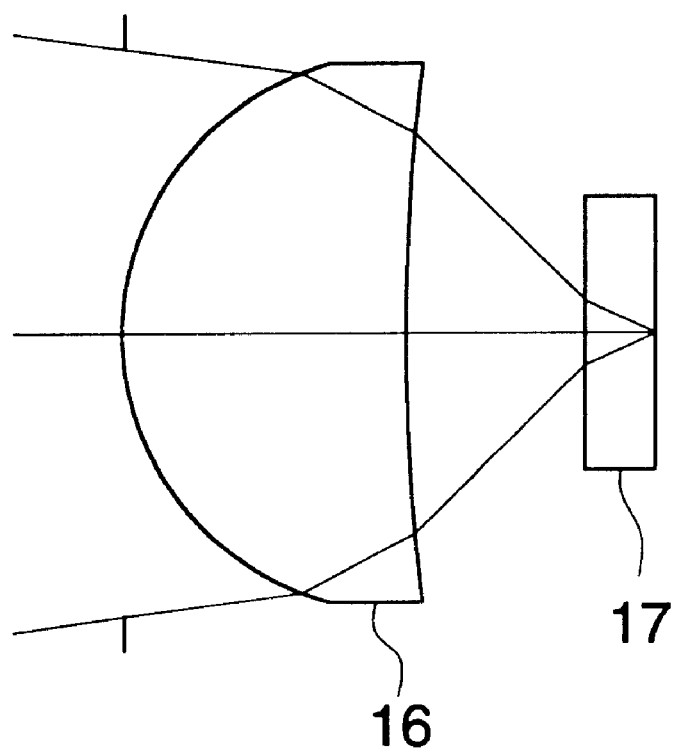
FIG. 10 is a diagram of an optical path in Example 4 of an objective lens in an optical system for recording and reproducing on an optical information recording medium of the invention.
Figure 11:
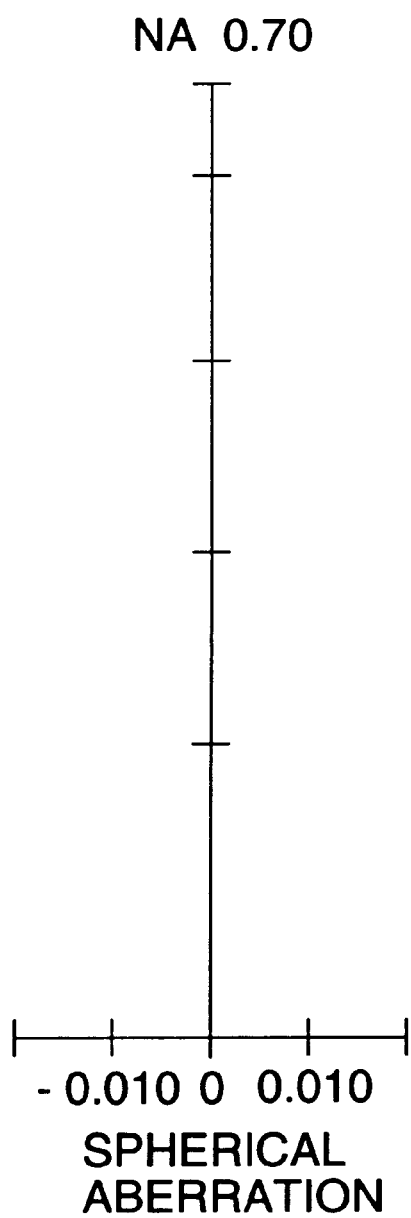
FIGS. 11(a) and 11(b) respectively represent a diagram of spherical aberration of the objective lens in aforesaid Example 4 and a diagram of offense against sine condition thereof.
Figure 11:
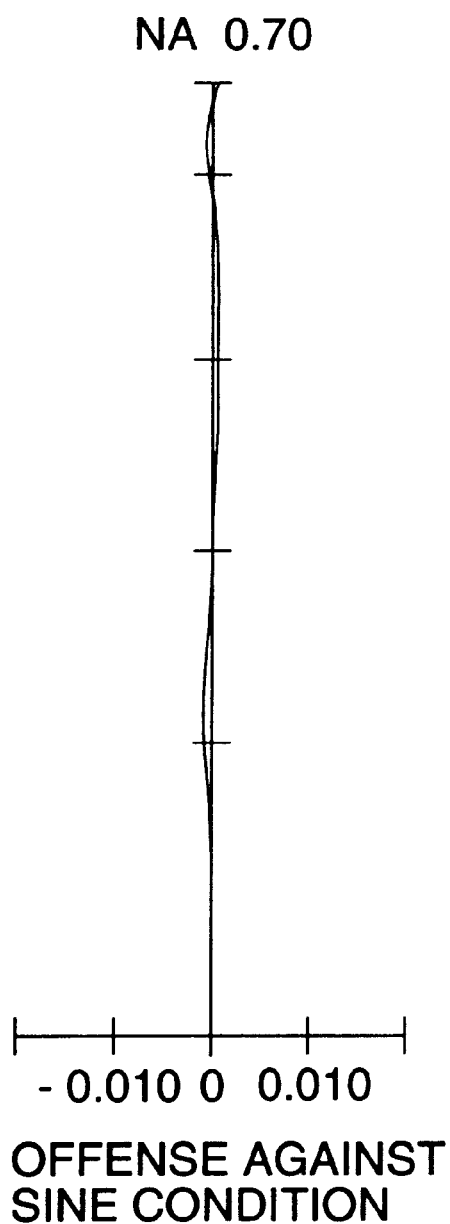
Figure 12:
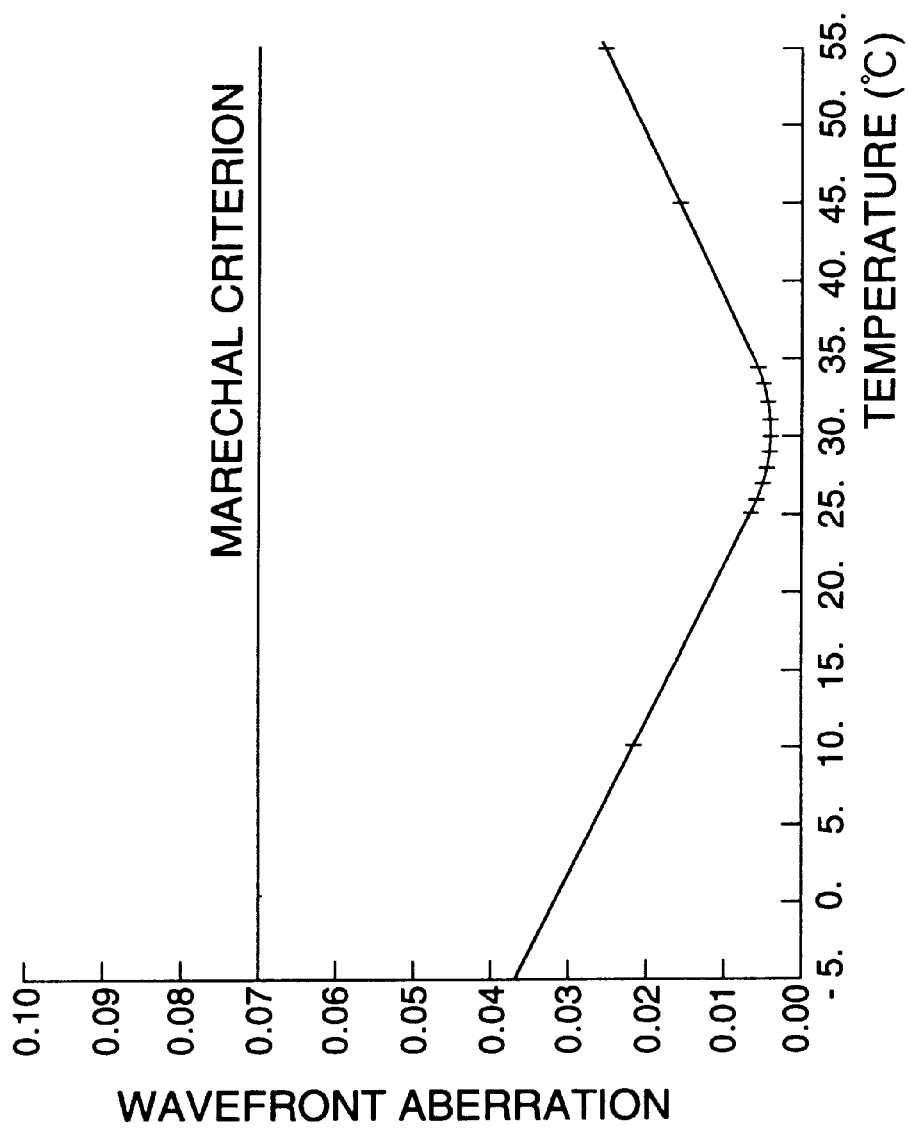
FIG. 12 is a diagram of temperature characteristics of the objective lens in aforesaid Example 4.

Objective lens 16 of this example is also made of resin, and in the example, NA is 0.7 and wavelength of light used is 450 nm. Its optical path is shown in FIG. 10, a diagram of its spherical aberration and a diagram of offense against sine condition thereof are shown respectively in FIG. 11(a) and FIG. 11(b), and temperature characteristics are shown in FIG. 12. When M represents magnification of 0.2, even in the case of a resin-made lens with NA of 0.7, a change in wavefront aberration is only 0.028 λ for a change of temperature 30° C., and also in design, initial aberration is properly corrected.

This example includes the following.

$x_2 = -0.05248 \qquad \Delta_2 = 0.03962$ $x_2 \cdot (n-1)/\{F \cdot (NA)^2\} = 0.01182$ $\Delta_2 \cdot (n-1)^3 / \{F \cdot (NA)^4\} = 0.00471$

EXAMPLE 5

| F = | 4.6141726 | M = | +1/5 | U = | -17.811 |
|---|---|---|---|---|---|
| NA: | 0.75 | λ = | 450 nm | | |
| i | ri | | di | | ni |

| | | | |
|---|---|---|---|
| 1 | 2.524 | 2.30 | 1.71017 |
| 2 | 6.823 | 1.57 | |
| 3 | ∞ | 0.60 | 1.60000 |
| 4 | ∞ | | |

Aspherical data

First surface $\kappa =$ $-8.28440 \times 10^{-1}$
$A_1 =$ $5.01710 \times 10^{-3}$ $P_1 =$ 4.0000
$A_2 =$ $3.07860 \times 10^{-4}$ $P_2 =$ 6.0000
$A_3 =$ $6.37850 \times 10^{-5}$ $P_3 =$ 8.0000
$A_4 =$ $-7.41820 \times 10^{-6}$ $P_4 =$ 10.0000
$A_5 =$ $1.38190 \times 10^{-6}$ $P_4 =$ 12.0000

Second surface $\kappa =$ $-2.25430 \times 10$
$A_1 =$ $1.04510 \times 10^{-2}$ $P_1 =$ 4.0000
$A_2 =$ $-2.51340 \times 10^{-3}$ $P_2 =$ 6.0000
$A_3 =$ $7.11610 \times 10^{-4}$ $P_3 =$ 8.0000
$A_4 =$ $-1.44630 \times 10^{-4}$ $P_4 =$ 10.0000
$A_5 =$ $1.38190 \times 10^{-5}$ $P_4 =$ 12.0000

Figure 13:
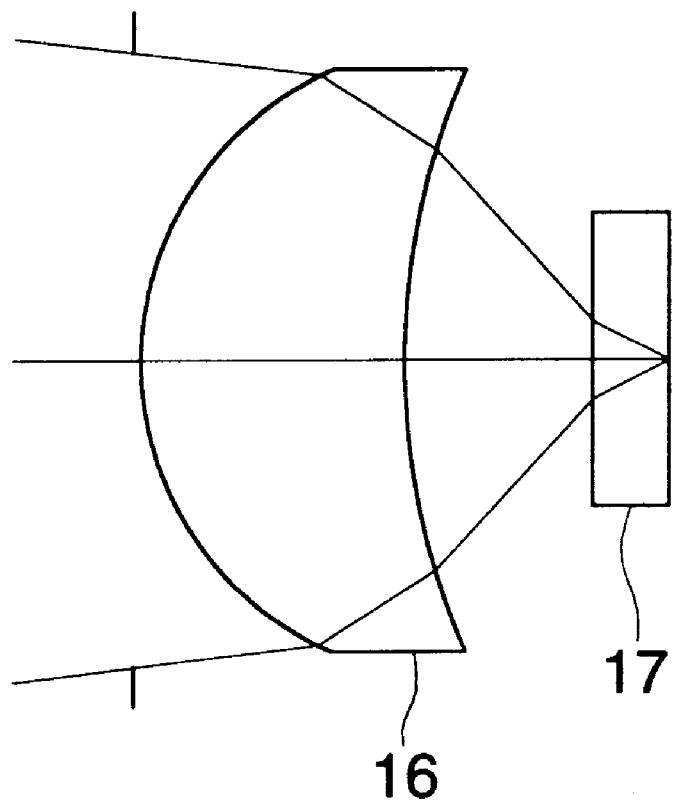
FIG. 13 is a diagram of an optical path of an objective lens in Example 5 in an optical system for recording and reproducing on an optical information recording medium of the invention.
Figure 14:
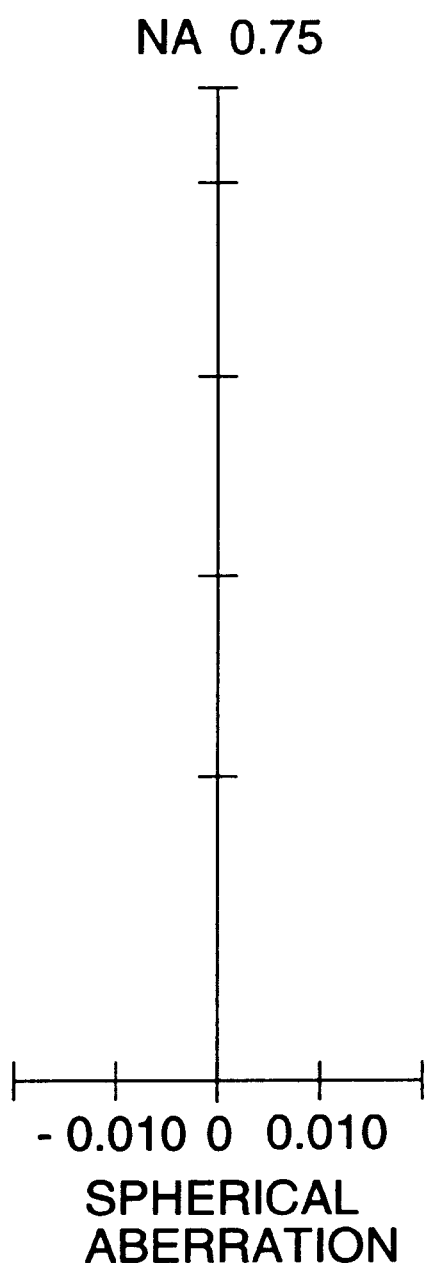
FIGS. 14(a) and 14(b) respectively represent a diagram of spherical aberration of the objective lens in aforesaid Example 5 and a diagram of offense against sine condition thereof.
Figure 14:
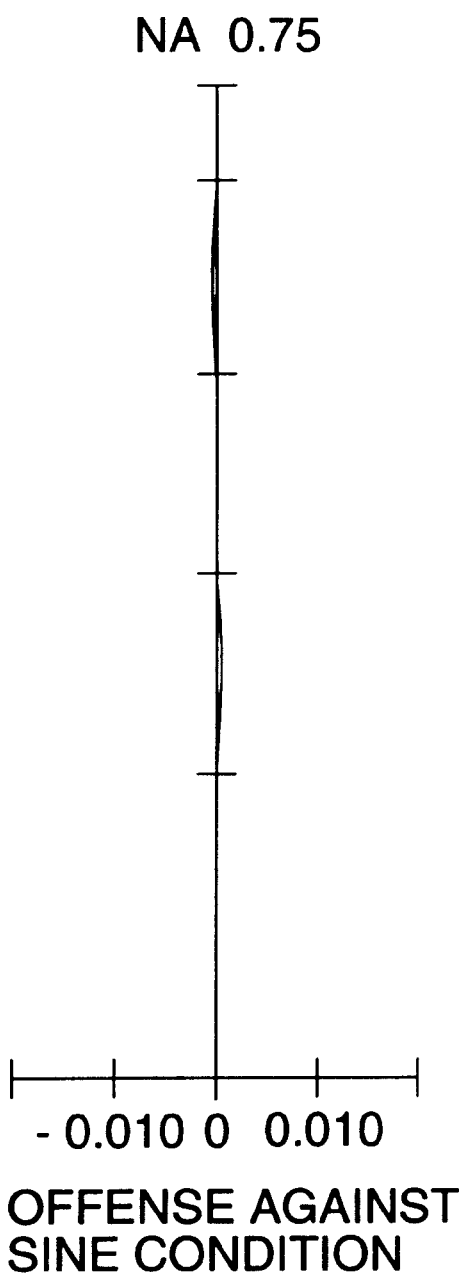
Figure 15:
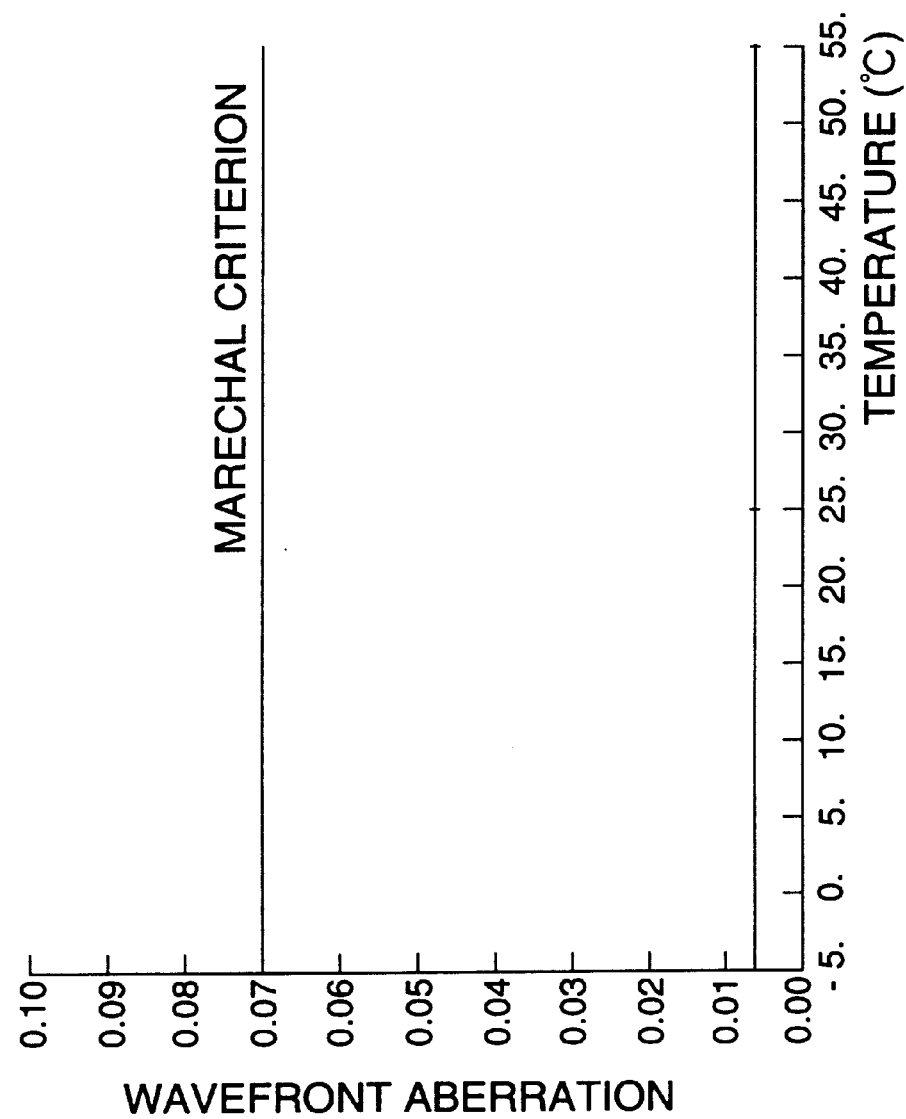
FIG. 15 is a diagram of temperature characteristics of the objective lens in aforesaid Example 5.

Objective lens 16 of this example is also made of resin, and in the example, NA is 0.75 and wavelength of light used is 450 nm, and initial aberration is properly corrected at NA 0.75. Its optical path is shown in FIG. 13, a diagram of its spherical aberration and a diagram of offense against sine condition thereof are shown respectively in FIG. 14(a) and FIG. 14(b), and temperature characteristics are shown in FIG. 15.

This example satisfies the following.

$x_2 = -0.25188 \qquad \Delta_2 = 0.00660$ $x_2 \cdot (n-1)/\{F \cdot (NA)^2\} = 0.06892$ $\Delta_2 \cdot (n-1)^3 / \{F \cdot (NA)^4\} = 0.00162$

EXAMPLE 6

| Ft = | 6.4164274 | Mt = | -1/6 | T = | -25.149 |
|---|---|---|---|---|---|
| F = | 3.7685433 | M = | +1/12.12 | U = | 42.822 |
| NA: | 0.6 | λ = | 635 nm | | |
| i | ri | | di | | ni |

| | | | |
|---|---|---|---|
| 1 | 24.427 | 1.00 | 1.83925 |
| 2 | 7.230 | 2.00 | 1.72623 |
| 3 | -18.300 | 9.90 | |
| 4 | 2.165 | 2.60 | 1.49810 |
| 5 | -8.480 | 1.573 | |

-continued

| 6 | ∞ | 0.60 | 1.58000 |
| 7 | ∞ | | |

Aspherical data

Figure 16:
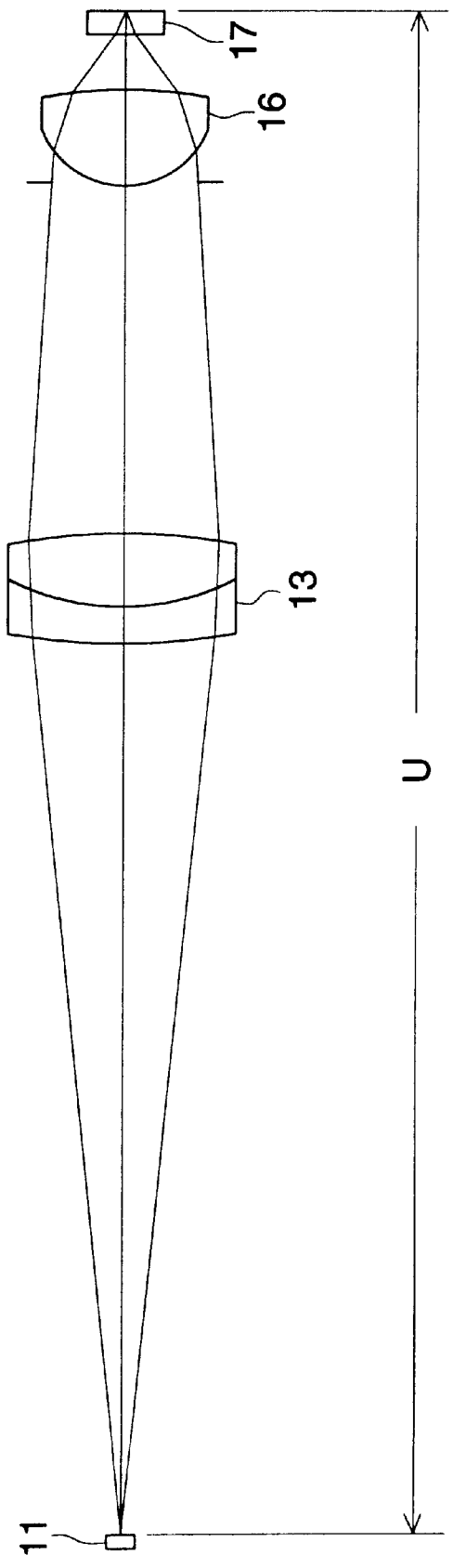
FIG. 16 is a diagram of an optical path of Example 6 of an optical system for recording and reproducing on an optical information recording medium of the invention.
Figure 17:
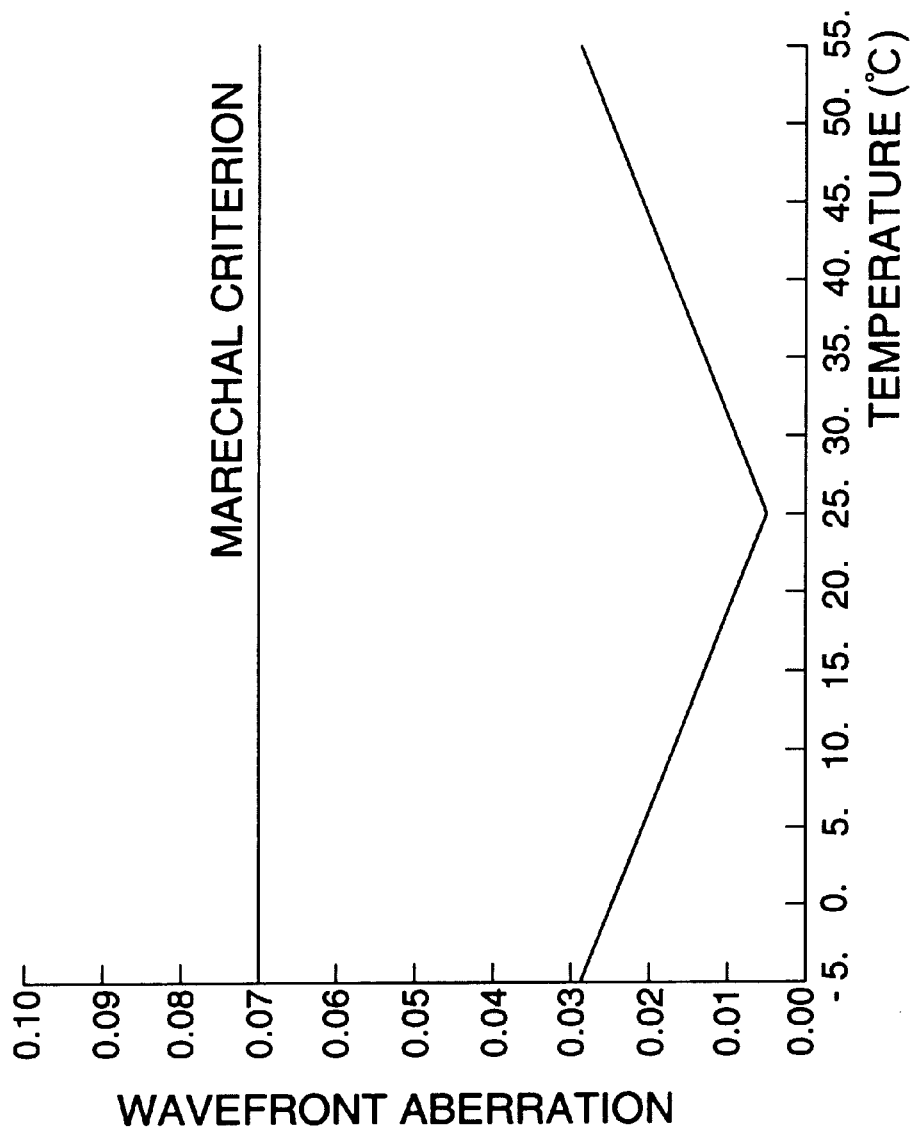
FIG. 17 is a diagram of temperature characteristics of the optical system in aforesaid Example 6.

Fourth surface $\kappa = -8.36770 \times 10^{-1}$
$A_1 = 5.07210 \times 10^{-3}$    $P_1 = 4.0000$
$A_2 = 3.24900 \times 10^{-4}$    $P_2 = 6.0000$
$A_3 = 2.11340 \times 10^{-5}$    $P_3 = 8.0000$
$A_4 = -3.96600 \times 10^{-6}$   $P_4 = 10.0000$ Fifth surface $\kappa = -2.25490 \times 10$
$A_1 = 1.27980 \times 10^{-2}$    $P_1 = 4.0000$
$A_2 = -5.04840 \times 10^{-3}$   $P_2 = 6.0000$
$A_3 = 1.03830 \times 10^{-3}$    $P_3 = 8.0000$
$A_4 = -9.09990 \times 10^{-5}$   $P_4 = 10.0000$ In the optical system in this example, objective lens 16 of the Example 1 is used and coupling lens 13 is made of glass and is of a 1-group and 2-element type. Its optical path is shown in FIG. 16, and temperature characteristics are shown in FIG. 17.

An amount of wavefront aberration caused by a temperature change is almost the same as that in Example 1, and it is caused by an objective lens.

Further, for correcting aberration caused by a coupling lens, magnification giving the best wavefront aberration of the objective lens is slightly different from that in Example 1.

This example satisfies the following.

Dco=9.90

EXAMPLE 7

| Ft = | 6.4537445 | Mt = | -1/6 | T = | -25.557 |
| F = | 3.7685433 | M = | +1/12 | U = | 42.327 |
| NA: | 0.6 | λ = | 635 nm | | |
| i | ri | | di | | ni |
| 1 | 17.470 | | 2.00 | | 1.49810 |
| 2 | -16.738 | | 10.00 | | |
| 3 | 2.165 | | 2.60 | | 1.49810 |
| 4 | -8.480 | | 1.57 | | |
| 5 | ∞ | | 0.60 | | 1.58000 |
| 6 | ∞ | | | | |

Aspherical data

First surface $\kappa = -6.44530 \times 10^{-1}$

Figure 18:
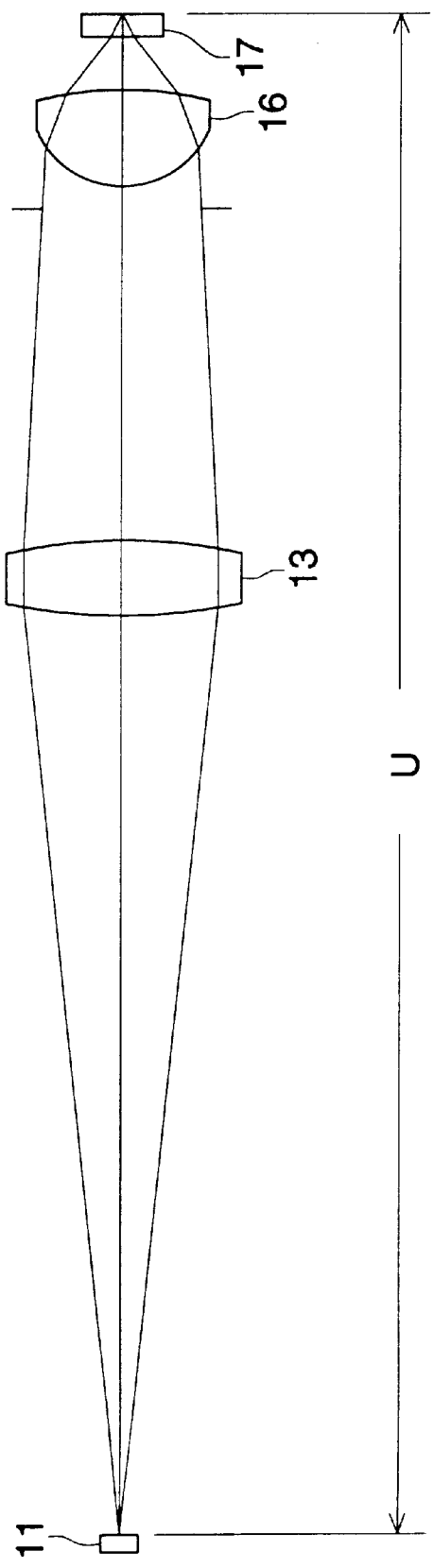
FIG. 18 is a diagram of a optical path in Example 7 of an optical system for recording and reproducing on an optical information recording medium of the invention.
Figure 19:
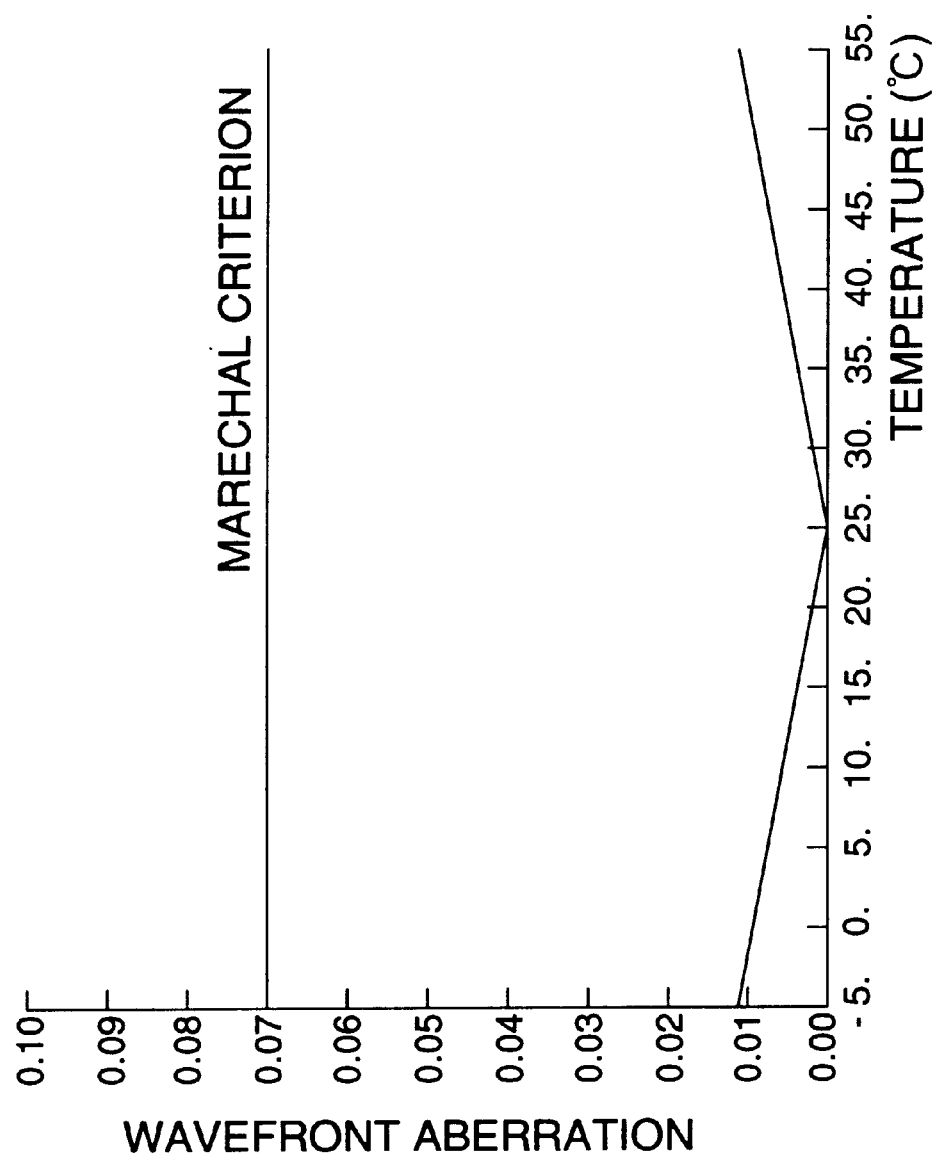
FIG. 19 is a diagram of temperature characteristics of the optical system in aforesaid Example 7.

Second surface $\kappa = -3.72840 \times 10^{-1}$
$A_1 = 8.92470 \times 10^{-5}$    $P_1 = 4.0000$ Third surface $\kappa = -8.36770 \times 10^{-1}$
$A_1 = 5.07210 \times 10^{-3}$    $P_1 = 4.0000$
$A_2 = 3.24900 \times 10^{-4}$    $P_2 = 6.0000$
$A_3 = 2.11340 \times 10^{-5}$    $P_3 = 8.0000$
$A_4 = -3.96600 \times 10^{-6}$   $P_4 = 10.0000$ Fourth surface $\kappa = -2.25490 \times 10$
$A_1 = 1.27980 \times 10^{-2}$    $P_1 = 4.0000$
$A_2 = -5.04840 \times 10^{-3}$   $P_2 = 6.0000$ -continued $A_3 = 1.03830 \times 10^{-3}$    $P_3 = 8.0000$
$A_4 = -9.09990 \times 10^{-5}$   $P_4 = 10.0000$ In the optical system of this example, objective lens 16 is made of resin and it is the same as that in Example 1, and coupling lens 13 is a single lens made of resin whose both sides represent an aspherical surface. Its optical path is shown in FIG. 18, and temperature characteristics are shown in FIG. 19.

An amount of wavefront aberration caused by a temperature change is a half or lower compared with that in Example 1. The reason for this is that an influence by that a temperature rise makes the refractive index of each lens to be lowered, then makes an angle of light converged by a coupling lens to be reduced and makes lateral magnification of an objective lens to be made small (in case of this influence only, spherical aberration of the objective lens moves toward the under side) and an influence by that the refractive index of the objective lens itself is lowered (in this case, spherical aberration moves toward the over side) offset each other.

This example satisfies the following.

Dco=10.0

EXAMPLE 8

| F = | 4.5192426 | M = | +1/5 | U = | -13.41765 |
| NA: | 0.6 | λ = | 635 nm | | |
| i | ri | | di | | ni |
| 1 | 2.345 | | 2.60 | | 1.49810 |
| 2 | -35.299 | | 1.57 | | |
| 3 | ∞ | | 0.60 | | 1.58000 |
| 4 | ∞ | | | | |

Aspherical data

Figure 20:
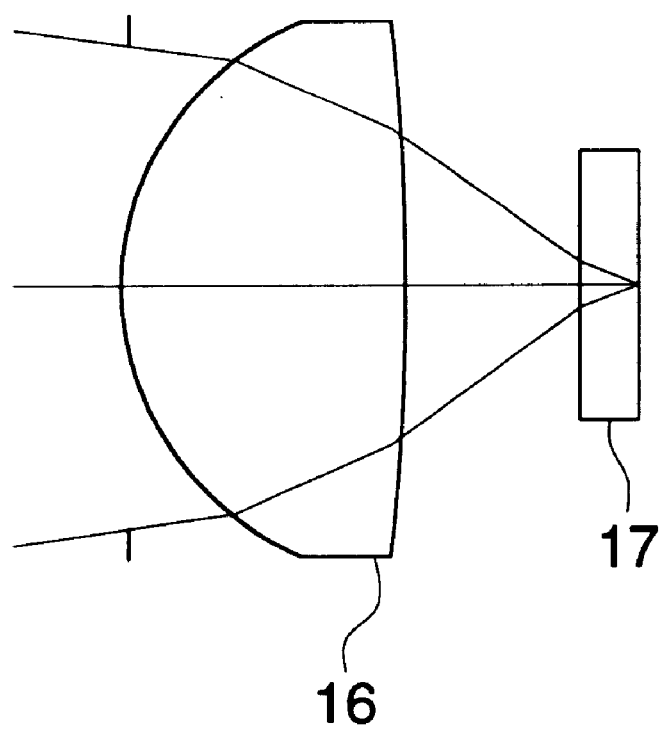
FIG. 20 is a diagram of an optical path in Example 8 of an objective lens in an optical system for recording and reproducing on an optical information recording medium of the invention.
Figure 21:
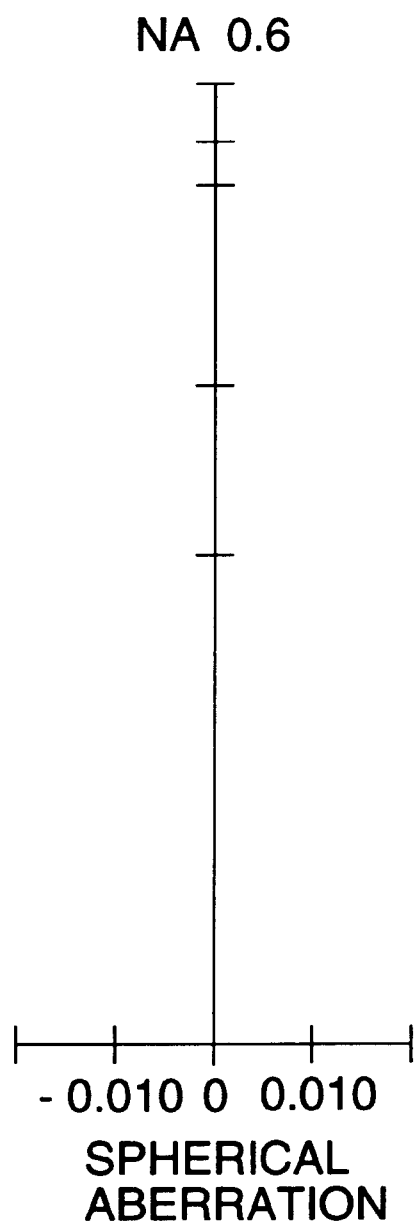
FIGS. 21(a) and 21(b) respectively represent a diagram of spherical aberration of the objective lens in aforesaid Example 8 and a diagram of offense against sine condition thereof.
Figure 21:
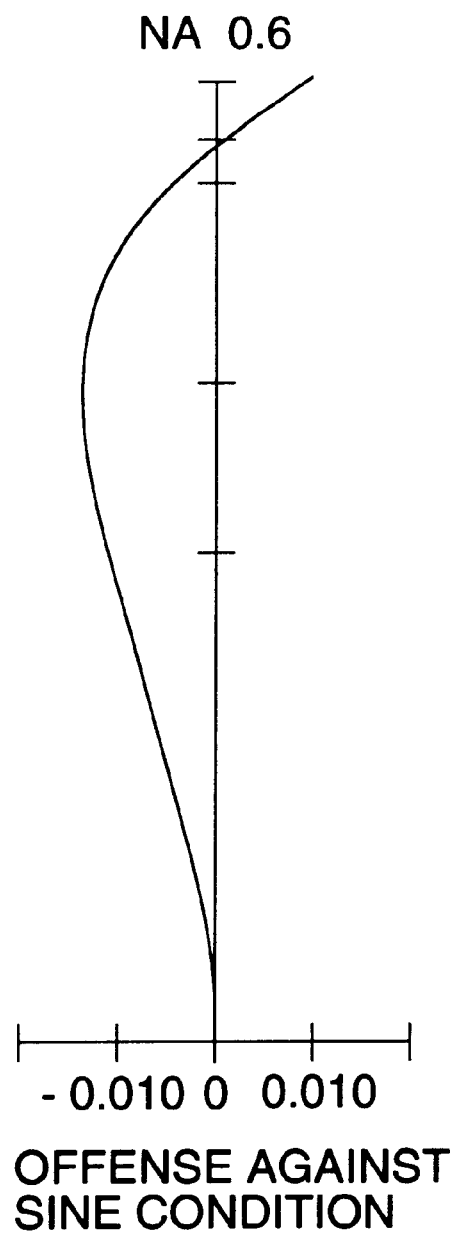
Figure 22:
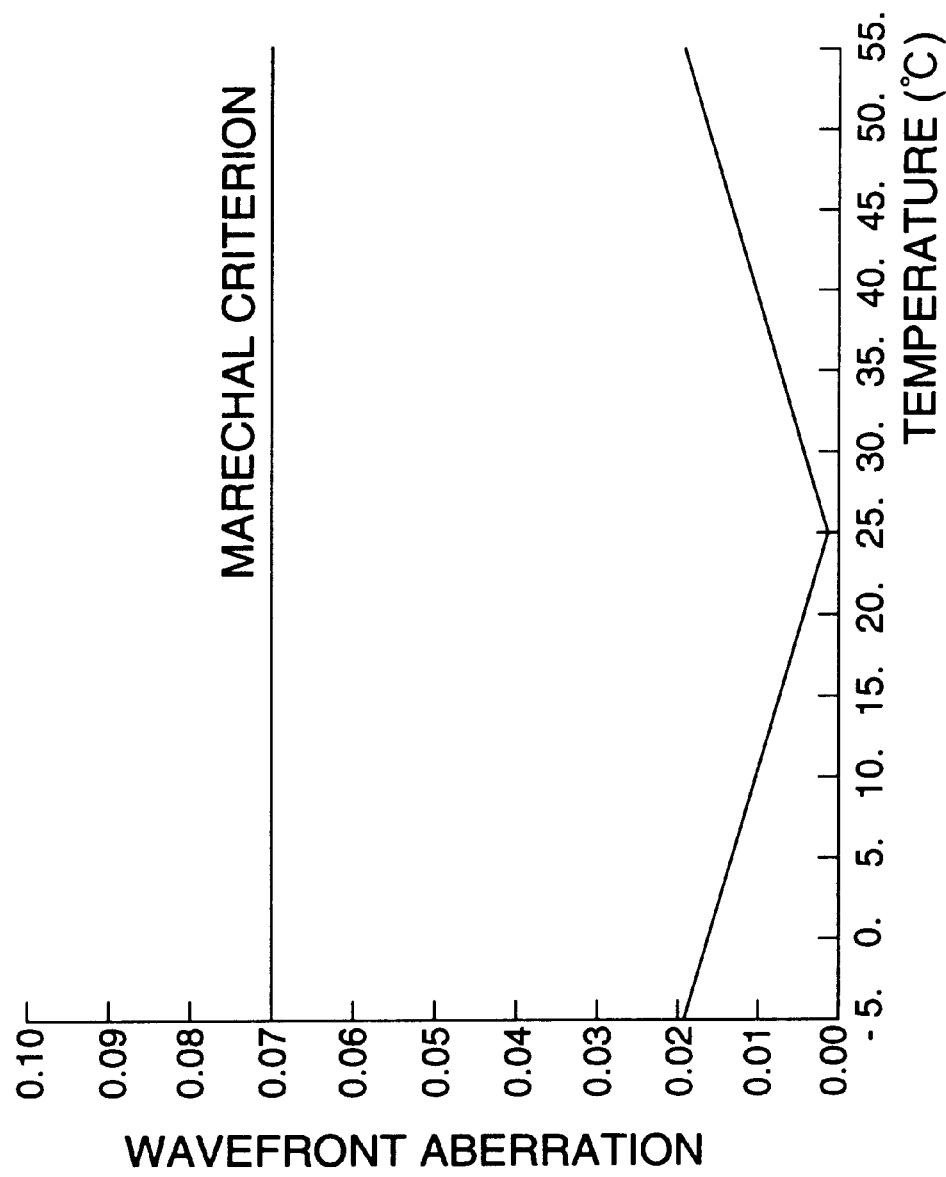
FIG. 22 is a diagram of temperature characteristics of the objective lens in aforesaid Example 8.

First surface $\kappa = -9.41850 \times 10^{-1}$
$A_1 = 5.48260 \times 10^{-3}$    $P_1 = 4.0000$
$A_2 = 2.30790 \times 10^{-4}$    $P_2 = 6.0000$
$A_3 = 2.16950 \times 10^{-5}$    $P_3 = 8.0000$
$A_4 = -2.43340 \times 10^{-6}$   $P_4 = 10.0000$ This example is only for objective lens 16, and the objective lens 16 is made of resin and its surface at the light source side is aspherical, while its surface at the image side is spherical. Its optical path is shown in FIG. 20, a diagram of its spherical aberration and a diagram of offense against sine condition thereof are shown respectively in FIG. 21(*a*) and FIG. 21(*b*), and temperature characteristics are shown in FIG. 22.

This example satisfies the following.

$x_2 = -0.029622$ $\Delta_2 = 0.00$ (because of a spherical surface)

$x_2 \cdot (n-1)/\{F \cdot (NA)^2\} = -0.00907$ $\Delta_2 \cdot (n-1)^3/\{F \cdot (NA)^4\} = 0.00$

EXAMPLE 9

Coupling lens

| | | | | | | | |
|---|---|---|---|---|---|---|---|
| Fc = | 15.117 | Mc = | −2.0 | Uc = | 68.664 | | |
| T = | −21.826 | $NA_0$: | 0.1 | λ = | 635 nm | | |
| i | | ri | | di | | ni | |
| 1 | | 19.564 | | 2.00 | | 1.49810 | |
| 2 | | −11.825 | | 44.838 | | | |

Aspherical data

First surface

κ = −4.50630

Second surface

κ = −8.10280 × $10^{-1}$
$A_1$ = 3.82380 × $10^{-5}$   $P_1$ = 4.0000

Overall optical system

| | | | | | | | | | |
|---|---|---|---|---|---|---|---|---|---|
| Ft = | 3.8011 | Mt = | −1/6 | M = | +1/12 | U = | 31.596 | | |
| T = | −21.826 | NA: | 0.6 | λ = | 635 nm | | | | |
| i | | ri | | di | | ni | | | |
| 1 | | 19.564 | | 2.00 | | 1.49810 | | | |
| 2 | | −11.825 | | 3.00 | | | | | |
| 3 | | 2.165 | | 2.60 | | 1.49810 | | | |
| 4 | | −8.480 | | 1.57 | | | | | |
| 5 | | ∞ | | 0.60 | | 1.58000 | | | |
| 6 | | ∞ | | | | | | | |

Aspherical data

First surface

κ = −4.50630

Second surface

κ = −8.10280 × $10^{-1}$
$A_1$ = 3.82380 × $10^{-5}$   $P_1$ = 4.0000

Third surface

κ = −8.36770 × $10^{-1}$
$A_1$ = 5.07210 × $10^{-3}$   $P_1$ = 4.0000
$A_2$ = 3.24900 × $10^{-4}$   $P_2$ = 6.0000
$A_3$ = 2.11340 × $10^{-5}$   $P_3$ = 8.0000
$A_4$ = −3.96600 × $10^{-6}$   $P_4$ = 10.0000

Fourth surface

κ = −2.25490 × 10
$A_1$ = 1.27980 × $10^{-2}$   $P_1$ = 4.0000
$A_2$ = −5.04840 × $10^{-3}$   $P_2$ = 6.0000
$A_3$ = 1.03830 × $10^{-3}$   $P_3$ = 8.0000
$A_4$ = −9.09990 × $10^{-5}$   $P_4$ = 10.0000

Figure 23:
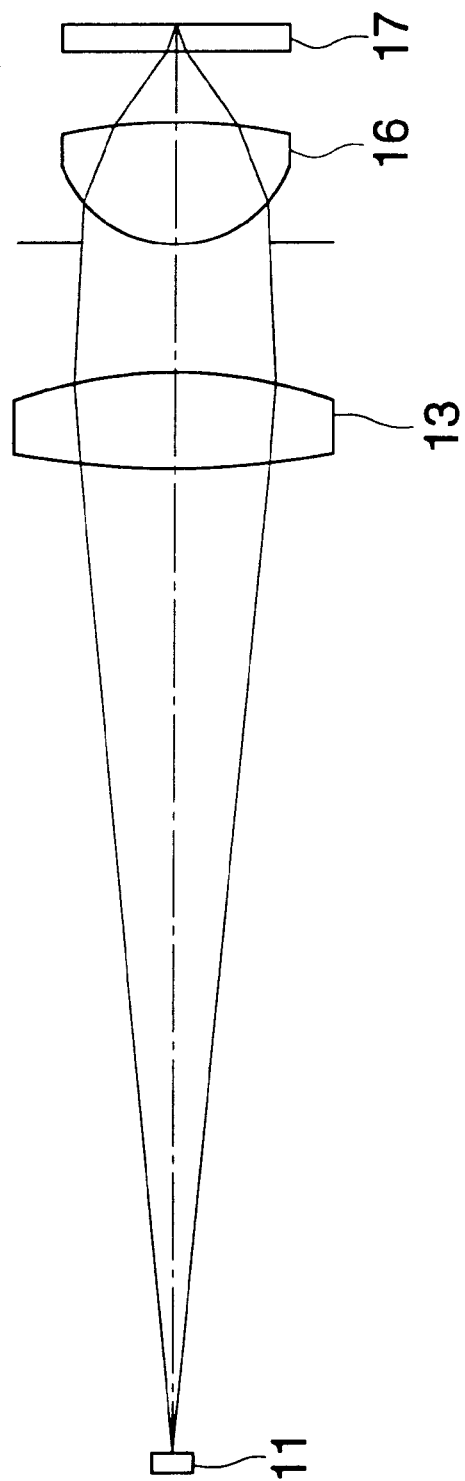
FIG. 23 is a diagram of an optical path in Example 9 of an optical system for recording and reproducing on an optical information recording medium of the invention.
Figure 24:
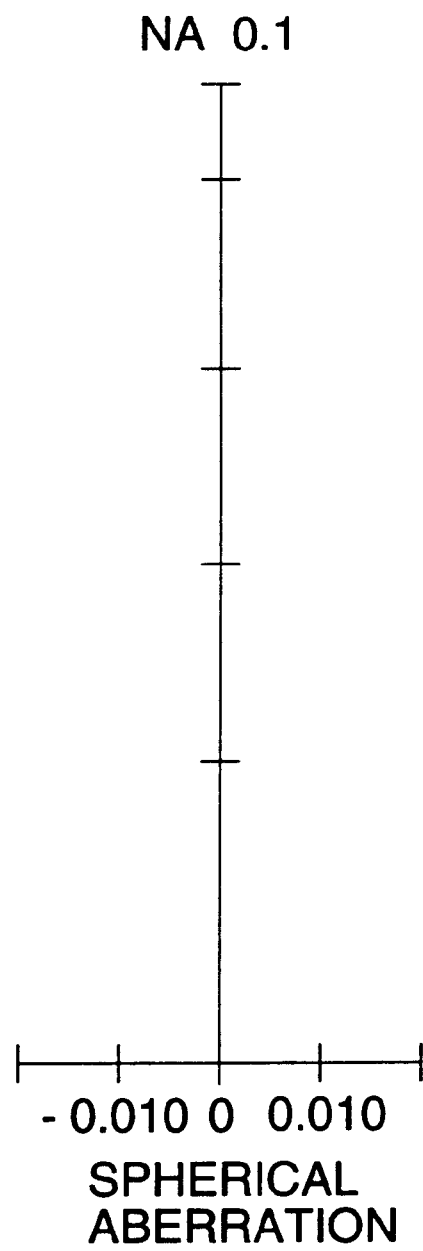
FIGS. 24(a) and 24(b) respectively represent a diagram of spherical aberration of the coupling lens in aforesaid Example 9 and a diagram of offense against sine condition thereof.
Figure 24:
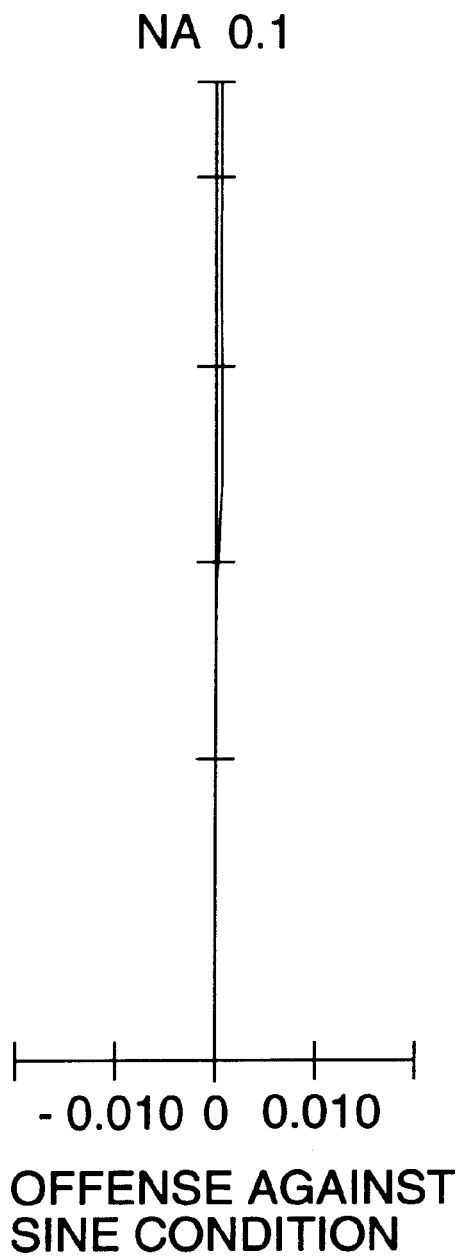
Figure 25:
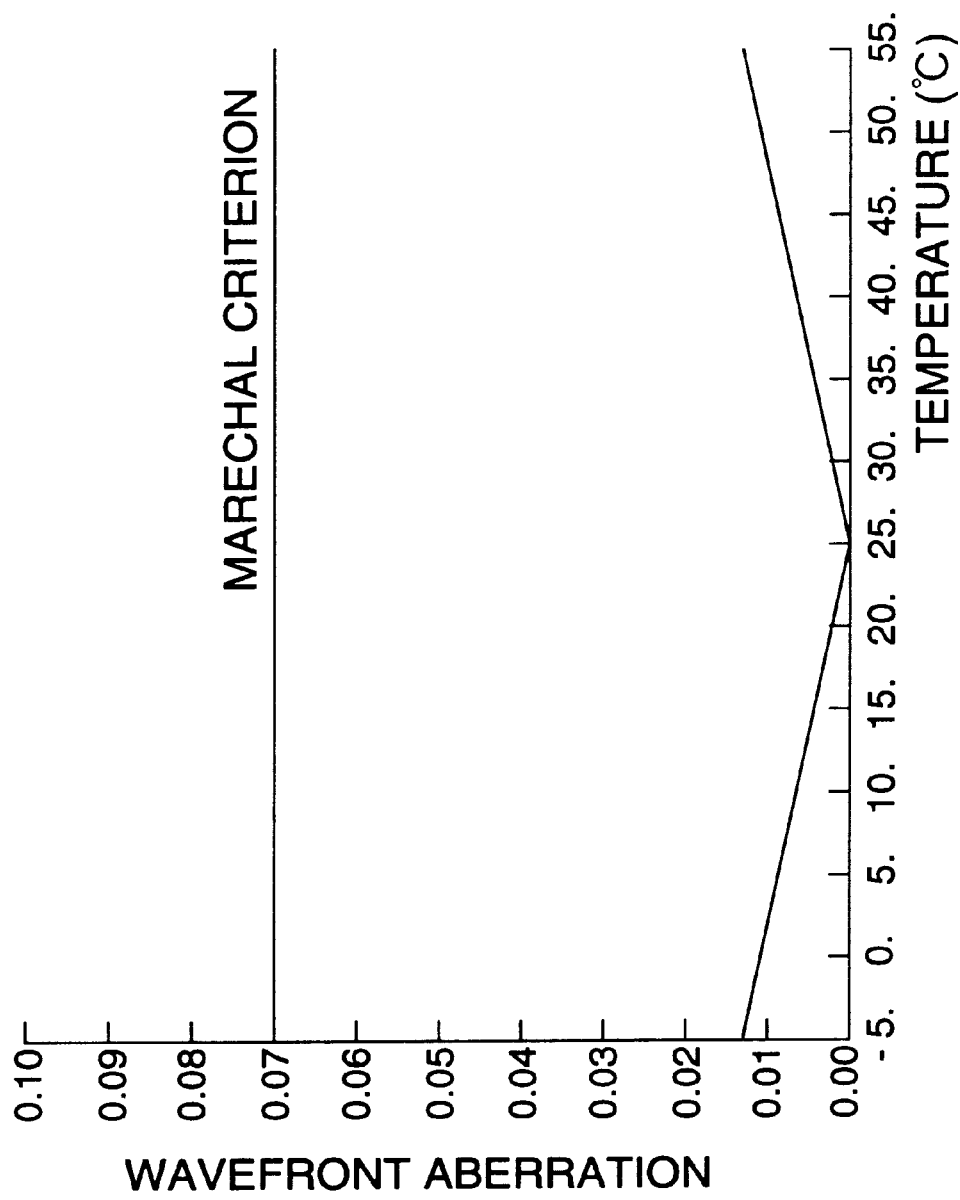
FIG. 25 is a diagram of temperature characteristics of the optical system in aforesaid Example 9.

In Example 9, coupling lens 16 is a bi-convex lens which is made of resin and its both surfaces are aspherical. Diagrams of aberration thereof are shown in FIGS. 24(a) and 24(b). Its spherical aberration and offense against sine condition are sufficiently satisfied. An objective lens combined with this coupling lens is a resin-made objective lens in Example 1, and an optical path of an overall optical system is shown in FIG. 23 and temperature characteristics are shown in FIG. 25.

This example satisfies the following;.

Dco=3

Mt·M·Fcp/F=−0.05569 wherein, Fc is equal to Fcp because the resin-made coupling lens is a single lens.

A change in wavefront aberration caused by a temperature change is 0.013 λ when a temperature rises from the standard design temperature by 30° C., which means that the change is as small as almost a half of that of an objective lens in Example 1. The reason for this is that an influence by that a temperature rise makes the refractive index of each lens to be lowered, then makes an angle of light converged by a coupling lens to be reduced and makes lateral magnification of an objective lens to be made small (in case of this influence only, spherical aberration of the objective lens becomes the under-correction) and an influence by that the refractive index of the objective lens itself is lowered (in this case, spherical aberration becomes the under-correction) offset each other.

EXAMPLE 10

Coupling lens

| | | | | | | | |
|---|---|---|---|---|---|---|---|
| Fc = | 17.450 | Mc = | −2.0 | Uc = | 79.165 | | |
| T = | −25.327 | NA: | 0.1 | λ = | 635 nm | | |
| i | | ri | | di | | ni | |
| 1 | | 22.683 | | 2.00 | | 1.49810 | |
| 2 | | −13.678 | | 51.838 | | | |

Aspherical data

First surface

κ = −4.34470

Second surface

κ = −7.48710 × $10^{-1}$
$A_1$ = 2.93000 × $10^{-5}$   $P_1$ = 4.0000

Overall optical system

| | | | | | | | | | |
|---|---|---|---|---|---|---|---|---|---|
| Ft = | 6.3705 | Mt = | −1/6 | M = | +1/12 | U = | 42.097 | | |
| T = | −25.327 | NA: | 0.6 | λ = | 635 nm | | | | |
| i | | ri | | di | | ni | | | |
| 1 | | 22.683 | | 2.00 | | 1.49810 | | | |
| 2 | | −13.678 | | 10.00 | | | | | |
| 3 | | 2.165 | | 2.60 | | 1.49810 | | | |
| 4 | | −8.480 | | 1.57 | | | | | |
| 5 | | ∞ | | 0.60 | | 1.58000 | | | |
| 6 | | ∞ | | | | | | | |

Aspherical data

First surface

κ = −4.34470

Second surface

κ = −7.48710 × $10^{-1}$
$A_1$ = 2.93000 × $10^{-5}$   $P_1$ = 4.0000

Third surface

κ = −8.36770 × $10^{-1}$
$A_1$ = 5.07210 × $10^{-3}$   $P_1$ = 4.0000
$A_2$ = 3.24900 × $10^{-4}$   $P_2$ = 6.0000
$A_3$ = 2.11340 × $10^{-5}$   $P_3$ = 8.0000
$A_4$ = −3.96600 × $10^{-6}$   $P_4$ = 10.0000

Fourth surface

κ = −2.25490 × 10
$A_1$ = 1.27980 × $10^{-2}$   $P_1$ = 4.0000
$A_2$ = −5.04840 × $10^{-3}$   $P_2$ = 6.0000
$A_3$ = 1.03830 × $10^{-3}$   $P_3$ = 8.0000
$A_4$ = −9.09990 × $10^{-5}$   $P_4$ = 10.0000

Figure 27A:
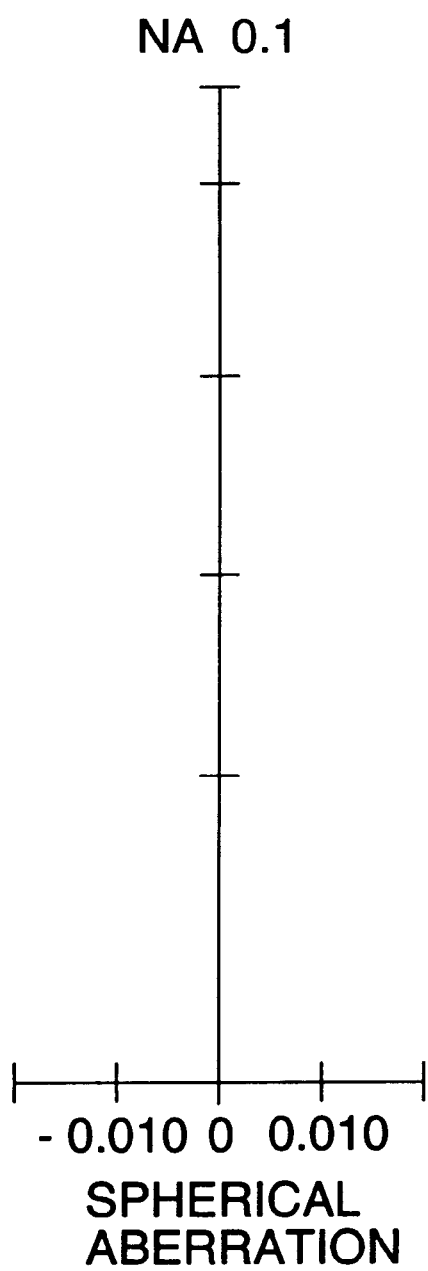
FIGS. 27(a) and 27(b) respectively represent a diagram of spherical aberration of the coupling lens in aforesaid Example 10 and a diagram of offense against sine condition thereof.
Figure 27B:
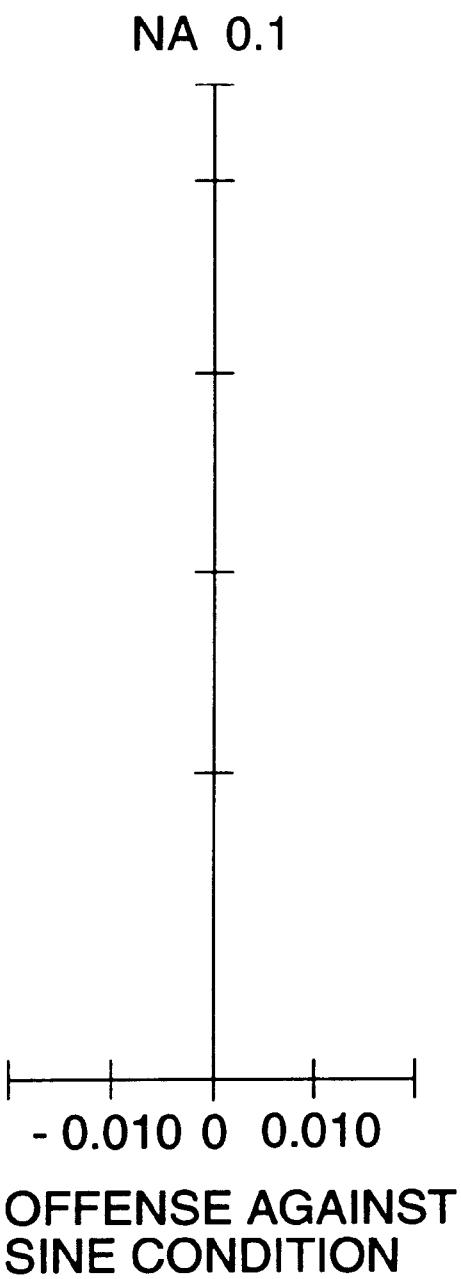

In Example 10, coupling lens 13 is a bi-convex lens which is made of resin and its both surfaces are aspherical, having magnification of Mc=−2.0 which is the same as that in Example 9. This is an example wherein a focal length is slightly longer, and its aberration diagrams are shown in FIGS. 27(a) and 27(b). Its spherical aberration and offense against sine condition are sufficiently satisfied.

Figure 26:
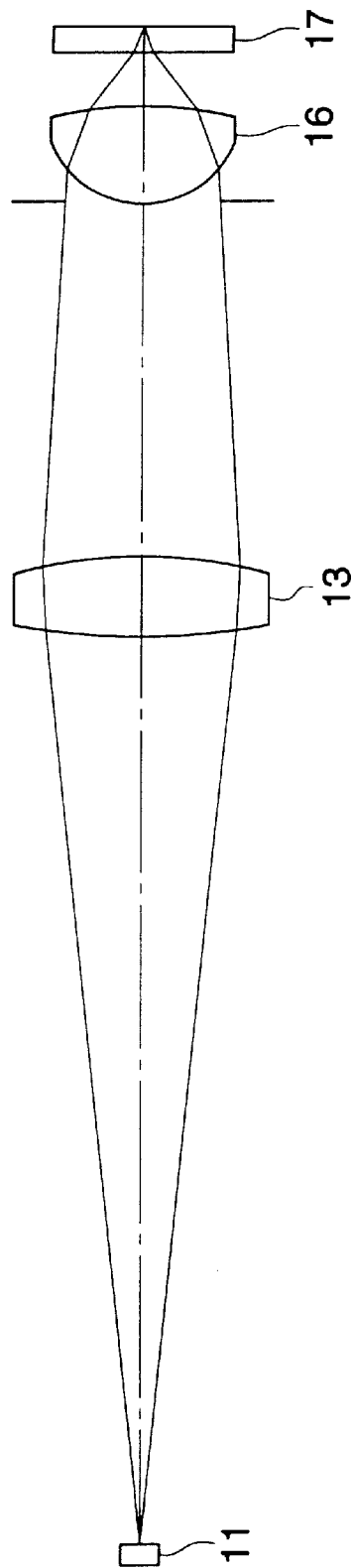
FIG. 26 is a diagram of an optical path in Example 10 of an objective lens in an optical system for recording and reproducing on an optical information recording medium of the invention.
Figure 28:
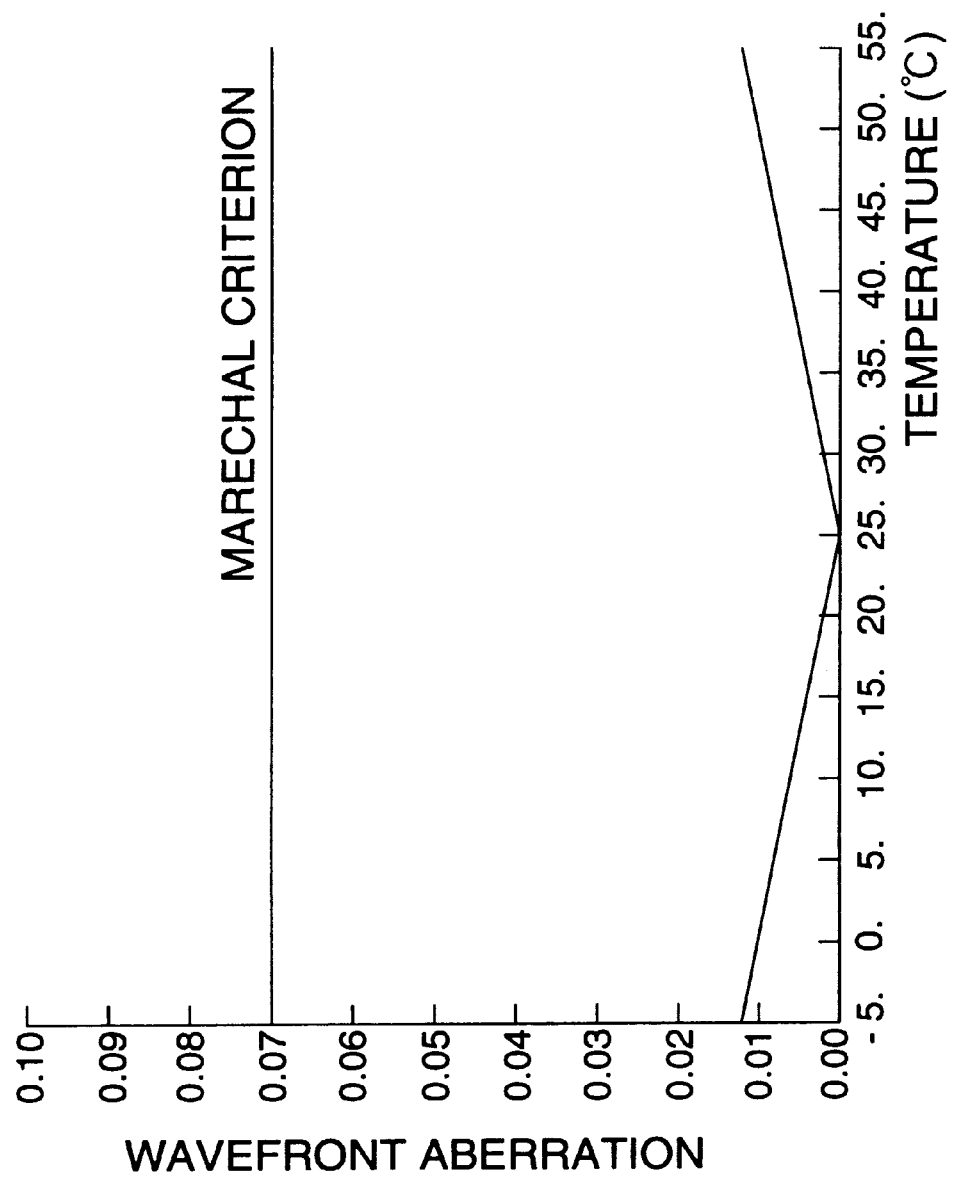
FIG. 28 is a diagram of temperature characteristics of the optical system in aforesaid Example 10.

An overall optical system is composed of a combination of this coupling lens and a resin-made objective lens in Example 1, and specifications of M and Mt are the same as those in Example 7 and Example 9, and a distance between the objective lens and the coupling lens is also the same as that in Example 7. Its optical path is shown in FIG. 26, and temperature characteristics are shown in FIG. 28.

This example satisfies the following;.

Dco=10

Mt·M·Fcp/F=−0.06429 wherein, Fc is equal to Fcp because the resin-made coupling lens is a single lens.

A change in wavefront aberration caused by a temperature change is 0.011 $\lambda$ when a temperature rises from the standard design temperature by 30° C., which is mostly the same as in Example 7 and is slightly smaller than in Example 9. The reason for this is that focal length Fc of the coupling lens is longer than in Example 9, and thereby an extent of reduction in an angle of light converged by the coupling lens caused by a temperature rise is greater.

EXAMPLE 11

| Coupling lens | | | | | | | |
|---|---|---|---|---|---|---|---|
| Fc = | 14.864 | Mc = | −2.0 | Uc = | 67.577 | | |
| T = | −20.739 | $NA_0$: | 0.1 | $\lambda$ = | 635 nm | | |
| i | ri | | di | | ni | | |
| 1 | −40.000 | | 2.00 | | 1.49810 | | |
| 2 | −6.351 | | 44.838 | | | | |

| Aspherical data |
|---|

| First surface | | | |
|---|---|---|---|
| $\kappa$ = | −4.45790 | | |
| $A_1$ = | $2.74370 \times 10^{-4}$ | $P_1$ = | 4.0000 |

| Second surface | | | |
|---|---|---|---|
| $\kappa$ = | −1.27670 | | |
| $A_1$ = | $-2.99160 \times 10^{-5}$ | $P_1$ = | 4.0000 |
| $A_2$ = | $2.54920 \times 10^{-6}$ | $P_2$ = | 6.0000 |
| $A_3$ = | $1.42550 \times 10^{-8}$ | $P_3$ = | 8.0000 |

| Overall optical system | | | | | | | |
|---|---|---|---|---|---|---|---|
| Ft = | 3.6150 | Mt = | −1/6 | M = | +1/12 | U = | 30.509 |
| T = | −20.739 | NA: | 0.6 | $\lambda$ = | 635 nm | | |
| i | ri | | di | | ni | | |
| 1 | −40.000 | | 2.00 | | 1.49810 | | |
| 2 | −6.351 | | 3.00 | | | | |
| 3 | 2.165 | | 2.60 | | 1.49810 | | |
| 4 | −8.480 | | 1.57 | | | | |
| 5 | ∞ | | 0.60 | | 1.58000 | | |
| 6 | ∞ | | | | | | |

| Aspherical data |
|---|

| First surface | | | |
|---|---|---|---|
| $\kappa$ = | −4.45790 | | |
| $A_1$ = | $2.74370 \times 10^{-4}$ | $P_1$ = | 4.0000 |

| Second surface | | | |
|---|---|---|---|
| $\kappa$ = | −1.27670 | | |
| $A_1$ = | $-2.99160 \times 10^{-5}$ | $P_1$ = | 4.0000 |
| $A_2$ = | $2.54920 \times 10^{-6}$ | $P_2$ = | 6.0000 |
| $A_3$ = | $1.42550 \times 10^{-8}$ | $P_3$ = | 8.0000 |

| Third surface | | | |
|---|---|---|---|
| $\kappa$ = | $-8.36770 \times 10^{-1}$ | | |
| $A_1$ = | $5.07210 \times 10^{-3}$ | $P_1$ = | 4.0000 |
| $A_2$ = | $3.24900 \times 10^{-4}$ | $P_2$ = | 6.0000 |
| $A_3$ = | $2.11340 \times 10^{-5}$ | $P_3$ = | 8.0000 |
| $A_4$ = | $-3.96600 \times 10^{-6}$ | $P_4$ = | 10.0000 |

-continued

| Fourth surface | | | |
|---|---|---|---|
| $\kappa$ = | $-2.25490 \times 10$ | | |
| $A_1$ = | $1.27980 \times 10^{-2}$ | $P_1$ = | 4.0000 |
| $A_2$ = | $-5.04840 \times 10^{-3}$ | $P_2$ = | 6.0000 |
| $A_3$ = | $1.03830 \times 10^{-3}$ | $P_3$ = | 8.0000 |
| $A_4$ = | $-9.09990 \times 10^{-5}$ | $P_4$ = | 10.0000 |

Figure 30:
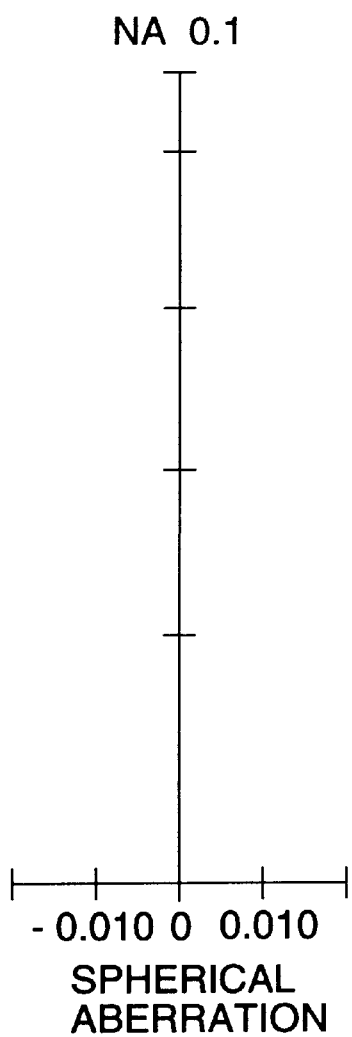
FIGS. 30(a) and 30(b) respectively represent a diagram of spherical aberration of the coupling lens in aforesaid Example 11 and a diagram of offense against sine condition thereof.
Figure 30:
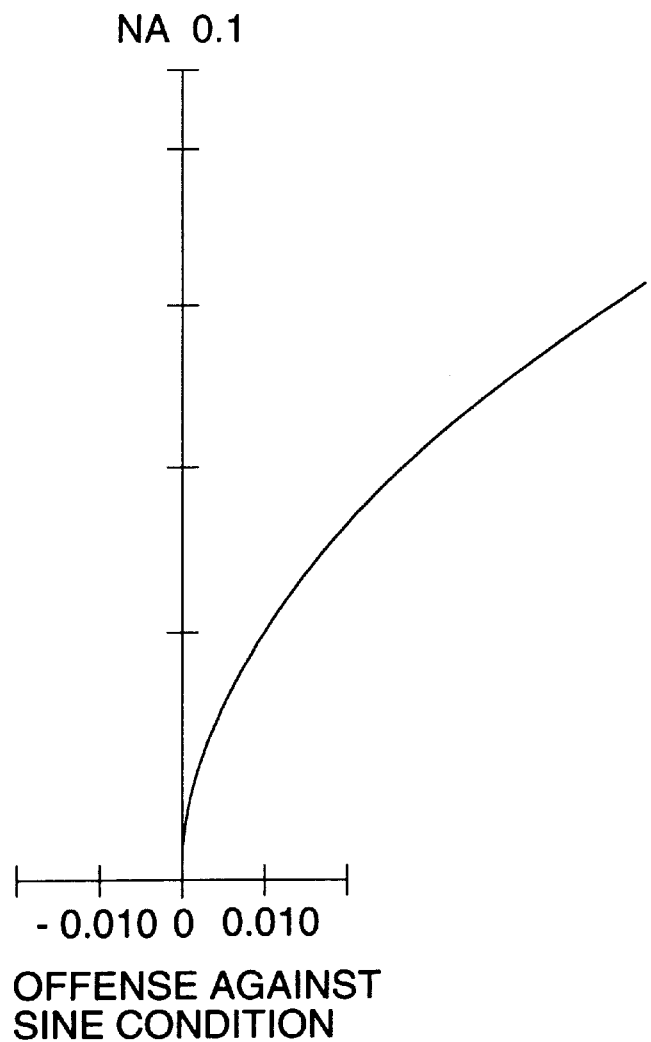

In Example 11, a coupling lens is a meniscus lens which is made of resin and its both surfaces are aspherical, and its surface at the light source side is concave. Its magnification Mc is equal to −2.0 which is the same as that in Example 9, and its aberration diagrams are shown in FIGS. 30(*a*) and 30(*b*). Its sine condition is over-corrected.

Figure 29:
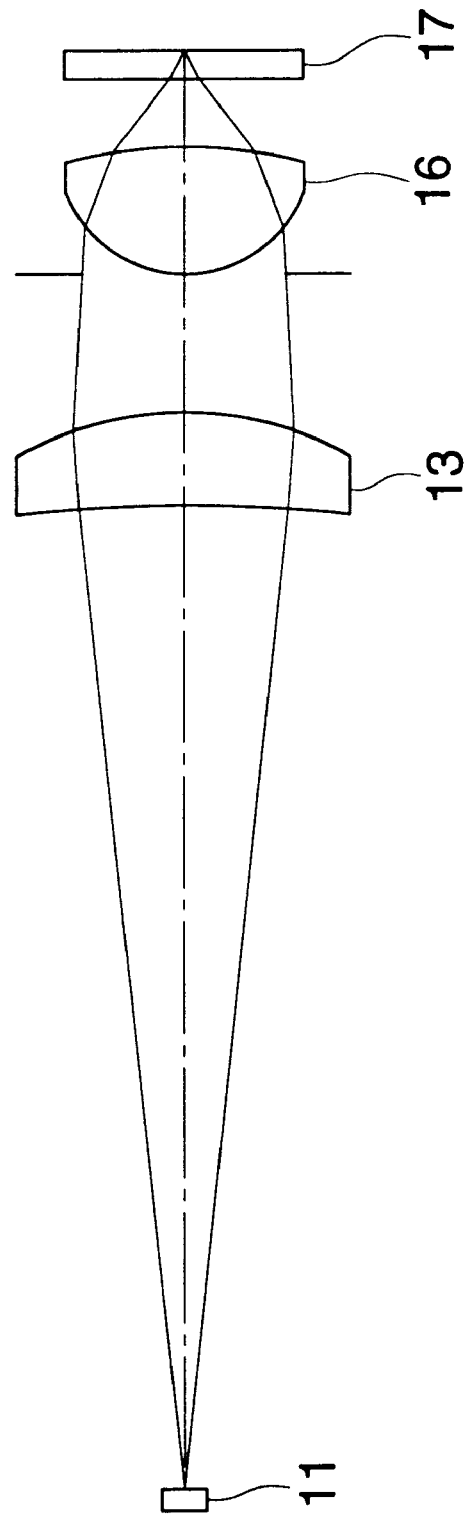
FIG. 29 is a diagram of an optical path in Example 11 of an optical system for recording and reproducing on an optical information recording medium of the invention.
Figure 31:
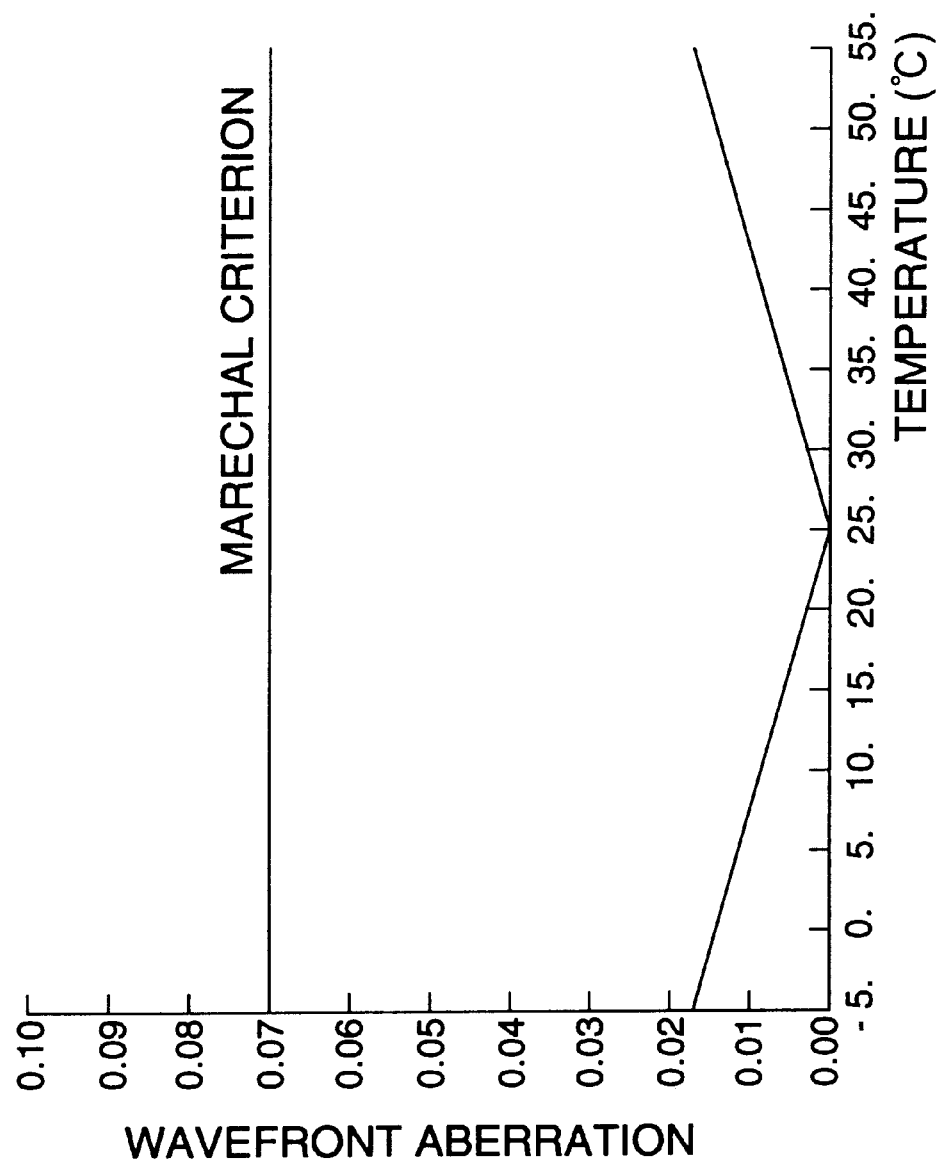
FIG. 31 is a diagram of temperature characteristics of the optical system in aforesaid Example 11.

An overall optical system is composed of a combination of this coupling lens and a resin-made objective lens in Example 1, and specifications of M and Mt are the same as those in Example 9, and distance Dco between the objective lens and the coupling lens is also the same as that in Example 9. Its optical path is shown in FIG. 29, and temperature characteristics are shown in FIG. 31.

This example satisfies the following;.

Dco=3

Mt·M·Fcp/F=−0.05476 wherein, Fc is equal to Fcp because the resin-made coupling lens is a single lens.

A change in wavefront aberration caused by a temperature change is 0.016 $\lambda$ when a temperature rises from the standard design temperature by 30° C., which is slightly bigger than Example 9 wherein specifications are mostly the same, and an object-image distance is shorter. The reason for this is that the position of a principal point of the coupling lens is closer to the objective lens compared with Example 9 where the coupling lens is a bi-convex coupling lens, because of the meniscus lens where the surface at the light source side of the coupling lens is concave.

EXAMPLE 12

| Coupling lens | | | | | | | |
|---|---|---|---|---|---|---|---|
| Fc = | 15.479 | Mc = | −2.0 | Uc = | 70.351 | | |
| T = | −23.513 | $NA_0$: | 0.1 | $\lambda$ = | 635 nm | | |
| i | ri | | di | | ni | | |
| 1 | 6.438 | | 2.00 | | 1.49810 | | |
| 2 | 35.000 | | 44.838 | | | | |

| Aspherical data |
|---|

| First surface | | | |
|---|---|---|---|
| $\kappa$ = | −2.50830 | | |
| $A_1$ = | $1.45610 \times 10^{-3}$ | $P_1$ = | 4.0000 |

| Second surface | | | |
|---|---|---|---|
| $\kappa$ = | $-8.15100 \times 10^{-1}$ | | |
| $A_1$ = | $1.03270 \times 10^{-3}$ | $P_1$ = | 4.0000 |
| $A_2$ = | $1.61260 \times 10^{-5}$ | $P_2$ = | 6.0000 |
| $A_3$ = | $-5.04670 \times 10^{-7}$ | $P_3$ = | 8.0000 |

-continued

Overall optical system

| Ft = | 4.0894 | Mt = | −1/6 | M = | +1/12 | U = | 33.283 |
|------|--------|------|------|-----|-------|-----|--------|
| T = | −23.513 | NA: | 0.6 | λ = | 635 nm | | |
| i | | ri | | di | | ni | |
| 1 | | 6.438 | | 2.00 | | 1.49810 | |
| 2 | | 35.000 | | 3.00 | | | |
| 3 | | 2.165 | | 2.60 | | 1.49810 | |
| 4 | | −8.480 | | 1.57 | | | |
| 5 | | ∞ | | 0.60 | | 1.58000 | |
| 6 | | ∞ | | | | | |

Aspherical data

First surface

| κ = | −2.50830 | | |
|-----|----------|-----|--------|
| $A_1$ = | $1.45610 \times 10^{-3}$ | $P_1$ = | 4.0000 |

Second surface

| κ = | $-8.15100 \times 10^{-1}$ | | |
|-----|--------|-----|--------|
| $A_1$ = | $1.03270 \times 10^{-3}$ | $P_1$ = | 4.0000 |
| $A_2$ = | $1.61260 \times 10^{-5}$ | $P_2$ = | 6.0000 |
| $A_3$ = | $-5.04670 \times 10^{-7}$ | $P_3$ = | 8.0000 |

Third surface

| κ = | $-8.36770 \times 10^{-1}$ | | |
|-----|--------|-----|--------|
| $A_1$ = | $5.07210 \times 10^{-3}$ | $P_1$ = | 4.0000 |
| $A_2$ = | $3.24900 \times 10^{-4}$ | $P_2$ = | 6.0000 |
| $A_3$ = | $2.11340 \times 10^{-5}$ | $P_3$ = | 8.0000 |
| $A_4$ = | $-3.96600 \times 10^{-6}$ | $P_4$ = | 10.0000 |

Fourth surface

| κ = | $-2.25490 \times 10$ | | |
|-----|--------|-----|--------|
| $A_1$ = | $1.27980 \times 10^{-2}$ | $P_1$ = | 4.0000 |
| $A_2$ = | $-5.04840 \times 10^{-3}$ | $P_2$ = | 6.0000 |
| $A_3$ = | $1.03830 \times 10^{-3}$ | $P_3$ = | 8.0000 |
| $A_4$ = | $-9.09990 \times 10^{-5}$ | $P_4$ = | 10.0000 |

Figure 33A:
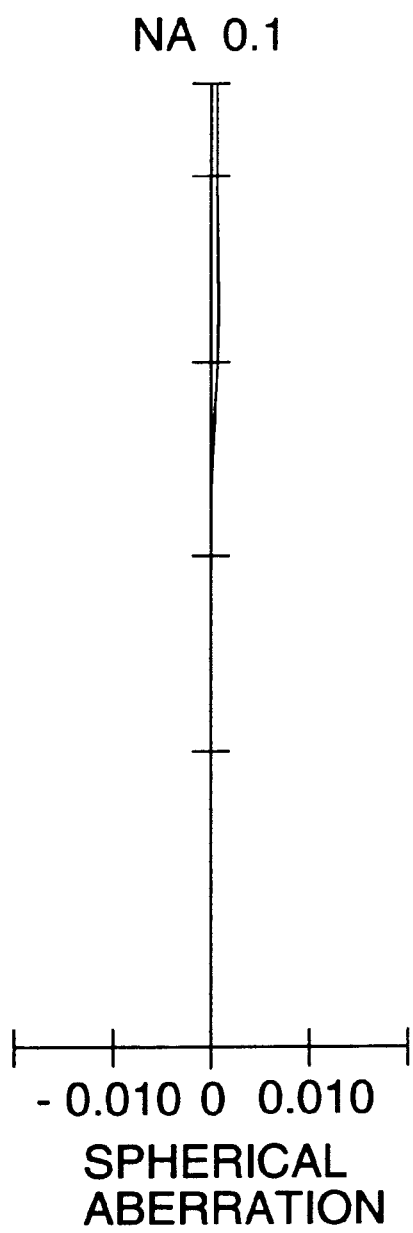
FIGS. 33(a) and 33(b) respectively represent a diagram of spherical aberration of the coupling lens in aforesaid Example 12 and a diagram of offense against sine condition thereof.
Figure 33B:
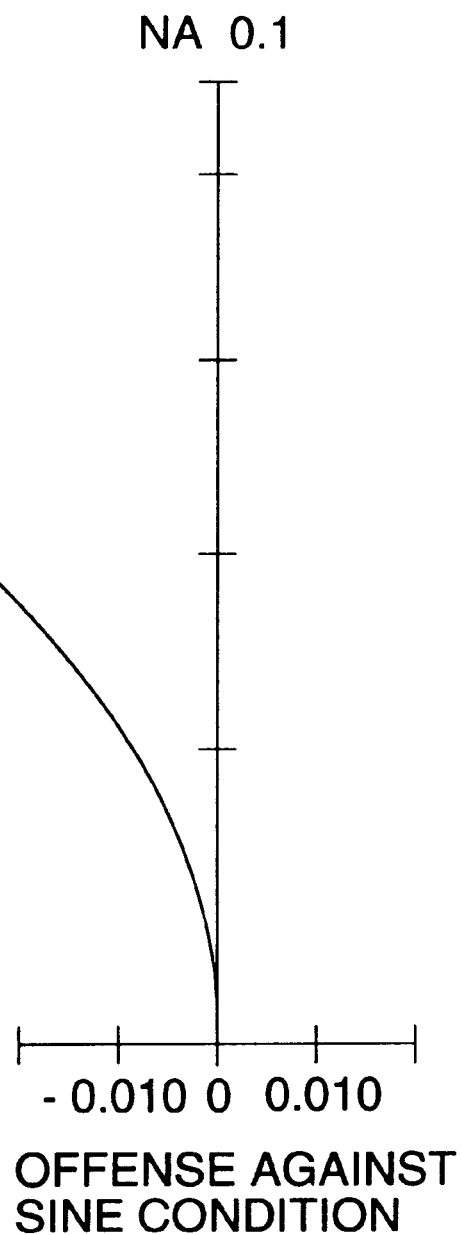

In Example 12, a coupling lens is a meniscus lens which is made of resin and its both surfaces are aspherical, and its surface at the light source side is concave. Its magnification Mc is equal to −2.0 which is the same as that in Example 9, and its aberration diagrams are shown in FIGS. 33(*a*) and 33(*b*). Its sine condition is under-corrected.

Figure 32:
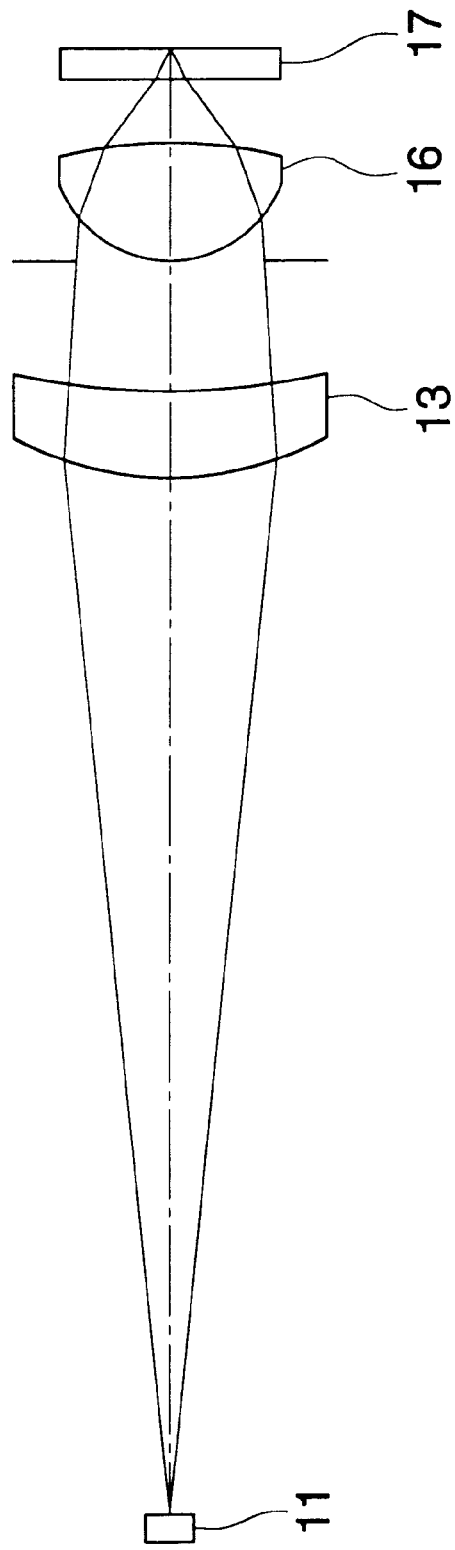
FIG. 32 is a diagram of an optical path in Example 12 of an optical system for recording and reproducing on an optical information recording medium of the invention.
Figure 34:
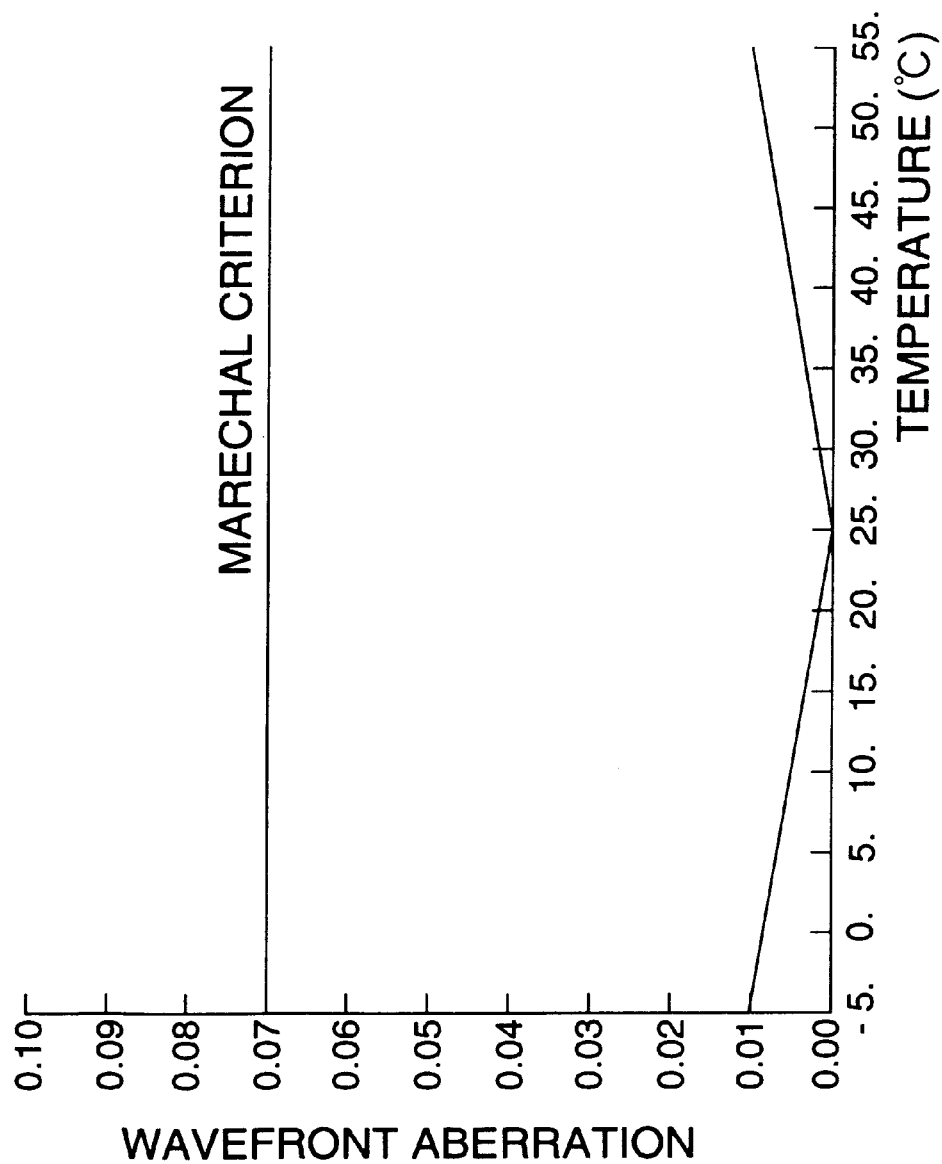
FIG. 34 is a diagram of temperature characteristics of the optical system in aforesaid Example 12.

An overall optical system is composed of a combination of this coupling lens and a resin-made objective lens in Example 1, and specifications of M and Mt are the same as those in Example 9, and distance Dco between the objective lens and the coupling lens is also the same as that in Example 9. Its optical path is shown in FIG. 32, and temperature characteristics are shown in FIG. 34.

This example satisfies the following;.

Dco=3

Mt·M·Fcp/F=−0.05703 wherein, Fc is equal to Fcp because the resin-made coupling lens is a single lens.

A change in wavefront aberration caused by a temperature change is 0.010 λ when a temperature rises from the standard design temperature by 30° C., which is slightly smaller than Example 9 wherein specifications are mostly the same. The reason for this is that the position of a principal point of the coupling lens is closer to the light source compared with Example 9 where the coupling lens is bi-convex coupling lens, because of the meniscus lens where the surface at the light source side of the coupling lens is concave, and thereby focal length Fc of the coupling lens is made longer.

EXAMPLE 13

Coupling lens

| Fc = 14.963 | | Mc = −2.0 | | Uc = 67.994 |
|-------|-----|-------|-----|-------|
| T = −21.156 | | $NA_0$: 0.1 | | λ = 635 nm |
| i | ri | | di | ni |
| 1 | 196.414 | | 2.00 | 1.49810 |
| 2 | −7.721 | | 44.838 | |

Aspherical data

Second surface

| κ = | $-8.15760 \times 10^{-1}$ | | |
|-----|--------|-----|--------|
| $A_1$ = | $3.11570 \times 10^{-5}$ | $P_1$ = | 4.0000 |

Overall optical system

| Ft = 3.686 | Mt = −1/6 | M = +1/12 | U = 30.926 |
|-------|-------|-------|-------|
| T = −21.156 | NA: 0.6 | λ = 635 mm | |
| i | ri | di | ni |
| 1 | 196.414 | 2.00 | 1.49810 |
| 2 | −7.721 | 3.00 | |
| 3 | 2.165 | 2.60 | 1.49810 |
| 4 | −8.480 | 1.57 | |
| 5 | ∞ | 0.60 | 1.58000 |
| 6 | ∞ | | |

Aspherical data

Second surface

| κ = | $-8.15760 \times 10^{-1}$ | | |
|-----|--------|-----|--------|
| $A_1$ = | $3.11570 \times 10^{-5}$ | $P_1$ = | 4.0000 |

Third surface

| κ = | $-8.36770 \times 10^{-1}$ | | |
|-----|--------|-----|--------|
| $A_1$ = | $5.07210 \times 10^{-3}$ | $P_1$ = | 4.0000 |
| $A_1$ = | $3.24900 \times 10^{-4}$ | $P_2$ = | 6.0000 |
| $A_3$ = | $2.11340 \times 10^{-5}$ | $P_3$ = | 8.0000 |
| $A_4$ = | $-3.96600 \times 10^{-6}$ | $P_4$ = | 10.0000 |

Fourth surface

| κ = | $-2.25490 \times 10^{-1}$ | | |
|-----|--------|-----|--------|
| $A_1$ = | $1.27980 \times 10^{2}$ | $P_1$ = | 4.0000 |
| $A_1$ = | $-5.04840 \times 10^{-3}$ | $P_2$ = | 6.0000 |
| $A_3$ = | $1.03830 \times 10^{-3}$ | $P_3$ = | 8.0000 |
| $A_4$ = | $-9.09990 \times 10^{-5}$ | $P_4$ = | 10.0000 |

Figure 36:
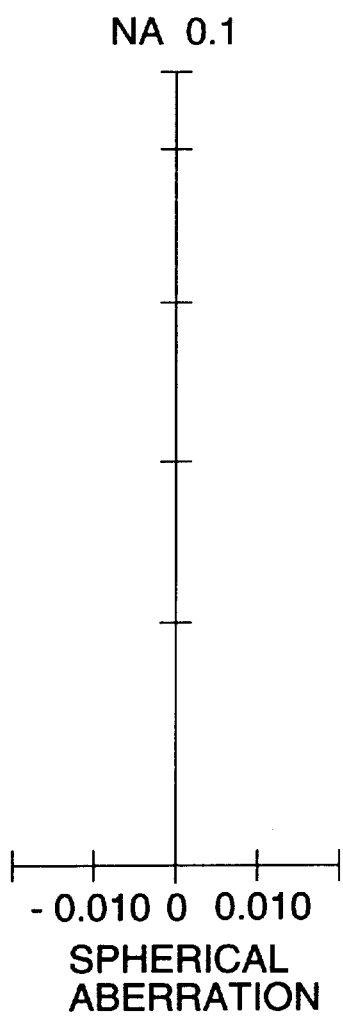
FIGS. 36(a) and 36(b) respectively represent a diagram of spherical aberration of the coupling lens in aforesaid Example 13 and a diagram of offense against sine condition thereof.
Figure 36:
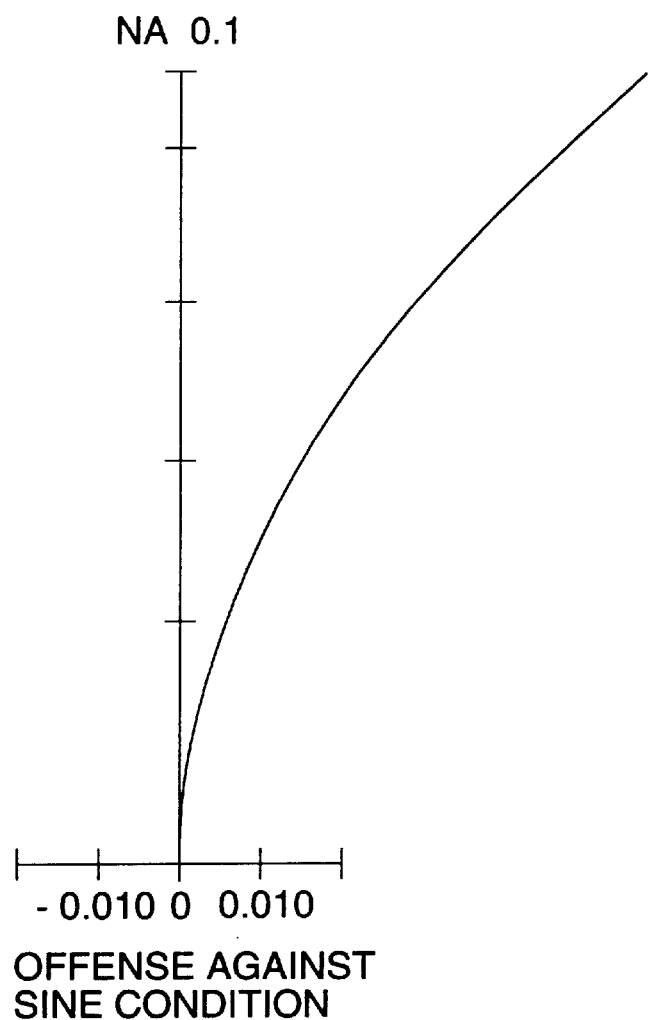

In Example 13, a coupling lens is a bi-convex lens which is made of resin and its surface at the light source side is aspherical, and its surface at the image side is spherical, ant its magnification of Mc=−2.0 is the same as that in Example 9. Its aberration diagrams are shown in FIGS. 36(*a*) and 36(*b*) and its offense against sine condition is over-corrected.

Figure 35:
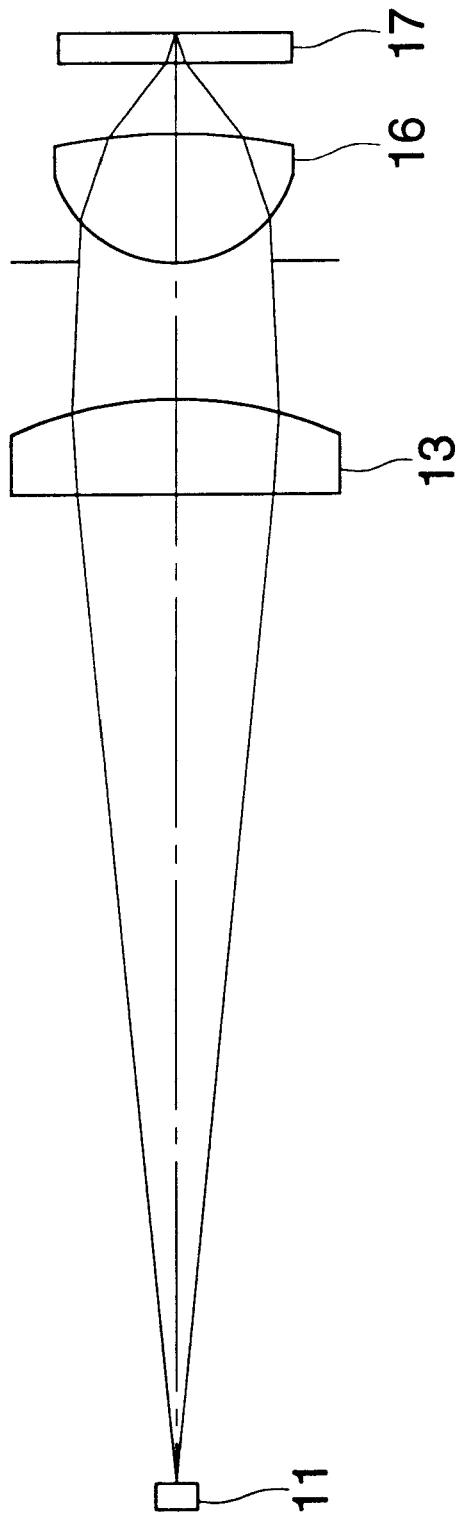
FIG. 35 is a diagram of an optical path in Example 13 of an objective lens in an optical system for recording and reproducing on an optical information recording medium of the invention.
Figure 37:
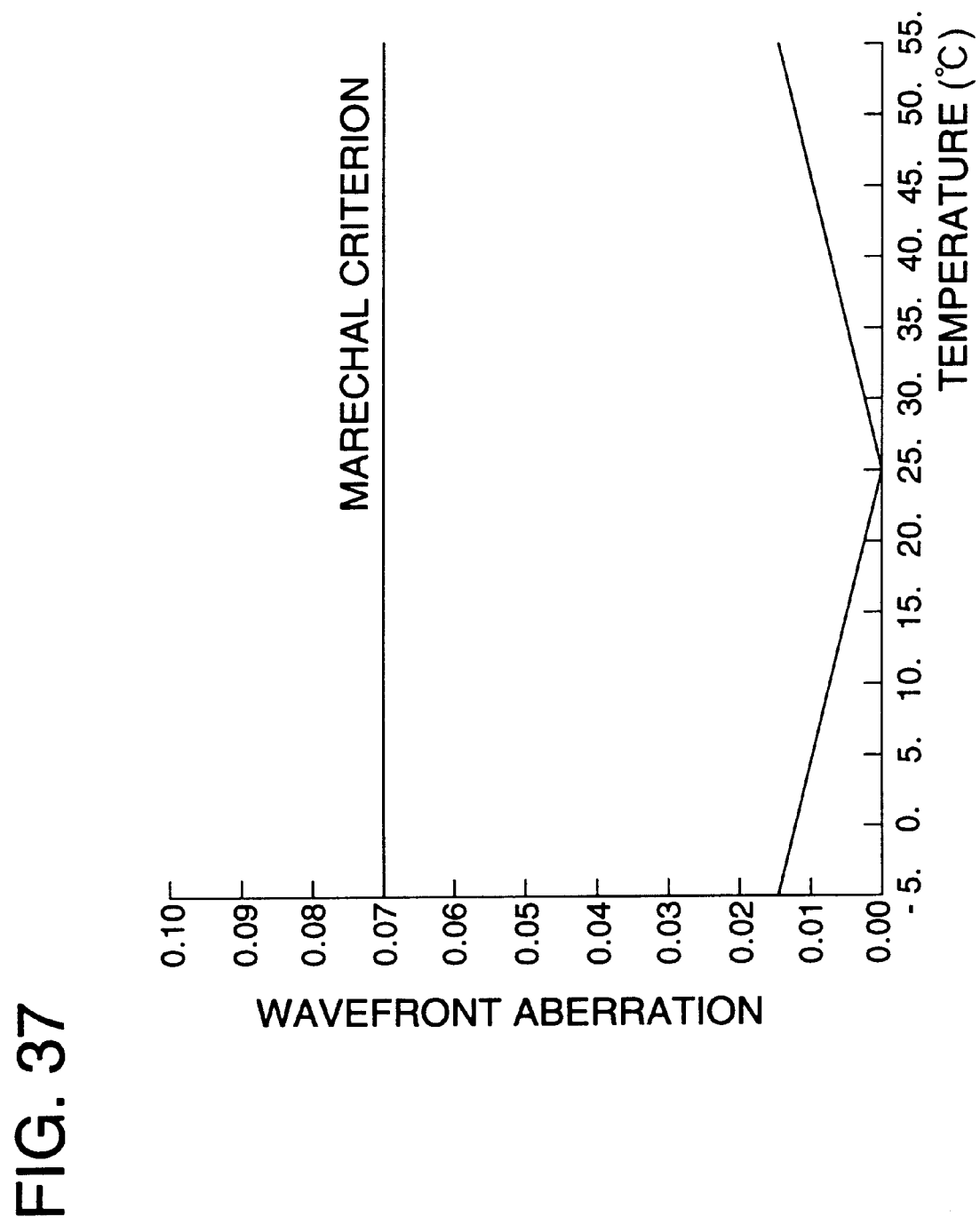
FIG. 37 is a diagram of temperature characteristics of the optical system in aforesaid Example 13.

An overall optical system is composed of a combination of this coupling lens and a resin-made objective lens in Example 1, and magnifications M and Mt are the same as in Example 9, and a distance Dco between the objective lens and the coupling lens is also the same as in Example 9. Its optical path is shown in FIG. 35, and temperature characteristics are shown in FIG. 37.

This example satisfies the following;.

Dco=3

Mt·M·Fcp/F=−0.05512 wherein, Fc is equal to Fcp because the resin-made coupling lens is a single lens.

A change in wavefront aberration caused by a temperature change is 0.015 λ when a temperature rises from the standard design temperature by 30° C.

EXAMPLE 14

Coupling lens

Fc = 9.047     Mc = −4.0     Uc = 57.166
T = −10.328    $NA_0$: 0.2     λ = 635 nm

| i | ri | di | ni |
|---|---|---|---|
| 1 | 15.135 | 2.00 | 1.49810 |
| 2 | −6.135 | 44.838 | |

Aspherical data

First surface

κ = −9.28300

Second surface

κ = −9.65600 × $10^{-1}$
$A_1$ = −1.76460 × $10^{-5}$    $P_1$ = 4.0000
$A_2$ = 6.69660 × $10^{-7}$     $P_2$ = 6.0000

Overall optical system

Ft = 3.774     Mt = −1/3     M = +1/12     U = 20.098
T = −10.328    NA: 0.6       λ = 635 nm

| i | ri | di | ni |
|---|---|---|---|
| 1 | 15.135 | 2.00 | 1.49810 |
| 2 | −6.135 | 3.00 | |
| 3 | 2.165 | 2.60 | 1.49810 |
| 4 | −8.480 | 1.57 | |
| 5 | ∞ | 0.60 | 1.58000 |
| 6 | ∞ | | |

Aspherical data

First surface

κ = −9.28300

Second surface

κ = −9.65600 × $10^{-1}$
$A_1$ = −1.76460 × $10^{-5}$    $P_1$ = 4.0000
$A_2$ = 6.69660 × $10^{-7}$     $P_2$ = 6.0000

Third surface

κ = −8.36770 × $10^{-1}$
$A_1$ = 5.07210 × $10^{-3}$     $P_1$ = 4.0000
$A_2$ = 3.24900 × $10^{-4}$     $P_2$ = 6.0000
$A_3$ = 2.11340 × $10^{-5}$     $P_3$ = 8.0000
$A_4$ = −3.96600 × $10^{-6}$    $P_4$ = 10.0000

Fourth surface

κ = −2.25490 × 10
$A_1$ = 1.27980 × $10^{-2}$     $P_1$ = 4.0000
$A_2$ = −5.04840 × $10^{-3}$    $P_2$ = 6.0000
$A_3$ = 1.03830 × $10^{-3}$     $P_3$ = 8.0000
$A_4$ = −9.09990 × $10^{-5}$    $P_4$ = 10.0000

Figure 39:
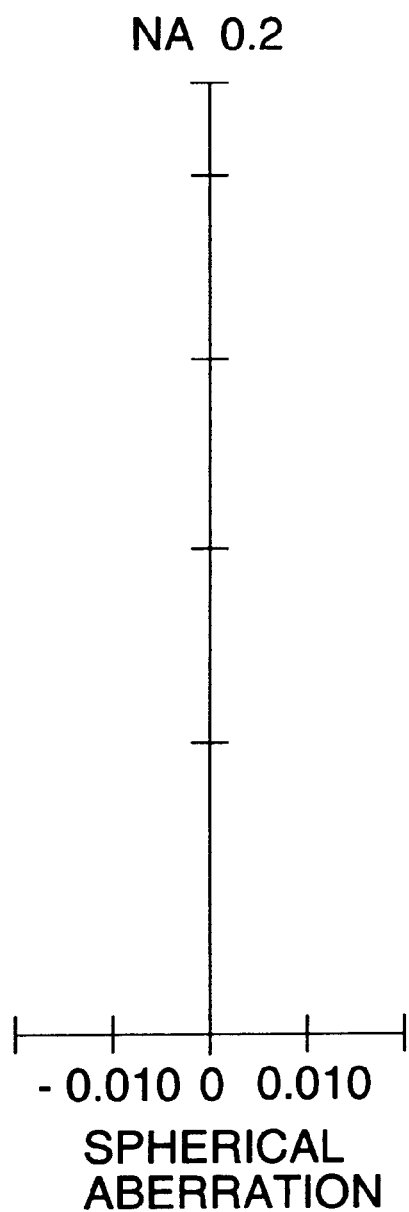
FIGS. 39(a) and 39(b) respectively represent a diagram of spherical aberration of the coupling lens in aforesaid Example 14 and a diagram of offense against sine condition thereof.
Figure 39:
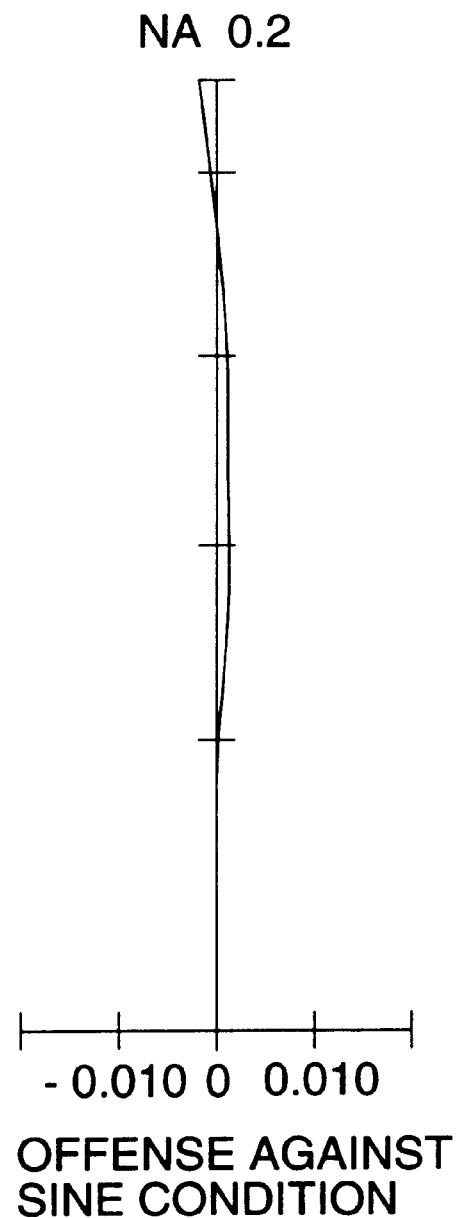

In Example 14, a coupling lens is a bi-convex lens which is made of resin and its both surfaces are aspherical, and its aberration diagrams are shown in FIGS. 39(a) and 39(b).

Figure 38:
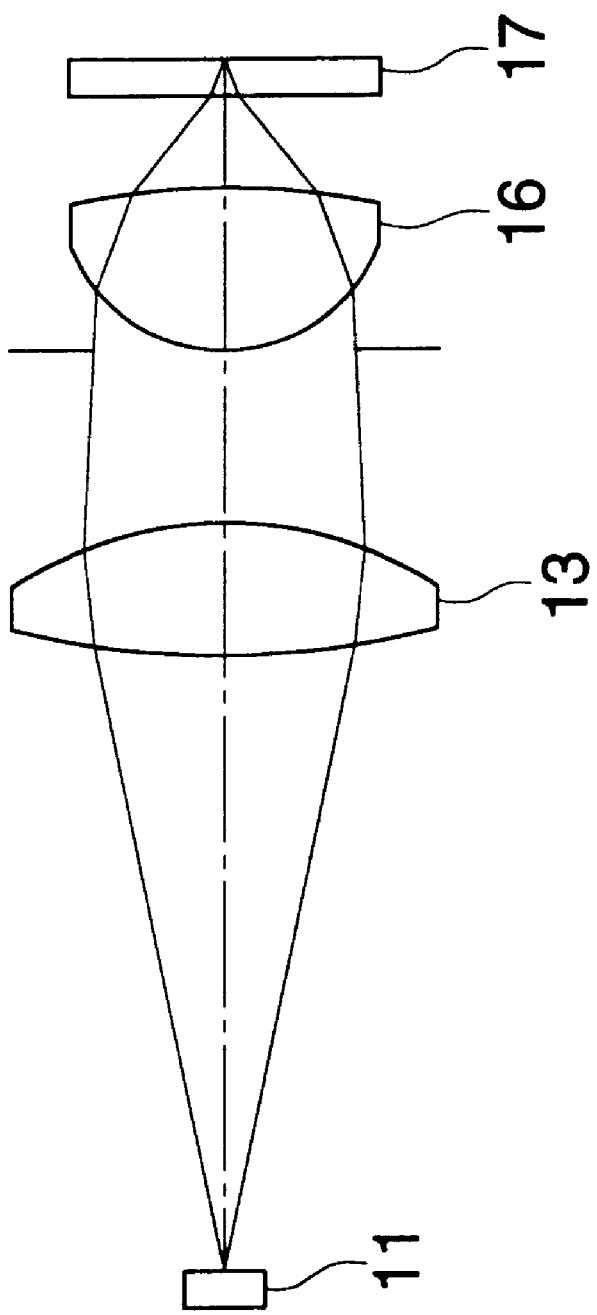
FIG. 38 is a diagram of an optical path in Example 14 of an optical system for recording and reproducing on an optical information recording medium of the invention.
Figure 40:
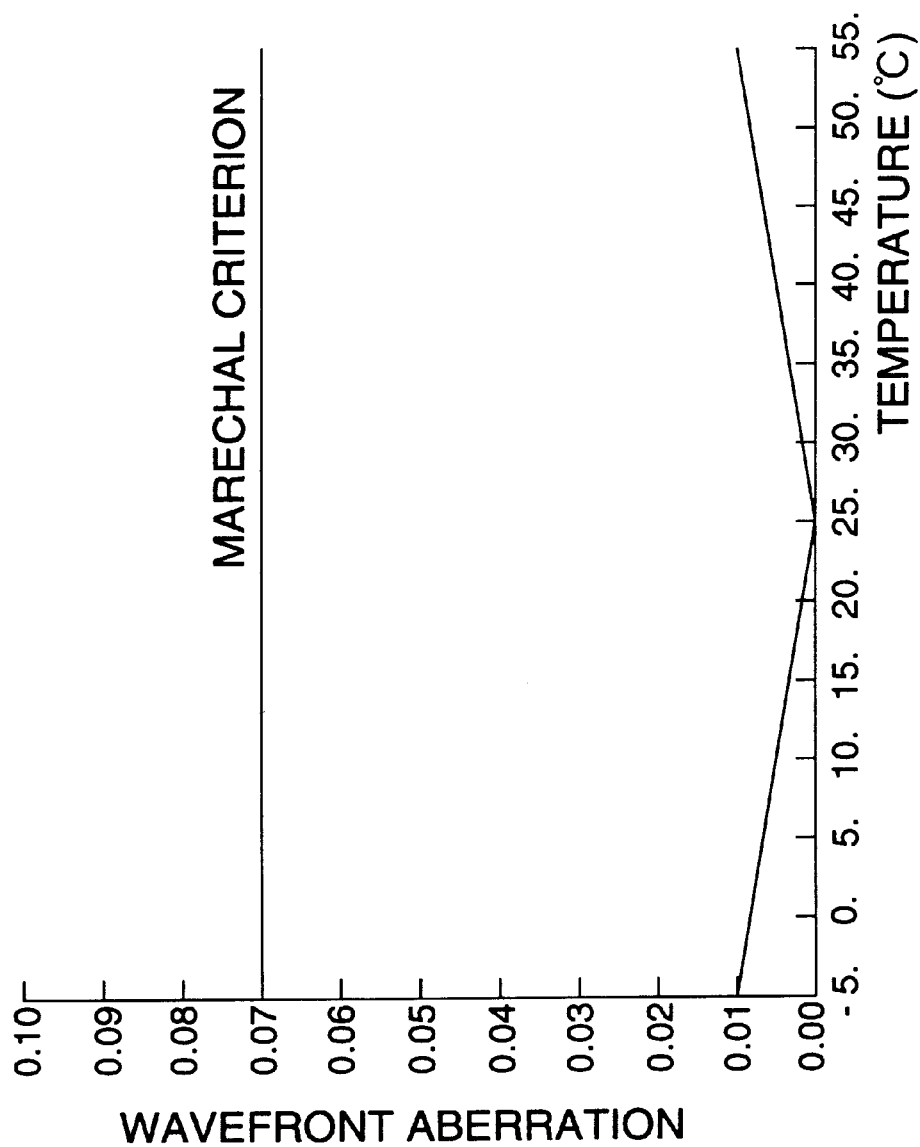
FIG. 40 is a diagram of temperature characteristics of the optical system in aforesaid Example 14.

An overall optical system is composed of a combination of this coupling lens and a resin-made objective lens in Example 1, and its optical path is shown in FIG. 38, and temperature characteristics are shown in FIG. 40.

This example satisfies the following;.

Dco=3

Mt·M·Fcp/F=−0.06666 wherein, Fc is equal to Fcp because the resin-made coupling lens is a single lens.

A change in wavefront aberration caused by a temperature change is 0.008 λ when a temperature rises from the standard design temperature by 30° C., which is smaller than in Example 9. Further, an object-image distance is considerably short.

EXAMPLE 15

Coupling lens

Fc = 10.447    Mc = −4.0     Uc = 65.913
T = −12.075    $NA_0$: 0.2     λ = 635 nm

| i | ri | di | ni |
|---|---|---|---|
| 1 | 17.965 | 2.00 | 1.49810 |
| 2 | −7.055 | 51.838 | |

Aspherical data

First surface

κ = −5.16870
$A_1$ = −1.16400 × $10^{-4}$    $P_1$ = 4.0000

Second surface

κ = −7.02230 × $10^{-1}$
$A_1$ = 6.39330 × $10^{-5}$     $P_1$ = 4.0000
$A_2$ = −8.95530 × $10^{-7}$    $P_2$ = 6.0000
$A_3$ = −1.37400 × $10^{-8}$    $P_3$ = 8.0000

Overall optical system

Ft = 11.429    Mt = −1/3     M = +1/12     U = 28.845
T = −12.075    NA: 0.6       λ = 635 nm

| i | ri | di | ni |
|---|---|---|---|
| 1 | 17.965 | 2.00 | 1.49810 |
| 2 | −7.055 | 10.00 | |
| 3 | 2.165 | 2.60 | 1.49810 |
| 4 | −8.480 | 1.57 | |
| 5 | ∞ | 0.60 | 1.58000 |
| 6 | ∞ | | |

Aspherical data

First surface

κ = −5.16870
$A_1$ = −1.16400 × $10^{-4}$    $P_1$ = 4.0000

Second surface

κ = −7.02230 × $10^{-1}$
$A_1$ = 6.39330 × $10^{-5}$     $P_1$ = 4.0000
$A_2$ = −8.95530 × $10^{-7}$    $P_2$ = 6.0000
$A_3$ = −1.37400 × $10^{-8}$    $P_3$ = 8.0000

Third surface

κ = −8.36770 × $10^{-1}$
$A_1$ = 5.07210 × $10^{-3}$     $P_1$ = 4.0000
$A_2$ = 3.24900 × $10^{-4}$     $P_2$ = 6.0000
$A_3$ = 2.11340 × $10^{-5}$     $P_3$ = 8.0000
$A_4$ = −3.96600 × $10^{-6}$    $P_4$ = 10.0000

Fourth surface

κ = −2.25490 × 10
$A_1$ = 1.27980 × $10^{-2}$     $P_1$ = 4.0000
$A_2$ = −5.04840 × $10^{-3}$    $P_2$ = 6.0000
$A_3$ = 1.03830 × $10^{-3}$     $P_3$ = 8.0000
$A_4$ = −9.09990 × $10^{-5}$    $P_4$ = 10.0000

Figure 42:
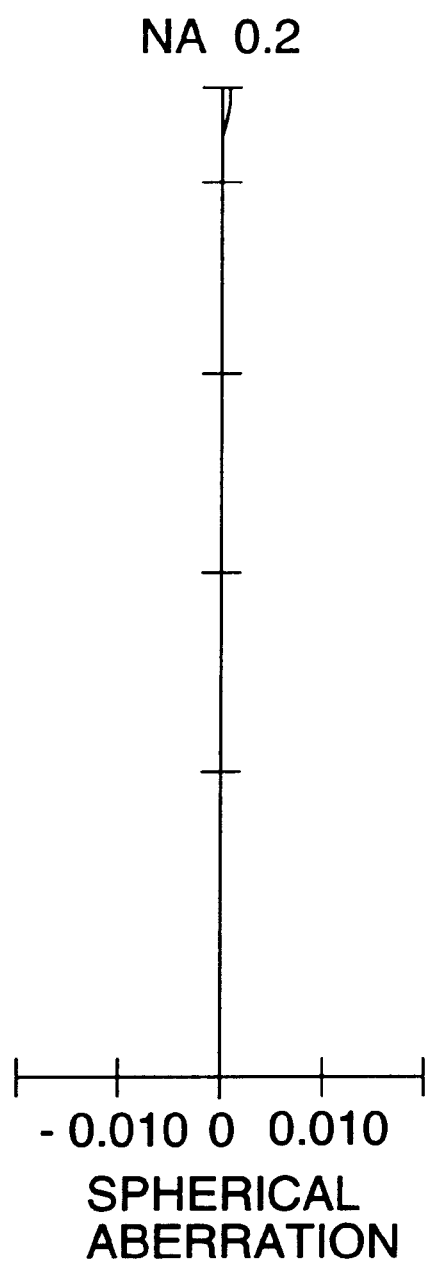
FIGS. 42(a) and 42(b) respectively represent a diagram of spherical aberration of the coupling lens in aforesaid Example 15 and a diagram of offense against sine condition thereof.
Figure 42:
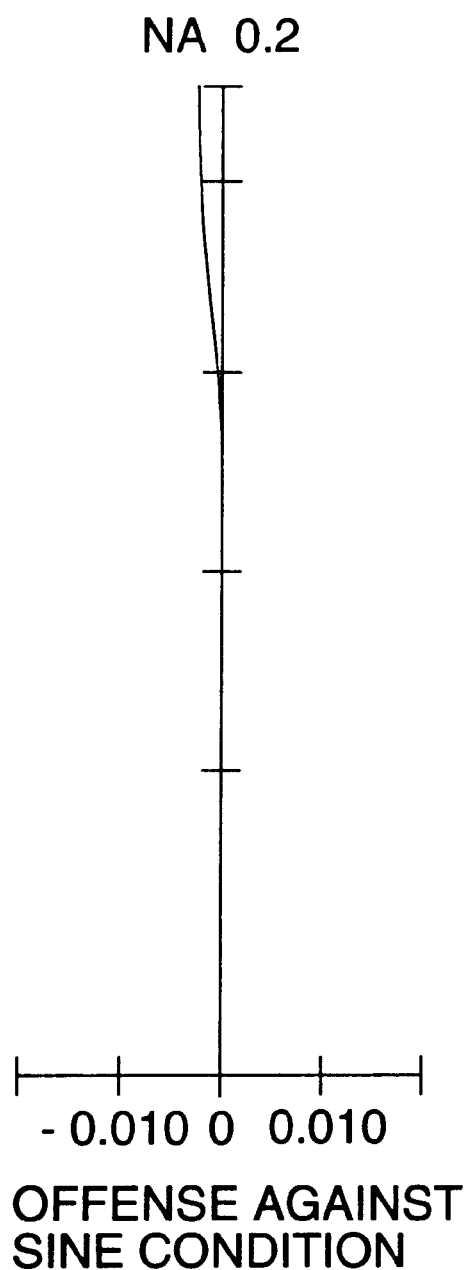

In Example 15, a coupling lens is a bi-convex lens which is made of resin and its both surfaces are aspherical. It has the same magnification Mc as in Example 14 and its focal length is long. Its aberration diagrams are shown in FIGS. 42(a) and 42(b).

Figure 41:
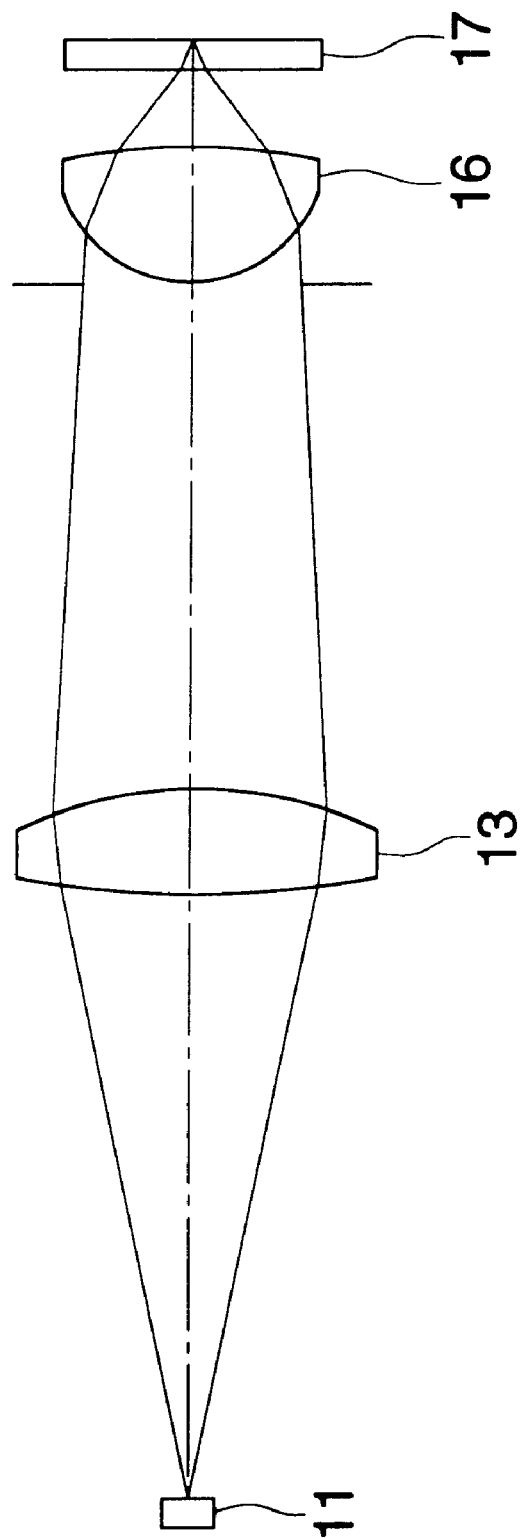
FIG. 41 is a diagram of an optical path in Example 15 of an optical system for recording and reproducing on an optical information recording medium of the invention.
Figure 43:
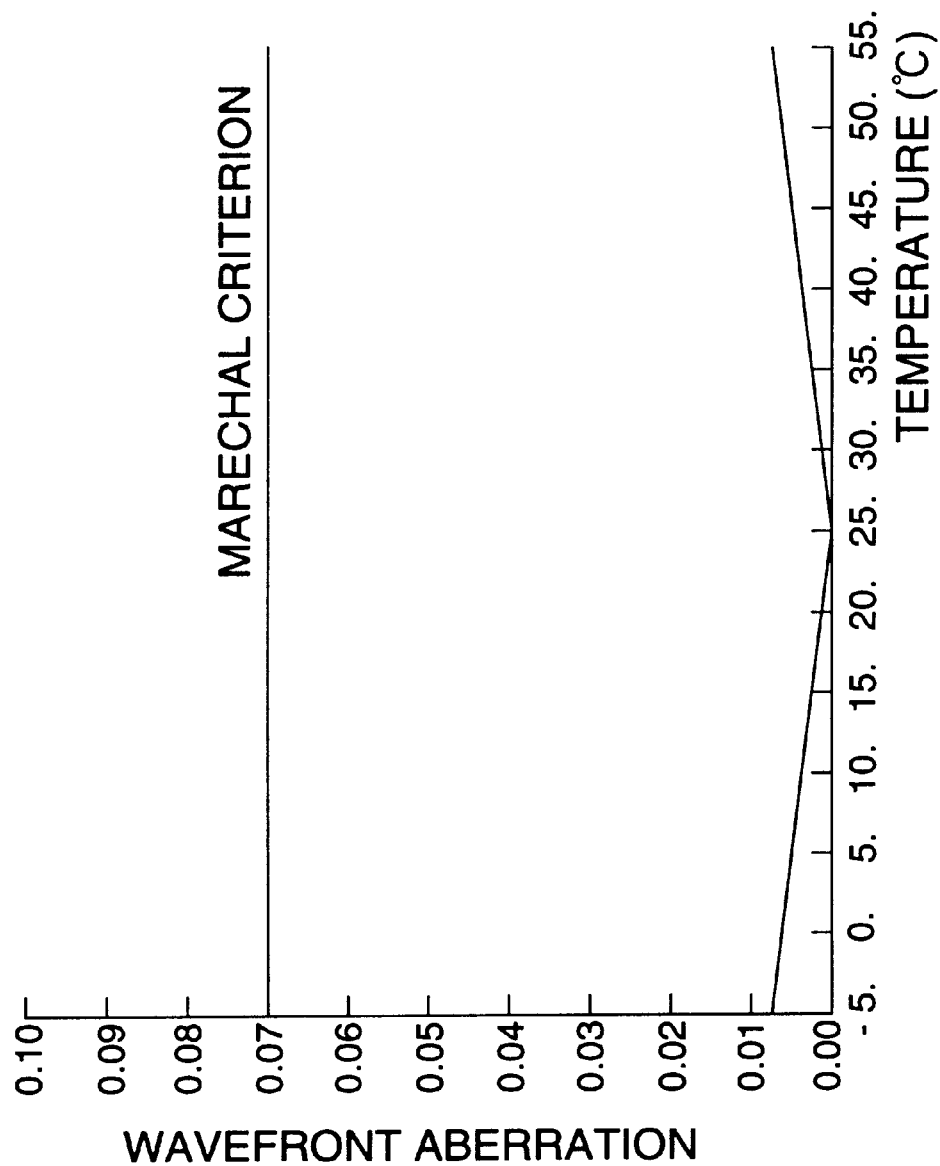
FIG. 43 is a diagram of temperature characteristics of the optical system in aforesaid Example 15.

An overall optical system is composed of a combination of this coupling lens and a resin-made objective lens in Example 1, and magnifications M and Mt are in the same specifications as those in Example 14. Its optical path is shown in FIG. 41, and temperature characteristics are shown in FIG. 43.

This example satisfies the following;.

Dco=10

Mt·M·Fcp/F=−0.07697 wherein, Fc is equal to Fcp because the resin-made coupling lens is a single lens.

A change in wavefront aberration caused by a temperature change is 0.006 A when a temperature rises from the standard design temperature by 30° C., which is considerably small.

EXAMPLE 16

Coupling lens

Fc = 19.476    Mc = −1.33      Uc = 80.168
T = −33.33     $NA_0$: 0.067    λ = 635 nm

| i | ri | di | ni |
|---|---|---|---|
| 1 | 21.378 | 2.00 | 1.49810 |
| 2 | −17.208 | 44.838 | |

Aspherical data

First surface

κ = −3.28840

Second surface

κ = $P_{5.25210 \times 10^{-1}}$
$A_1 = 2.60800 \times 10^{-5}$     $P_1 = 4.0000$ Overall optical system Ft = 8.812     Mt = −1/9    M = +1/12    U = 43.100
T = −33.330    NA: 0.6      λ = 635 nm

| i | ri | di | ni |
|---|---|---|---|
| 1 | 21.378 | 2.00 | 1.49810 |
| 2 | −17.208 | 3.00 | |
| 3 | 2.165 | 2.60 | 1.49810 |
| 4 | −8.480 | 1.57 | |
| 5 | ∞ | 0.60 | 1.58000 |
| 6 | ∞ | | |

Aspherical data

First surface

κ = −3.28840

Second surface

κ = −5.25210 × $10^{-1}$
$A_1 = 2.60800 \times 10^{-5}$     $P_1 = 4.0000$

Third surface

κ = −8.36770 × $10^{-1}$
$A_1 = 5.07210 \times 10^{-3}$     $P_1 = 4.0000$
$A_2 = 3.24900 \times 10^{-4}$     $P_2 = 6.0000$
$A_3 = 2.11340 \times 10^{-5}$     $P_3 = 8.0000$
$A_4 = -3.96600 \times 10^{-6}$    $P_4 = 10.0000$ Fourth surface κ = −2.25490 × 10
$A_1 = 1.27980 \times 10^{-2}$     $P_1 = 4.0000$
$A_2 = -5.04840 \times 10^{-3}$    $P_2 = 6.0000$
$A_3 = 1.03830 \times 10^{-3}$     $P_3 = 8.0000$
$A_4 = -9.09990 \times 10^{-5}$    $P_4 = 10.0000$ In Example 16, a coupling lens is a bi-convex lens which is made of resin and its both surfaces are aspherical. Its aberration diagrams are shown in FIGS. 45(*a*) and 45(*b*).

Figure 44:
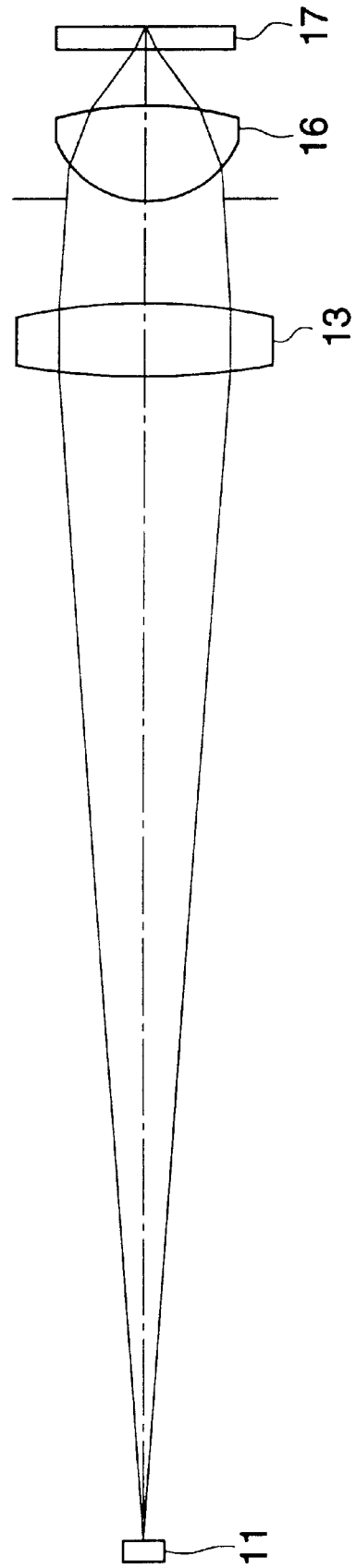
FIG. 44 is a diagram of an optical path in Example 16 of an optical system for recording and reproducing on an optical information recording medium of the invention.
Figure 46:
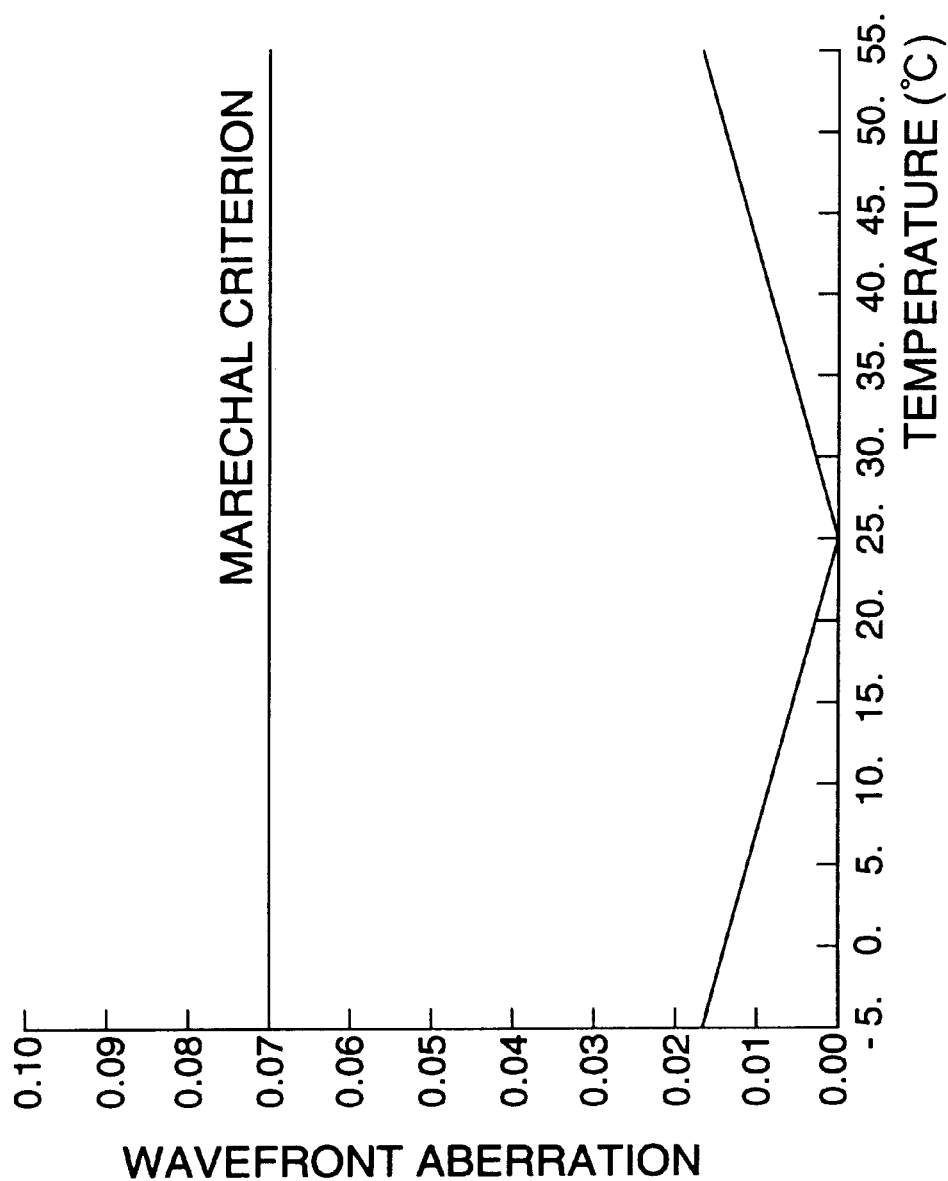
FIG. 46 is a diagram of temperature characteristics of the optical system in aforesaid Example 16.

An overall optical system is composed of a combination of this coupling lens and a resin-made objective lens in Example 1, and its optical path is shown in FIG. 44, and temperature characteristics are shown in FIG. 46.

This example satisfies the following;.

Dco=3

Mt·M·Fcp/F=−0.04783 wherein, Fc is equal to Fcp because the resin-made coupling lens is a single lens.

A change in wavefront aberration caused by a temperature change is 0.016 λ when a temperature rises from the standard design temperature by 30° C.

EXAMPLE 17

Coupling lens

Fc = 12.069    Mc = −0.83     Uc = 49.303
T = −25.923    $NA_0$: 0.1     λ = 635 nm

| i | ri | di | ni |
|---|---|---|---|
| 1 | 10.762 | 2.00 | 1.49810 |
| 2 | −12.777 | 21.38 | |

Aspherical data

First surface

κ = −4.46790
$A_1 = 3.01970 \times 10^{-4}$     $P_1 = 4.0000$

Second surface

κ = −8.10730 × $10^{-1}$
$A_1 = 1.59270 \times 10^{-4}$     $P_1 = 4.0000$
$A_2 = 4.39000 \times 10^{-6}$     $P_2 = 6.0000$
$A_3 = -8.09630 \times 10^{-8}$    $P_3 = 8.0000$ Overall optical system Ft = 4.2969    Mt = −1/6    M = +1/5    U = 35.693
T = −25.923    NA: 0.6      λ = 635 nm

| i | ri | di | ni |
|---|---|---|---|
| 1 | 10.762 | 2.00 | 1.49810 |
| 2 | −12.777 | 3.00 | |
| 3 | 2.304 | 2.60 | 1.49810 |
| 4 | −179.922 | 1.57 | |
| 5 | ∞ | 0.60 | 1.58000 |
| 6 | ∞ | | |

Aspherical data

First surface

κ = −4.46790
$A_1 = 3.01970 \times 10^{-4}$     $P_1 = 4.0000$

Figure 48A:
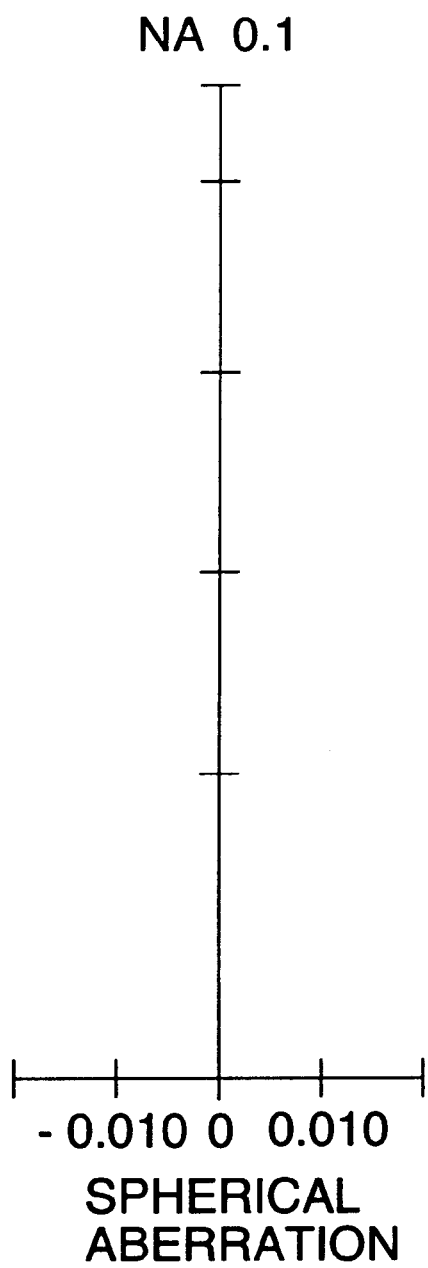
FIGS. 48(a) and 48(b) respectively represent a diagram of spherical aberration of the coupling lens in aforesaid Example 17 and a diagram of offense against sine condition thereof.
Figure 48B:
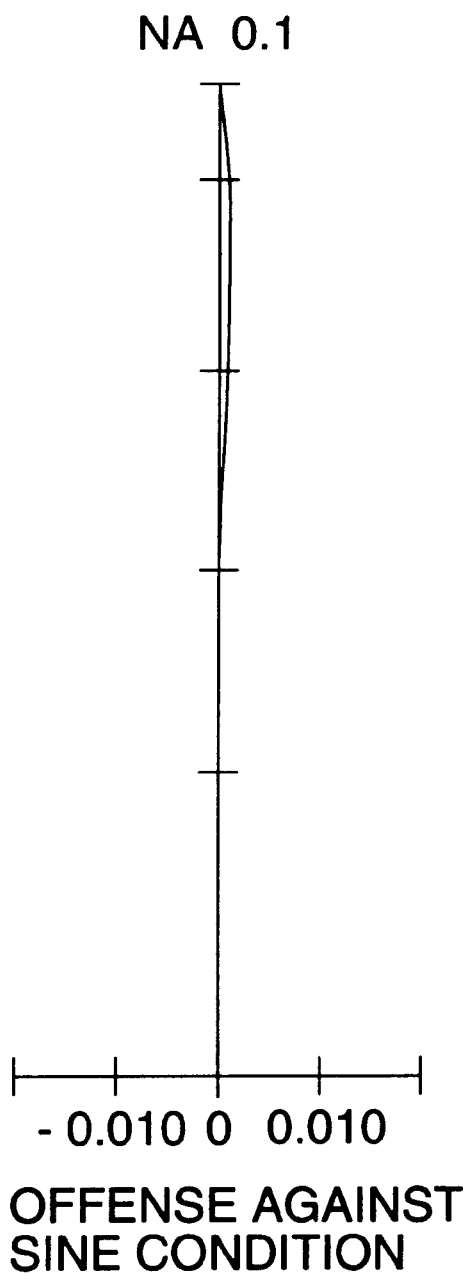

Second surface

κ = −8.10730 × $10^{-1}$
$A_1 = 1.59270 \times 10^{-4}$     $P_1 = 4.0000$
$A_2 = 4.39000 \times 10^{-6}$     $P_2 = 6.0000$
$A_3 = -8.09630 \times 10^{-8}$    $P_3 = 8.0000$ Third surface κ = −8.28170 × $10^{-1}$
$A_1 = 5.44340 \times 10^{-3}$     $P_1 = 4.0000$
$A_2 = 4.26990 \times 10^{-4}$     $P_2 = 6.0000$
$A_3 = 2.89730 \times 10^{-5}$     $P_3 = 8.0000$
$A_4 = 3.55070 \times 10^{-6}$     $P_4 = 10.0000$ Fourth surface κ = −2.25490 × 10
$A_1 = 7.41970 \times 10^{-3}$     $P_1 = 4.0000$
$A_2 = 1.45950 \times 10^{-3}$     $P_2 = 6.0000$
$A_3 = 1.25000 \times 10^{-5}$     $P_3 = 8.0000$
$A_4 = 2.08630 \times 10^{-5}$     $P_4 = 10.0000$ In Example 17, a coupling lens is a bi-convex lens which is made of resin and its both surfaces are aspherical. Its aberration diagrams are shown in FIGS. 48(*a*) and 48(*b*).

Figure 47:
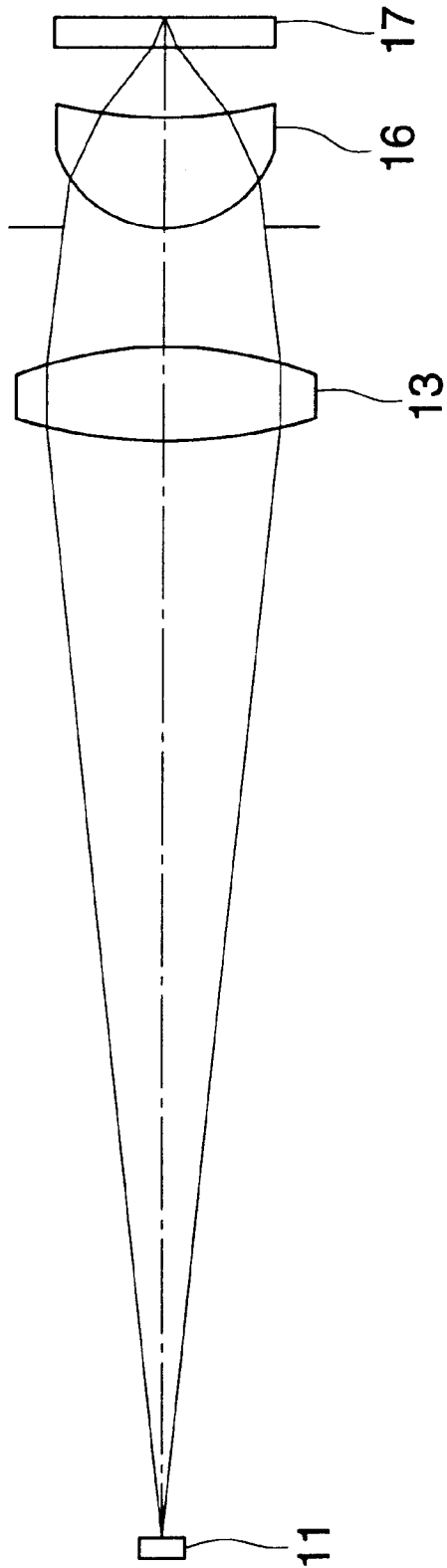
FIG. 47 is a diagram of an optical path in Example 17 of an optical system for recording and reproducing on an optical information recording medium of the invention.
Figure 49:
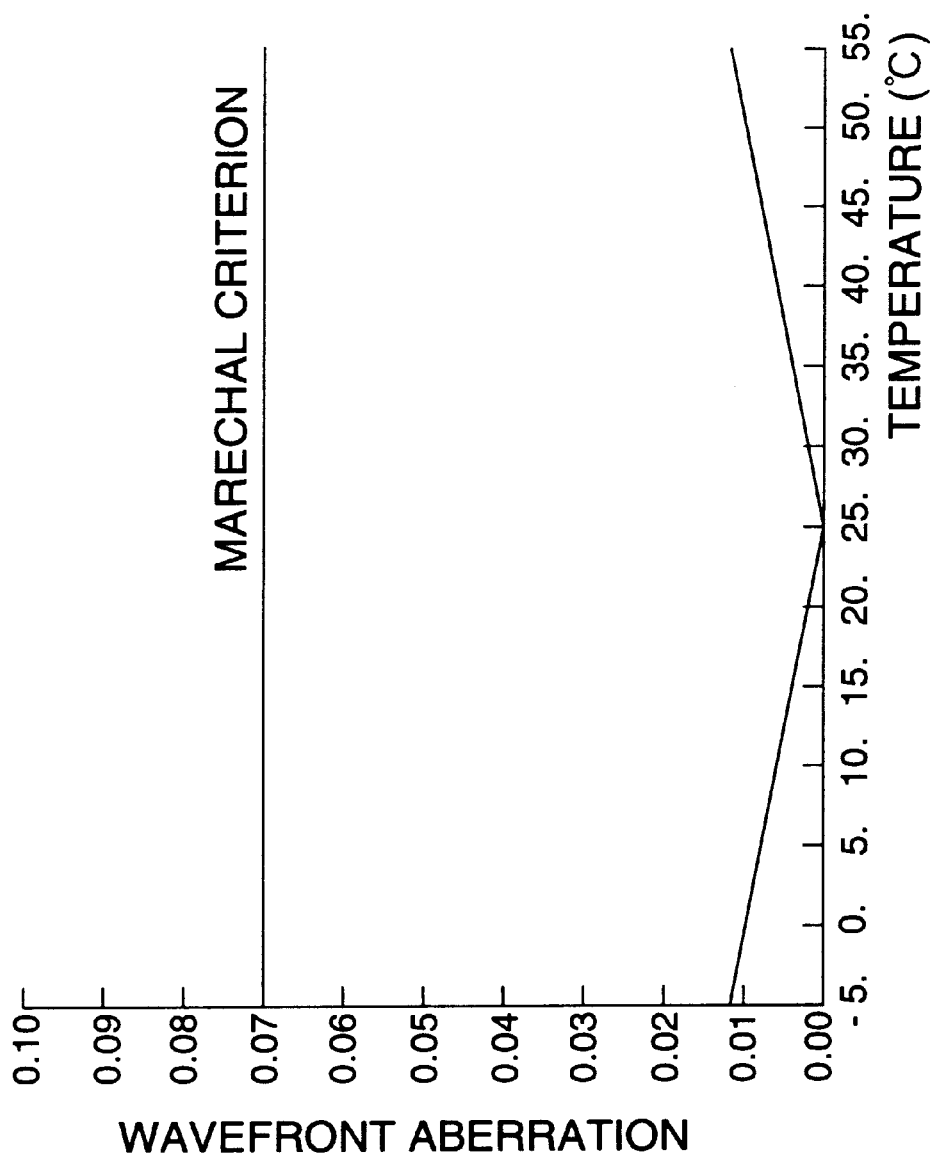
FIG. 49 is a diagram of temperature characteristics of the optical system in aforesaid Example 17.

An overall optical system is composed of a combination of this coupling lens and a resin-made objective lens in Example 2, and its optical path is shown in FIG. 47, and temperature characteristics are shown in FIG. 49.

This example satisfies the following;.

Dco=3

Mt·M·Fcp/F=−0.08767 wherein, Fc is equal to Fcp because the resin-made coupling lens is a single lens.

A change in wavefront aberration caused by a temperature change is 0.014 λ, when a temperature rises from the standard design temperature by 30° C. which is slightly greater than that of the objective lens itself. The reason for this is that power of the coupling lens is made greater, and thereby a change in wavefront aberration of the coupling lens itself caused by a temperature change is made to be too great to be ignored.

EXAMPLE 18

Coupling lens

| Fc = 15.886 | Mc = −2.50 | Uc = 78.482 |
| T = −21.342 | $NA_0$: 0.1 | λ = 635 nm |
| i | ri | di | ni |
|---|---|---|---|
| 1 | 22.844 | 2.00 | 1.49810 |
| 2 | −11.754 | 55.140 | |

Aspherical data

First surface

κ = −4.52490
$A_1 = -1.69110 \times 10^{-5}$    $P_1 = 4.0000$

Second surface $\kappa = -9.02040 \times 10^{-1}$
$A_1 = 1.60060 \times 10^{-5}$    $P_1 = 4.0000$
$A_2 = -8.69710 \times 10^{-8}$    $P_2 = 6.0000$
$A_3 = -1.73930 \times 10^{-10}$   $P_3 = 8.0000$ Overall optical system

| Ft = 3.734 | Mt = −1/6 | M = +1/15 | U = 31.112 |
| T = −21.342 | NA: 0.6 | λ = 635 nm | |
| i | ri | di | ni |
|---|---|---|---|
| 1 | 22.844 | 2.00 | 1.49810 |
| 2 | −11.754 | 3.00 | |
| 3 | 2.130 | 2.60 | 1.49810 |
| 4 | −8.053 | 1.57 | |
| 5 | ∞ | 0.60 | 1.58000 |
| 6 | ∞ | | |

Aspherical data

First surface

κ = −4.52490
$A_1 = -1.69110 \times 10^{-5}$    $P_1 = 4.0000$

Figure 51:
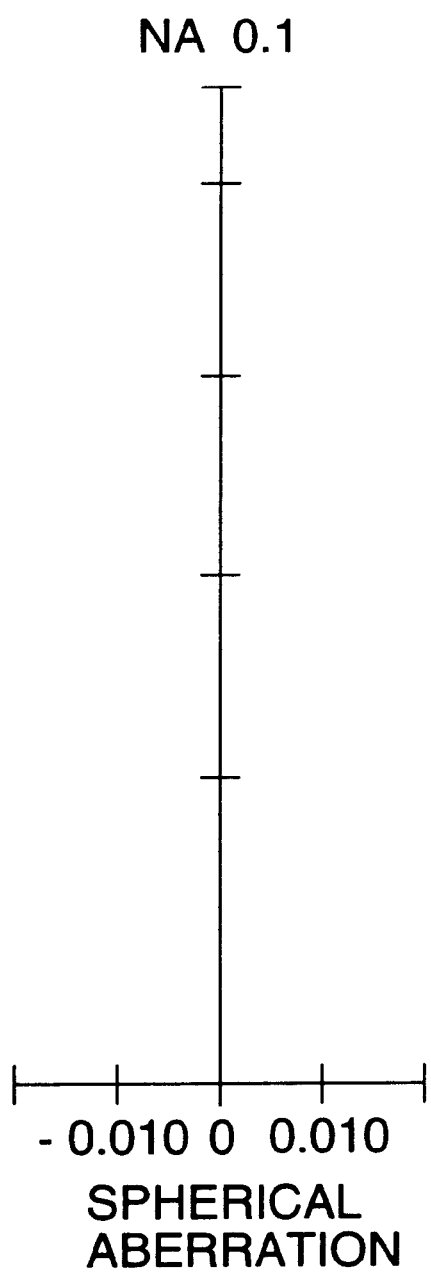
FIGS. 51(a) and 51(b) respectively represent a diagram of spherical aberration of the coupling lens in aforesaid Example 18 and a diagram of offense against sine condition thereof.
Figure 51:
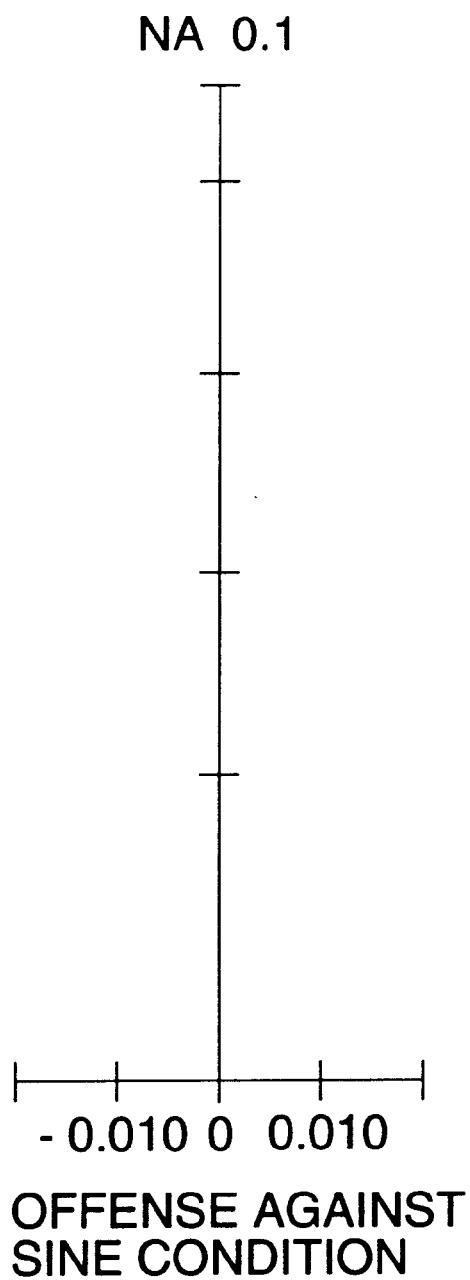

Second surface $\kappa = -9.02040 \times 10^{-1}$
$A_1 = 1.60060 \times 10^{-5}$    $P_1 = 4.0000$
$A_2 = -8.69710 \times 10^{-8}$    $P_2 = 6.0000$
$A_3 = -1.73930 \times 10^{-10}$   $P_3 = 8.0000$ Third surface $\kappa = -5.06170 \times 10^{-1}$
$A_1 = 8.72330 \times 10^{-4}$    $P_1 = 4.0000$
$A_2 = 8.86100 \times 10^{-5}$    $P_2 = 6.0000$
$A_3 = 7.50840 \times 10^{-6}$    $P_3 = 8.0000$
$A_4 = -1.22820 \times 10^{-6}$   $P_4 = 10.0000$ Fourth surface $\kappa = -2.25510 \times 10$
$A_1 = 1.31840 \times 10^{-2}$    $P_1 = 4.0000$
$A_2 = -3.62900 \times 10^{-3}$   $P_2 = 6.0000$
$A_3 = 6.28660 \times 10^{-4}$    $P_3 = 8.0000$
$A_4 = -4.99790 \times 10^{-5}$   $P_4 = 10.0000$ In Example 18, a coupling lens is a bi-convex lens which is made of resin and its both surfaces are aspherical. Its aberration diagrams are shown in FIGS. 51(a) and 51(b).

Figure 50:
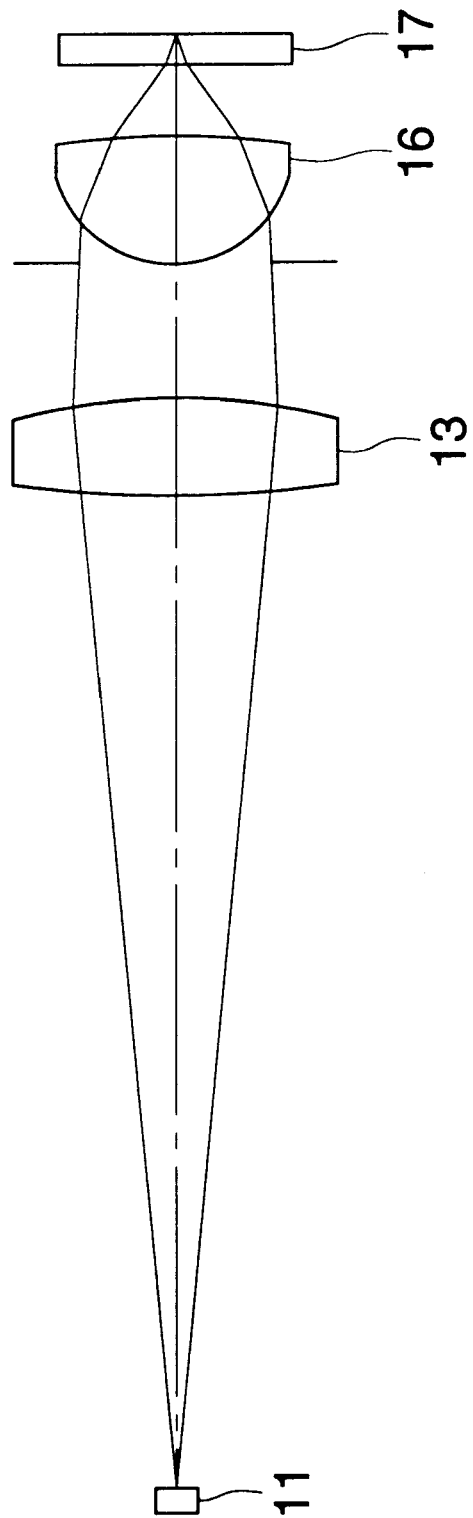
FIG. 50 is a diagram of an optical path in Example 18 of an objective lens in an optical system for recording and reproducing on an optical information recording medium of the invention.
Figure 52:
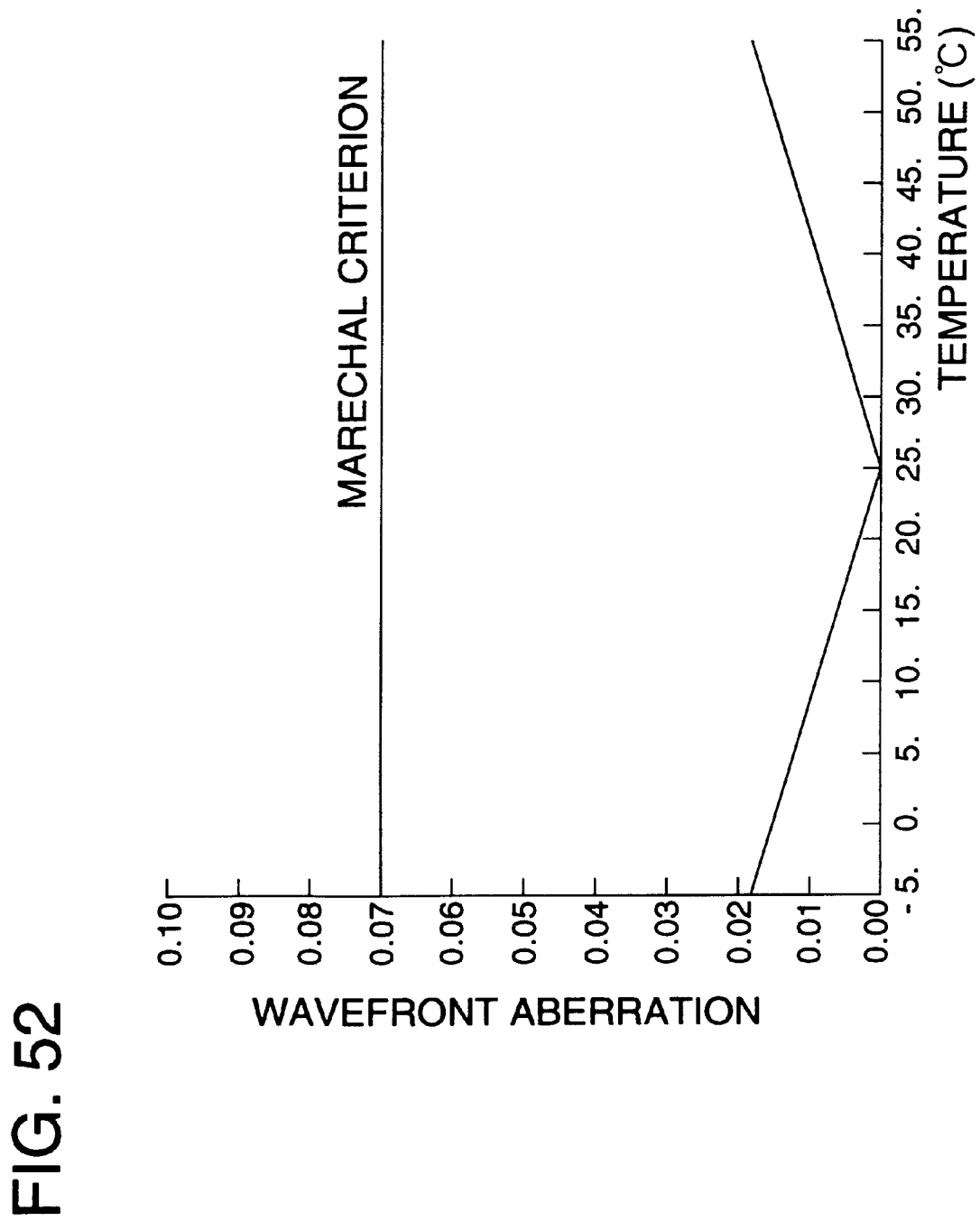
FIG. 52 is a diagram of temperature characteristics of the optical system in aforesaid Example 18.

An overall optical system is composed of a combination of this coupling lens and a resin-made objective lens in Example 3, and its optical path is shown in FIG. 50, and temperature characteristics are shown in FIG. 52.

This example satisfies the following;.

Dco=3

Mt·M·Fcp/F=−0.04776 wherein, Fc is equal to Fcp because the resin-made coupling lens is a single lens.

A change in wavefront aberration caused by a temperature change is 0.017 λ, when a temperature rises from the standard design temperature by 30° C.

Although all coupling lenses 13 in aforesaid Examples 9–18 are made of resin, those made of glass also make it possible to obtain the same results except temperature characteristics of optical systems.

EXAMPLE 19

| Fc = 3.5266153 | M = +1/30 | U = −97.973 |
| NA: 0.6 | λ = 635 nm | |
| i | ri | di | ni |
|---|---|---|---|
| 1 | 2.089 | 2.60 | 1.49810 |
| 2 | −6.470 | 1.57 | |
| 3 | ∞ | 0.60 | 1.58000 |
| 4 | ∞ | | |

Aspherical data

Figure 53:
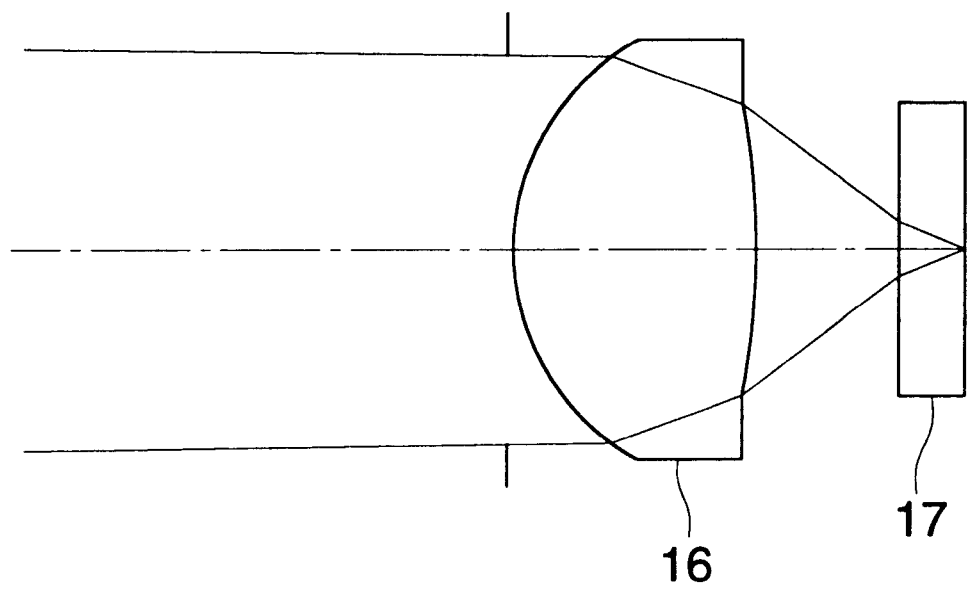
FIG. 53 is a diagram of an optical path in Example 19 of an optical system for recording and reproducing on an optical information recording medium of the invention.
Figure 54:
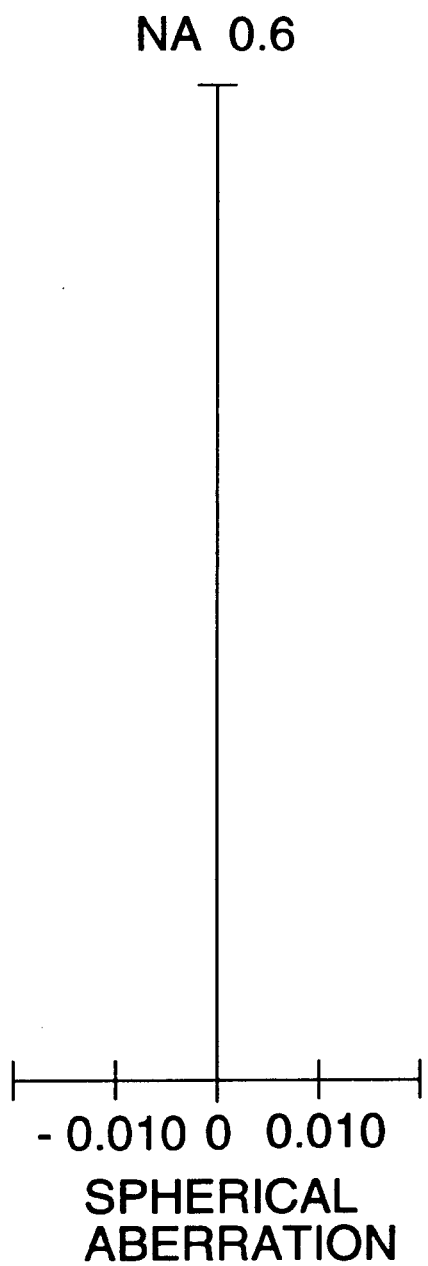
FIGS. 54(a) and 54(b) respectively represent a diagram of spherical aberration of the objective lens in aforesaid Example 19 and a diagram of offense against sine condition thereof.
Figure 54:
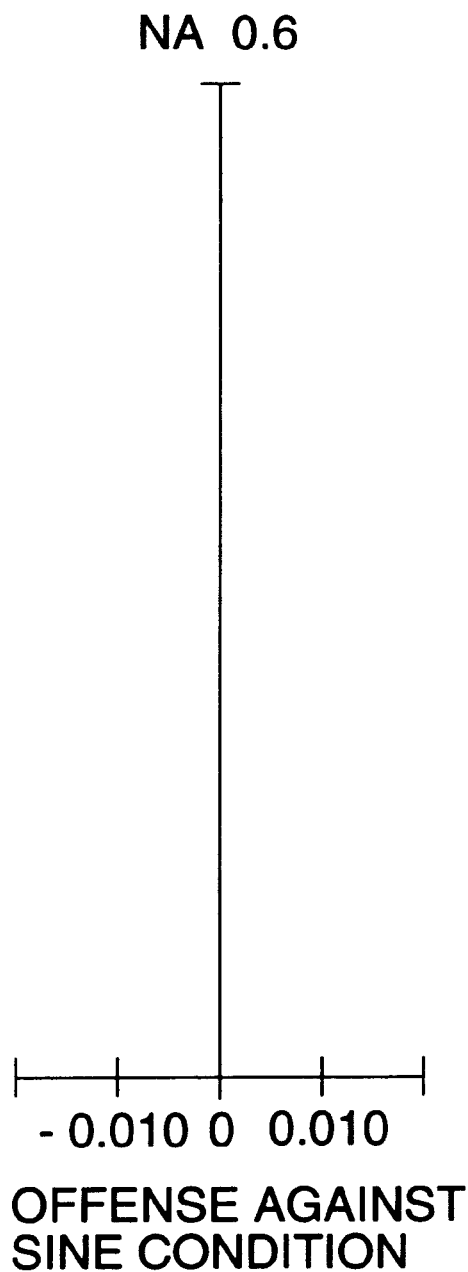
Figure 55:
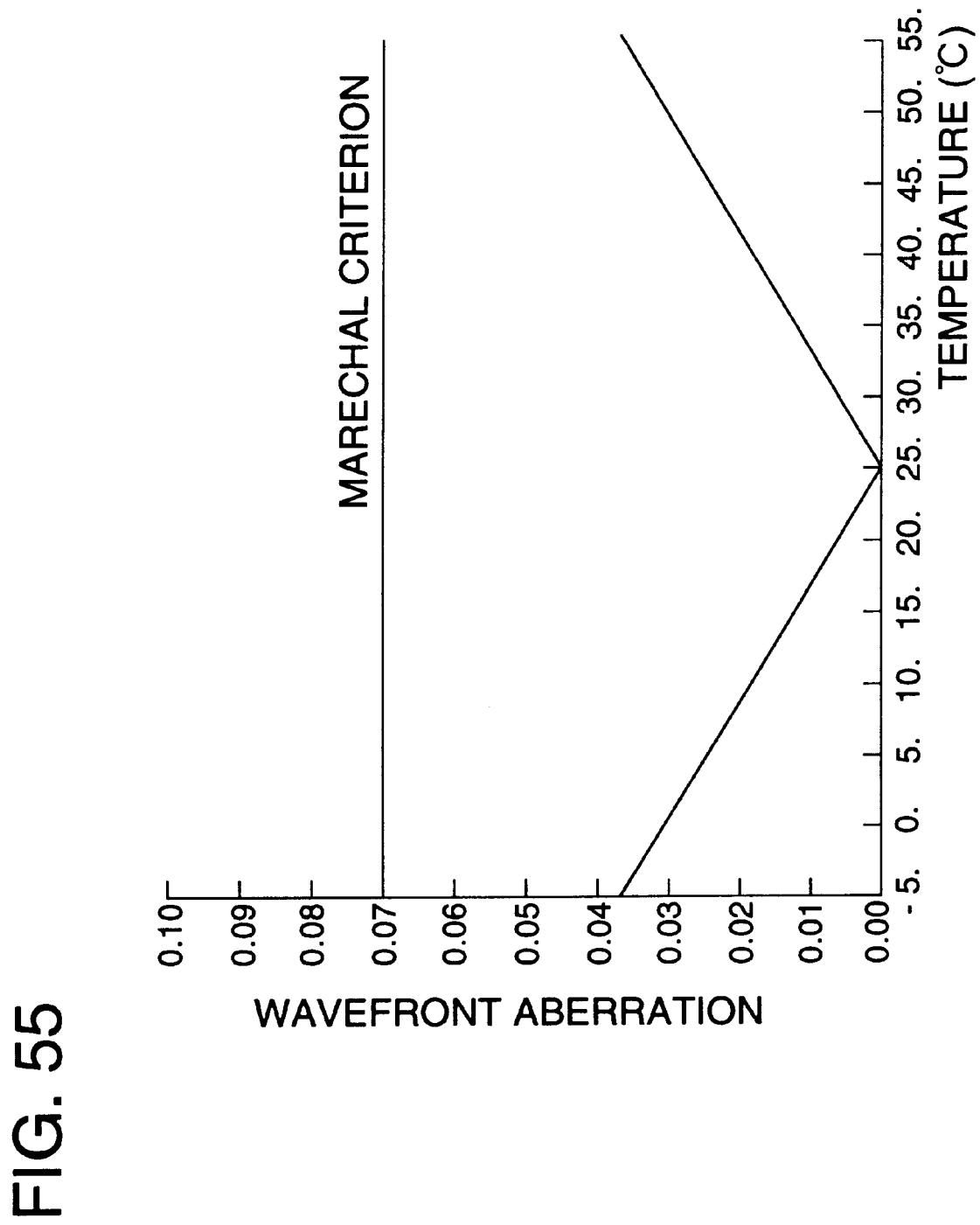
FIG. 55 is a diagram of temperature characteristics of the objective lens in aforesaid Example 19.

First surface $\kappa = -5.16020 \times 10^{-1}$
$A_1 = 5.09120 \times 10^{-4}$    $P_1 = 4.0000$
$A_2 = 4.63180 \times 10^{-5}$    $P_2 = 6.0000$
$A_3 = 2.80710 \times 10^{-6}$    $P_3 = 8.0000$
$A_4 = -2.10810 \times 10^{-6}$   $P_4 = 10.0000$ Second surface $\kappa = -2.25480 \times 10$
$A_1 = 1.17350 \times 10^{-2}$    $P_3 = 4.0000$
$A_2 = -3.33100 \times 10^{-3}$   $P_2 = 6.0000$
$A_3 = 6.08580 \times 10^{-4}$    $P_3 = 8.0000$
$A_4 = -5.05930 \times 10^{-5}$   $P_4 = 10.0000$ This example shows only an objective lens, and the objective lens is made of resin, and both sides constituting the objective lens are aspherical, and magnification of the objective lens itself is +1/30. An optical path of the objective lens is shown in FIG. 53, a diagram of spherical aberration of the objective lens and a diagram of offense against sine condition thereof are shown respectively in FIGS. 54(a) and 54(b), and temperature characteristics of the objective lens are shown in FIG. 55.

In this example, $x_2$ is equal to −0.10731 and $\Delta_2$ is equal to 0.07064 and the following is satisfied.

$$x_2 \cdot (n-1)/\{F \cdot (NA)^2\} = -0.0421$$

$$\Delta_2 \cdot (n-1)^3/\{F \cdot (NA)^4\} = 0.01910$$

Though the change in wavefront aberration caused by a temperature change is greater than those in other examples, it is smaller than that of an infinite objective lens for the same focal length.

This example is effective when temperature characteristics are more controlled than in an infinite optical system and when a size in the direction perpendicular to the optical axis direction is required to be made smaller. to a certain extent in an overall optical system As seen in each example, the invention has made it possible to obtain an optical system wherein a change in wavefront aberration caused by a temperature change can be held down to a level at which a tolerance of a lens can be ensured, even when a resin-made objective lens is used under high numerical aperture NA.

In addition, it has been cleared that the invention can cope with a short wavelength down to 450 nm for light to be used and high NA up to 0.75 for the lens.

Examples 20–24 for an optical system for recording and reproducing for an optical information medium which are for attaining the second object of the invention will be explained as follows, referring to FIGS. 56(a), 56(b), 57, 58, 59, 60, 61 and 62.

Figure 56:
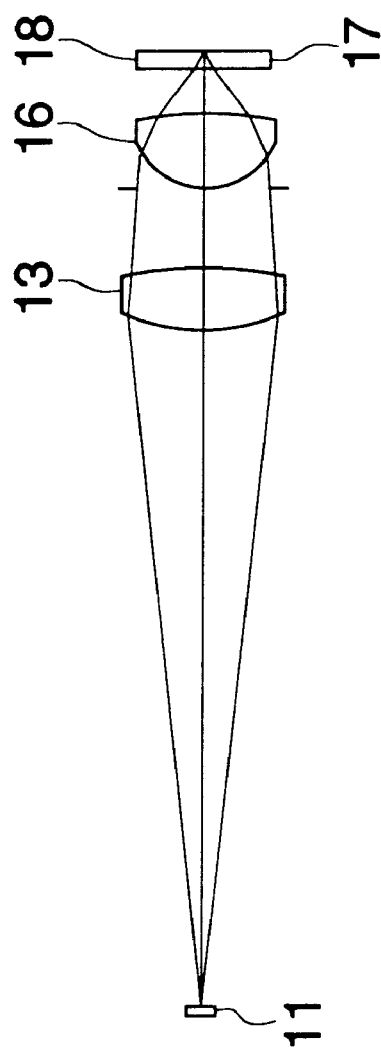
FIGS. 56(a) and 56(b) represent basic structural diagrams of an optical system for recording and reproducing on an optical information medium of the invention.
Figure 56:
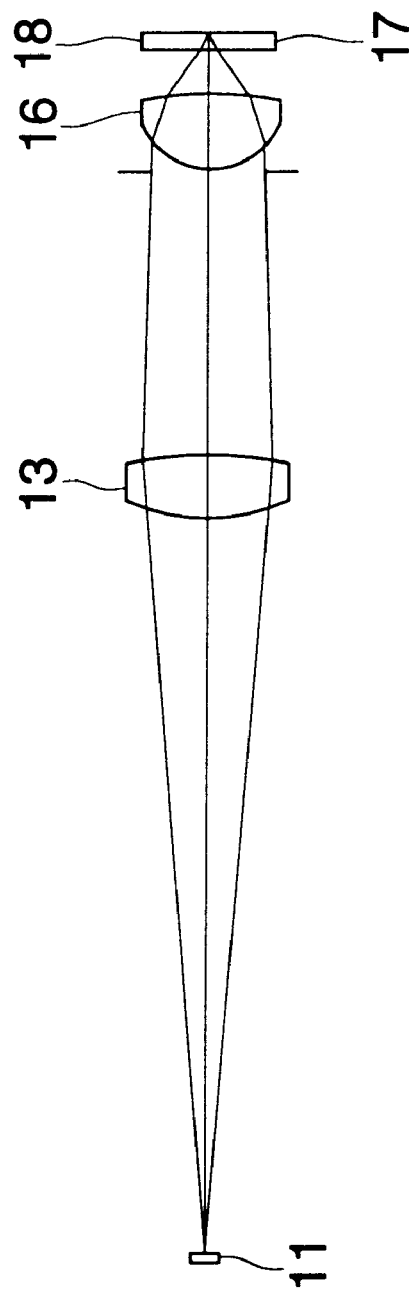

Each of FIGS. 56(a) and 56(b) represents an optical path diagram showing basic structure of an optical system for recording and reproducing for an optical information medium of the invention.

In FIG. 56(a), the numeral 13 is a first lens group composed of a positive single lens, 16 is an objective lens, 17 is a transparent substrate in an optical information recording medium, and 18 is a recording surface of the optical information recording medium. A diverged light flux emitted from light source 11 is converted by the first lens group 13 arranged in the vicinity of the objective lens 16 into converged light, and then enters the objective lens 16 to be converged on the recording surface 18 through the transparent substrate 17.

FIG. 56(b) shows an example wherein the first lens group 13 in FIG. 56(a) is arranged to be away from the objective lens 16 so that an optical element such as a mirror or the like may be provided between the first lens group 13 and the objective lens 16.

Figure 57:
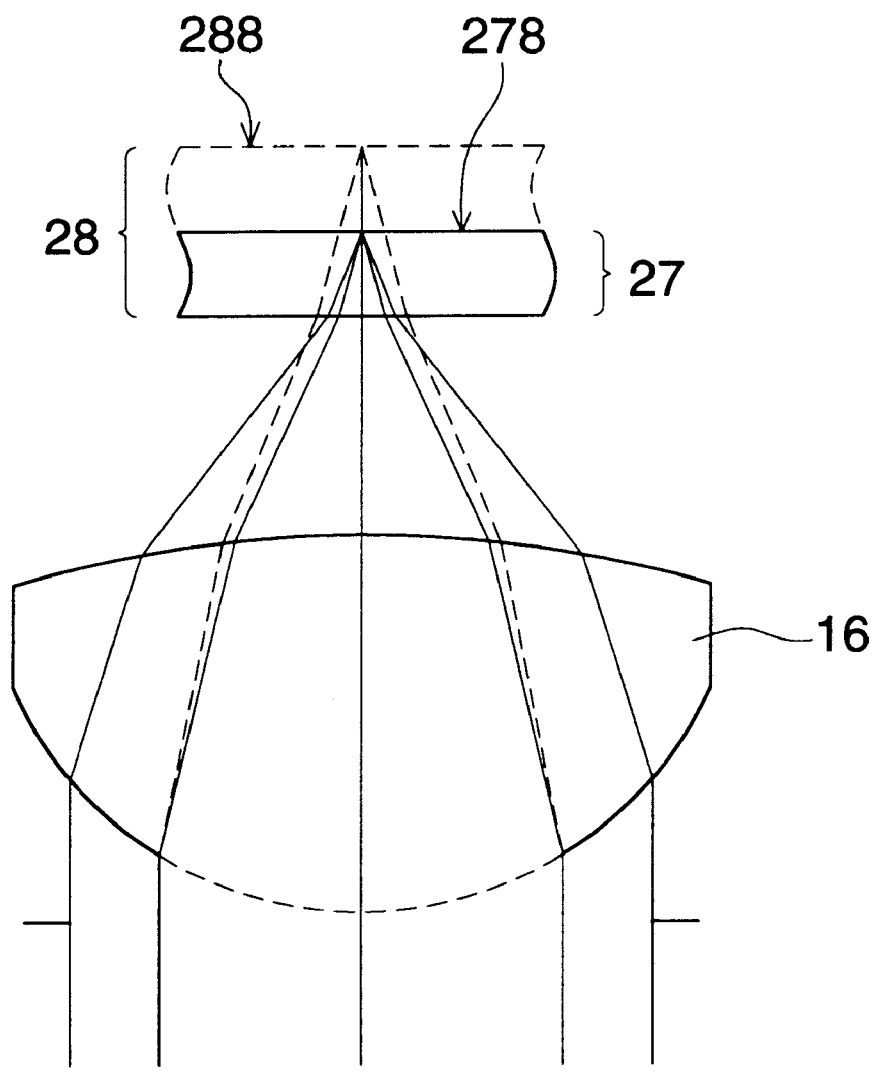
FIG. 57 is a diagram showing how a light flux emitted from an objective lens is converged.

FIG. 57 is a diagram illustrating how a light flux emitted from the objective lens 16 is converged on the recording surface through the transparent substrate, and the numeral 27 is a transparent substrate having a thickness of 0.6 mm and the numeral 278 is a recording surface of an optical information recording medium having the 0.6 mm-thick transparent substrate, while the numeral 28 is a transparent substrate having a thickness of 1.2 mm and the numeral 288 is a recording surface of an optical information recording medium having the 1.2 mm-thick transparent substrate. FIG. 57 shows how a light flux shown with solid lines and emitted from the lens 16 is converged on the recording surface 278 of the optical information recording medium having the 0.6 mm-thick transparent substrate 27, and it shows how a light flux shown with broken lines is converged on the recording surface 288 of the optical information recording medium having the 1.2 mm-thick transparent substrate 28.

Next, the 20th example will be explained as follows.

Figure 58:
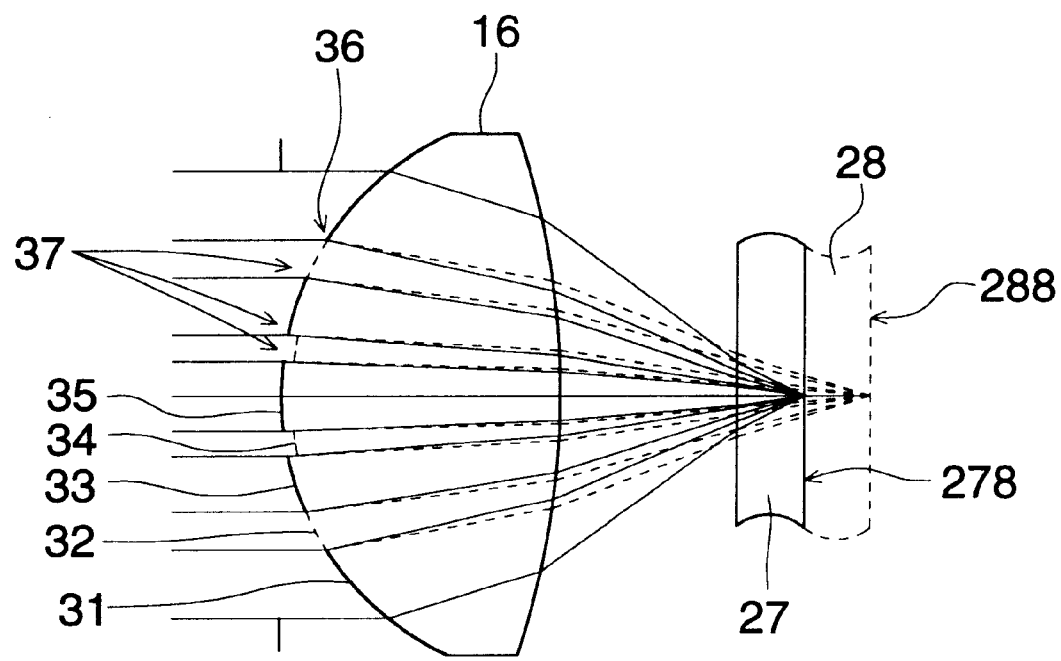
FIG. 58 is a diagram showing an example of an objective lens of the invention.

FIG. 58 shows a form of objective lens 16 wherein concentric, adjacent, plural and ring-shaped lens faces having their centers on an optical axis each having different refracting power which are an example of the so-called optical means in the invention are formed on the surface at the light source side on the objective lens 16 shown in each of FIGS. 56(a) and 56(b). FIG. 58 also shows how a light flux entering the objective lens 16 is divided by ring-shaped lens surfaces and is converged on the recording surface 278 of the optical information recording medium having the 0.6 mm-thick transparent substrate 27 (indicated with solid lines), and how it is converged on the recording surface 288 of the optical information recording medium having the 1.2 mm-thick transparent substrate 28 (indicated with solid lines).

Since the converged points for two types of convergences are separated in the direction of an optical axis as stated above, when reproducing is made under the convergence by an objective lens corresponding to one type of transparent substrate thickness, light in the convergence corresponding to the other type of transparent substrate thickness is not focused on the recording surface, thus, it is possible to make an influence on reproduction signals small.

In the case of aforesaid example, a plurality of ring-shaped lens surfaces are composed of the first ring-shaped lens surface 31 (this lens surface is doughnut-shaped when viewed from the light source side) located at the outermost position, the second ring-shaped lens surface 32 (this lens surface is doughnut-shaped when viewed from the light source side) which is adjacent to the inside of the first ring-shaped lens surface 31, the third ring-shaped lens surface 33 (this lens surface is doughnut-shaped when viewed from the light source side) which is adjacent to the inside of the second ring-shaped lens surface 32, the fourth ring-shaped lens surface 34 (this lens surface is doughnut-shaped when viewed from the light source side) which is adjacent to the inside of the third ring-shaped lens surface 33, and the fifth ring-shaped lens surface 35 (this ring-shaped lens surface is a lens surface including an optical axis and a shape of the lens viewed from the light source is a circle) which is adjacent to the inside of the fourth ring-shaped lens surface 34 and is positioned at the center of the objective lens, It is arranged so that light fluxes passing through the first ring-shaped lens surface 31 located at the outermost position, the third ring-shaped lens surface 33 and the fifth ring-shaped lens surface 35 are converged on the recording surface 278 of the optical information recording medium having the 0.6 mm-thick transparent substrate, and fluxes passing through the second ring-shaped lens surface 32 and the fourth ring-shaped lens surface 34 are converged on the recording surface 288 of the optical information recording medium having the 1.2 mm-thick transparent substrate.

In this way, when converging through the 0.6 mm-thick transparent substrate, an outermost ring-shaped lens surface (the first ring-shaped lens surface 31 in the case of this example) is used for obtaining a minute spot as the objective lens with large NA, because it is necessary to obtain a spot for coping with high density, while when converging through the 1.2 mm-thick transparent substrate, a ring-shaped lens surface adjacent to the inside of the outermost ring-shaped lens surface (the second ring-shaped lens surface 32 in the case of this example) is used for obtaining a minute spot as the objective lens with small NA corresponding to the substrate thickness.

Further, in the case of this example, three ring-shaped lens surfaces including the first ring-shaped lens surface 31, the third ring-shaped lens surface 33 and the fifth ring-shaped lens surface 35 are used as a ring-shaped lens surface to be used for obtaining a spot for coping with high density. The reason for this is that when a spot for coping with high density is obtained by only one ring-shaped lens surface located at the outermost position, intensity of a side lobe grows greater, causing an increase of noise which sometimes prevents excellent recording or reproduction of information. For minimizing an influence of such side lobe, there is provided the third ring-shaped lens surface which is adjacent to the inside of the ring-shaped lens surface corresponding to the 1.2 mm-thick transparent substrate being adjacent to the inside of the outermost ring-shaped lens surface and has refracting power corresponding to the 0.6 mm-thick transparent substrate, and there is provided inside the third ring-shaped lens surface the fourth ring-shaped lens surface corresponding to the 1.2 mm-thick transparent substrate, and there is further provided inside the fourth lens surface the fifth ring-shaped lens surface having refractive power corresponding to the 0.6 mm-thick transparent substrate, and thereby it is possible to reduce an area of the second ring-shaped lens surface which emits unnecessary light when coping with the substrate thickness of 0.6 mm, and thereby to reduce the side lobe. By repeating the foregoing further, namely by forming, alternately from the outermost circumference, a plurality of ring-shaped lens surfaces each having different refracting power to be provided on the lens surface, it is possible to obtain two light spots suitable for conducting recording and reproducing for an optical information recording medium having different substrate thicknesses.

However, when the number of ring-shaped lens surfaces is increased excessively, the width of each ring-shaped lens surface located inside the ring-shaped lens surface positioned at the outermost circumference is made to be too small, and it becomes difficult to be processed. Therefore, for reducing the side lobe down to the level which is not problematic in practical use, and for keeping the lens to be processed easily, it is preferable to make the number of ring-shaped lens surfaces to be three to ten, and the upper limit of 6 or less is more preferable.

When providing a plurality of ring-shaped lens surfaces corresponding to the same transparent substrate, it is preferable to make the lens thickness on an optical axis the same when extending each ring-shaped lens surface in accordance with an expression (for example, indicating each ring-shaped lens surface as an expression of aspherical surface of the same type) representing each ring-shaped lens surface.

The reason for the foregoing is that when the lens thickness is not the same, there is a possibility that a difference in a length of an optical path is caused on a light flux passing through each ring-shaped lens surface corresponding to the same transparent substrate, then surfaces wavefront having the difference in optical path length are superposed to generate an interference, and intensity of light obtained by a light flux passing through each ring-shaped lens surface is reduced by the interference.

In such a case, there is formed step 37 between adjoining ring-shaped lens surfaces. However, it is possible to form without causing step (36) on at least one adjoining ring-shaped lens surface. Therefore, it is preferable in processing that at least one adjoining ring-shaped lens surface is formed without having any step.

Incidentally, in the case of an arrangement wherein the lens thickness on an optical axis is not the same, when each ring-shaped lens surface corresponding to the same transparent substrate is extended to the optical axis, it is possible to maintain 50% or more of the original intensity even when wavelength λ of a light source fluctuates slightly if the arrangement is made to satisfy the relation of λ=mλ (m is an integer) between a length of a difference in optical path Δ and wavelength λ, and m is made to be an integer from −10 to 10.

Though there are provided concentric, adjacent, plural and ring-shaped lens faces having their centers on an optical axis each having different refracting power on the surface at the light source side on the objective lens 16 in FIG. 58, it is also possible to form these plural ring-shaped lens surfaces representing an example of the so-called optical means in the invention on the surface at the image side on the objective lens, or on any one surface of the first lens group 13, without being limited to aforesaid example. It is also possible to provide plural ring-shaped lens surfaces on the objective lens 16 and on any of the lens surfaces forming the first lens group 13.

Next, the 21st example will be explained as follows.

Figure 59:
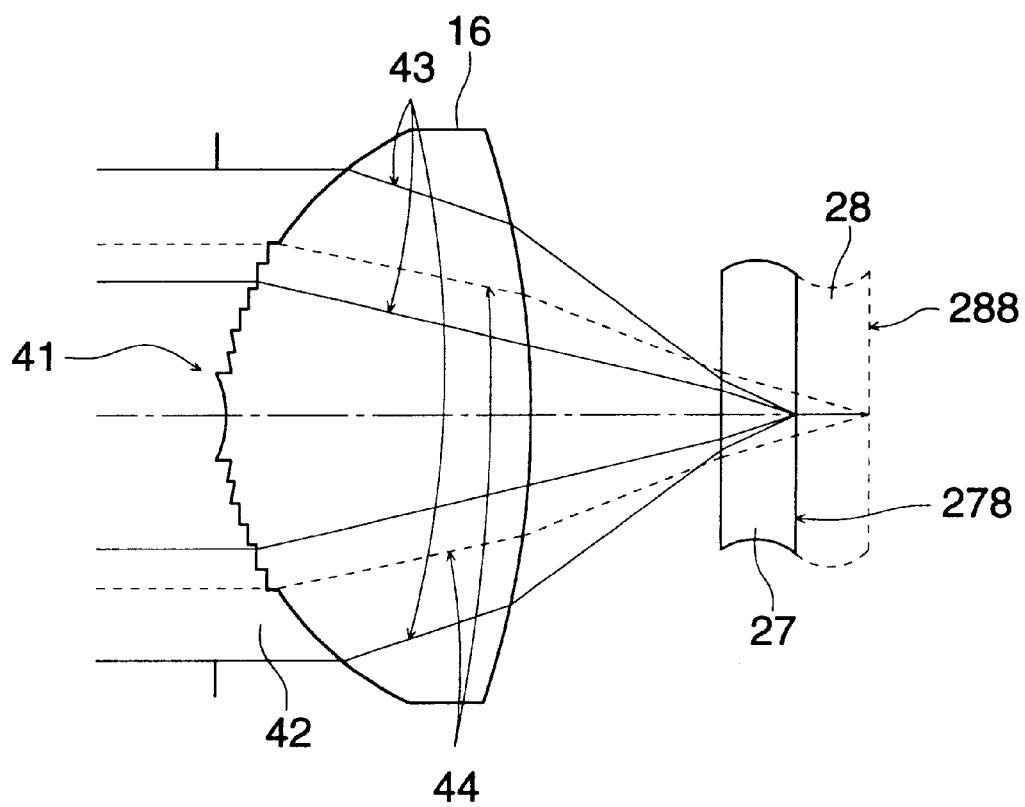
FIG. 59 is a diagram showing an example of an objective lens of the invention.

FIG. 59 shows a form of objective lens 16 wherein a hologram which is an example of the so-called optical means in the invention is formed on the surface at the light source side on the objective lens 16 shown in each of FIGS. 56(a) and 56(b). FIG. 59 also shows how a light flux entering the objective lens 16 is divided into transmitted light 43 transmitted through hologram 41 and diffracted light 44, and is converged on the recording surface 278 of the optical information recording medium having the 0.6 mm-thick transparent substrate 27 (indicated with solid lines), and is converged on the recording surface 288 of the optical information recording medium having the 1.2 mm-thick transparent substrate 28 (indicated with solid lines).

Since the converged points for two types of convergences are separated in the direction of an optical axis as stated above, when reproducing is made under the convergence by an objective lens corresponding to one type of transparent substrate thickness, light in the convergence corresponding to the other type of transparent substrate thickness is not focused on the recording surface, thus, it is possible to make an influence on reproduction signals small.

In the case of this example, a hologram is not formed in the vicinity of an end portion of a lens surface, but it is formed only on the lens surface portion where NA necessary for converging on recording surface 288 of the optical information recording medium having 1.2 mm-thick transparent substrate 28 can be obtained, so that light diffracted by the hologram may be converged on the recording surface 288 of the optical information recording medium having 1.2 mm-thick transparent substrate 28, while, a light flux transmitted through hologram 41 and a light flux transmitted through lens surface 42 where no hologram is formed may be converged on the recording surface 278 of the optical information recording medium having 0.6 mm-thick transparent substrate 27.

Owing to the arrangement mentioned above, it is possible to obtain NA that is necessary for recording and/or reproducing on recording surface 278 of the optical information recording medium having 0.6 mm-thick transparent substrate 27 which is required to obtain a beam spot coping with high density.

Incidentally, the hologram is formed on the surface at the light source side on the objective lens 16 in the example shown in FIG. 59. However, it is possible to form this hologram that is an example of the so-called optical means in the invention on the surface at the image side on the objective lens 16, or on any one surface of the first lens group 13, without being limited to the example mentioned above. It is further possible to provided the hologram on two or more portions including the objective lens 16 and any of the lens surfaces constituting the first lens group 13.

Next, the 22nd and 23rd examples will be explained as follows.

Figure 60:
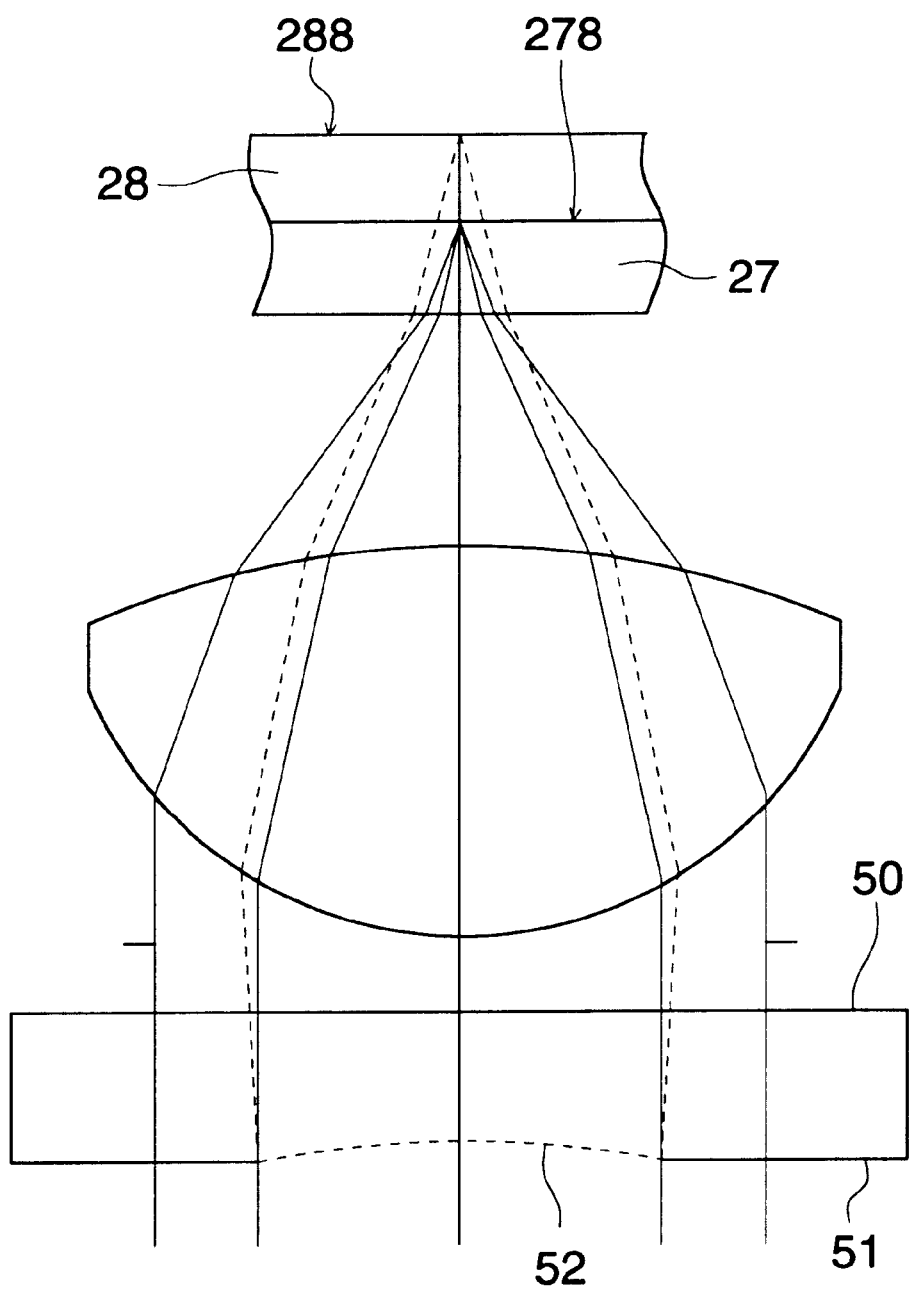
FIG. 60 is a diagram showing an example wherein an optical element in the invention is used.

FIG. 60 shows an example wherein an optical element having therein concentric, adjacent, plural and ring-shaped lens faces having their centers on an optical axis each having different refracting power which are an example of the so-called optical means in the invention is provided between the objective lens 16 and the first lens group 13 shown in each of FIGS. 56(a) and 56(b). FIG. 60 shows how a light flux transmitted through parallel plate portion 51 which is the first ring-shaped lens surface formed on the peripheral portion of the optical element 50 and entered the objective lens 16 is converged on the recording surface 278 of the optical information recording medium having 0.6 mm-thick transparent substrate 27 (indicated with solid lines), and it shows how a light flux transmitted through convex lens portion 52 which is the second ring-shaped lens surface formed on the central portion of the optical element 50 is converged on the recording surface 288 of the optical information recording medium having 1.2 mm-thick transparent substrate 28 (indicated with broken lines).

Since the converged points for two types of convergences are separated in the direction of an optical axis as stated above, when reproducing is made under the convergence by an objective lens corresponding to one type of transparent substrate thickness, light in the convergence corresponding to the other type of transparent substrate thickness is not focused on the recording surface, thus, it is possible to make an influence on reproduction signals small.

In this example again, in the same way as what is shown in the example of FIG. 58, the third ring-shaped lens surface corresponding to the 0.6 mm-thick transparent substrate (parallel plate in this case) is formed to be adjacent to the inside of the ring-shaped lens surface corresponding to the 1.2 mm-thick transparent substrate adjoining the inside of the ring-shaped lens surface located at the outermost circumference (parallel plate in this case), the fourth ring-shaped lens surface corresponding to the 1.2 mm-thick transparent substrate is formed to be adjacent to the inside of the third ring-shaped lens surface, and the fifth ring-shaped lens surface having refracting power corresponding to the 0.6 mm-thick transparent substrate is formed to be adjacent to the inside of the fourth ring-shaped lens surface, all for minimizing an influence of a side lobe. Due to aforesaid arrangement, it is possible to reduce the area of the second ring-shaped lens surface from which unnecessary light emerges in the course of coping with the substrate thickness of 0.6 mm, and to reduce the side lobe. By repeating the foregoing further, namely by forming, alternately from the outermost circumference, a plurality of ring-shaped lens surfaces each having different refracting power to be provided on the lens surface, it is possible to obtain two light spots suitable for conducting recording and reproducing for an optical information recording medium having different substrate thicknesses.

It is preferable to make the number of ring-shaped lens surfaces to be two to ten, and the number of three to six is more preferable.

When providing a plurality of ring-shaped lens surfaces corresponding to the same transparent substrate, it is preferable to make the lens thickness on an optical axis the same when extending each ring-shaped lens surface in accordance with an expression (for example, indicating each ring-shaped lens surface as an expression of aspherical surface of the same type) representing each ring-shaped lens surface.

A hologram element representing an example of the so-called optical means in the invention can be structured in a way wherein optical element 50 in FIG. 60 is structured with a parallel plate and convex lens portion 52 at the light source side or image side is replaced with a hologram. In this case, an arrangement is made so that light diffracted by the hologram is converged on the recording surface 288 of the optical information recording medium having the 1.2 mm-thick transparent substrate, and a light flux transmitted through hologram 41 and a light flux transmitted through lens surface 42 where no hologram is formed may be converged on the recording surface 278 of the optical information recording medium having 0.6 mm-thick transparent substrate 27.

In this case again, since the converged points for two types of convergences are separated in the direction of an optical axis as stated above, when reproducing is made under the convergence by an objective lens corresponding to one type of transparent substrate thickness, light in the convergence corresponding to the other type of transparent substrate thickness is not focused on the recording surface, thus, it is possible to make an influence on reproduction signals small.

Next, the 24th example will be explained as follows.

Figure 61:
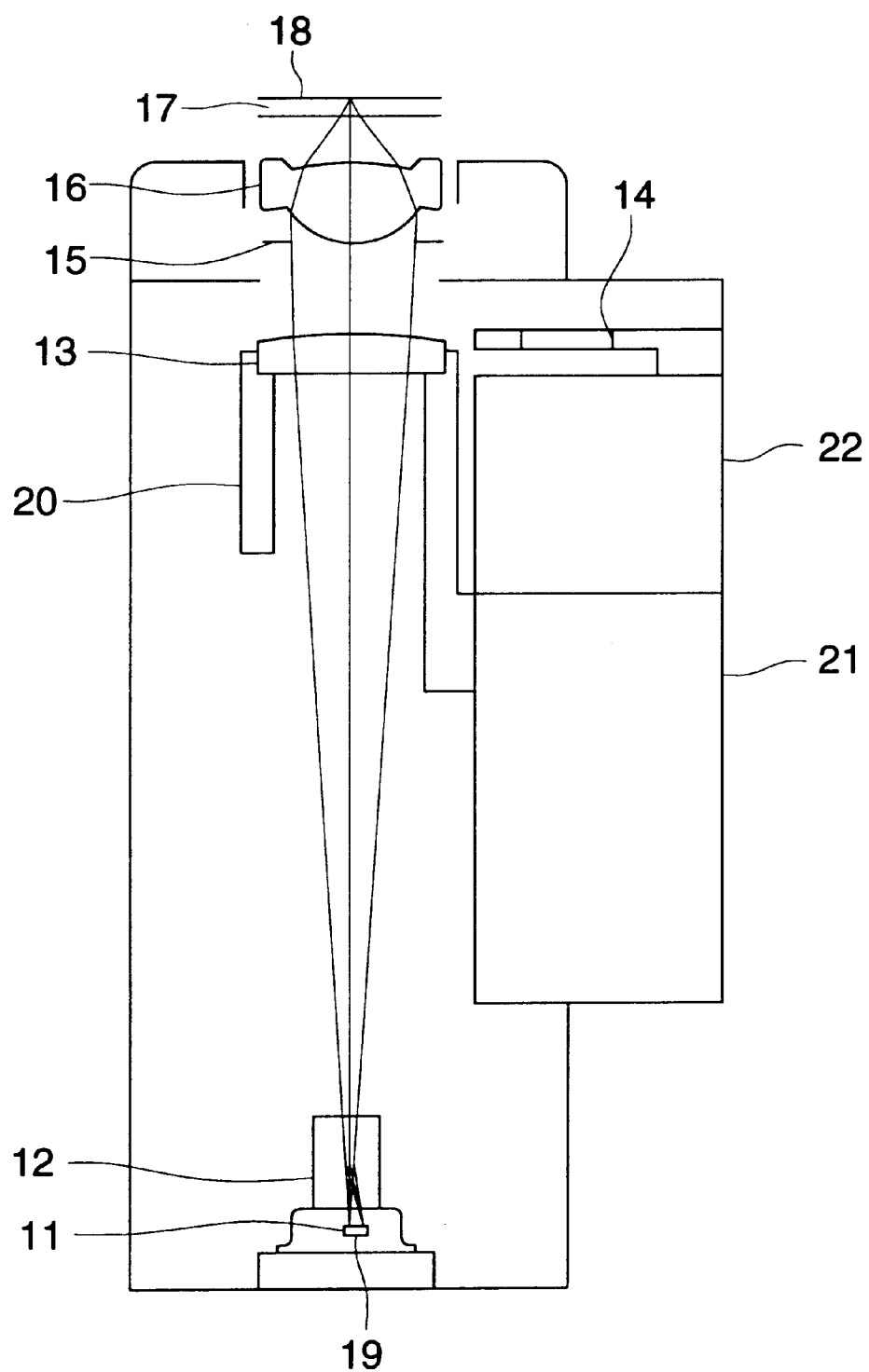
FIG. 61 is an illustration of a pickup device in the invention for optical information.
Figure 62:
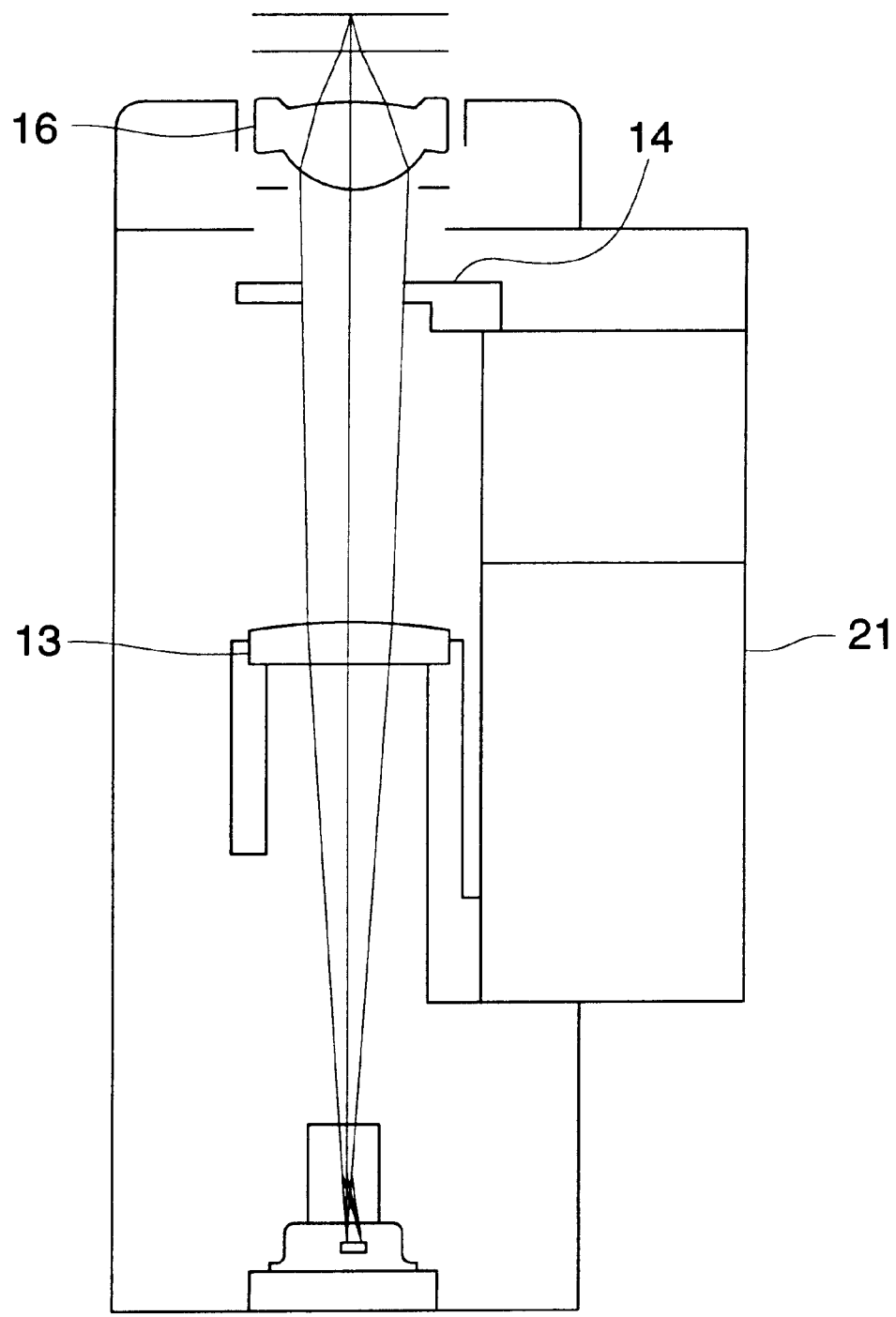
FIG. 62 is an illustration of a pickup device in the invention for optical information.
Figure 63:
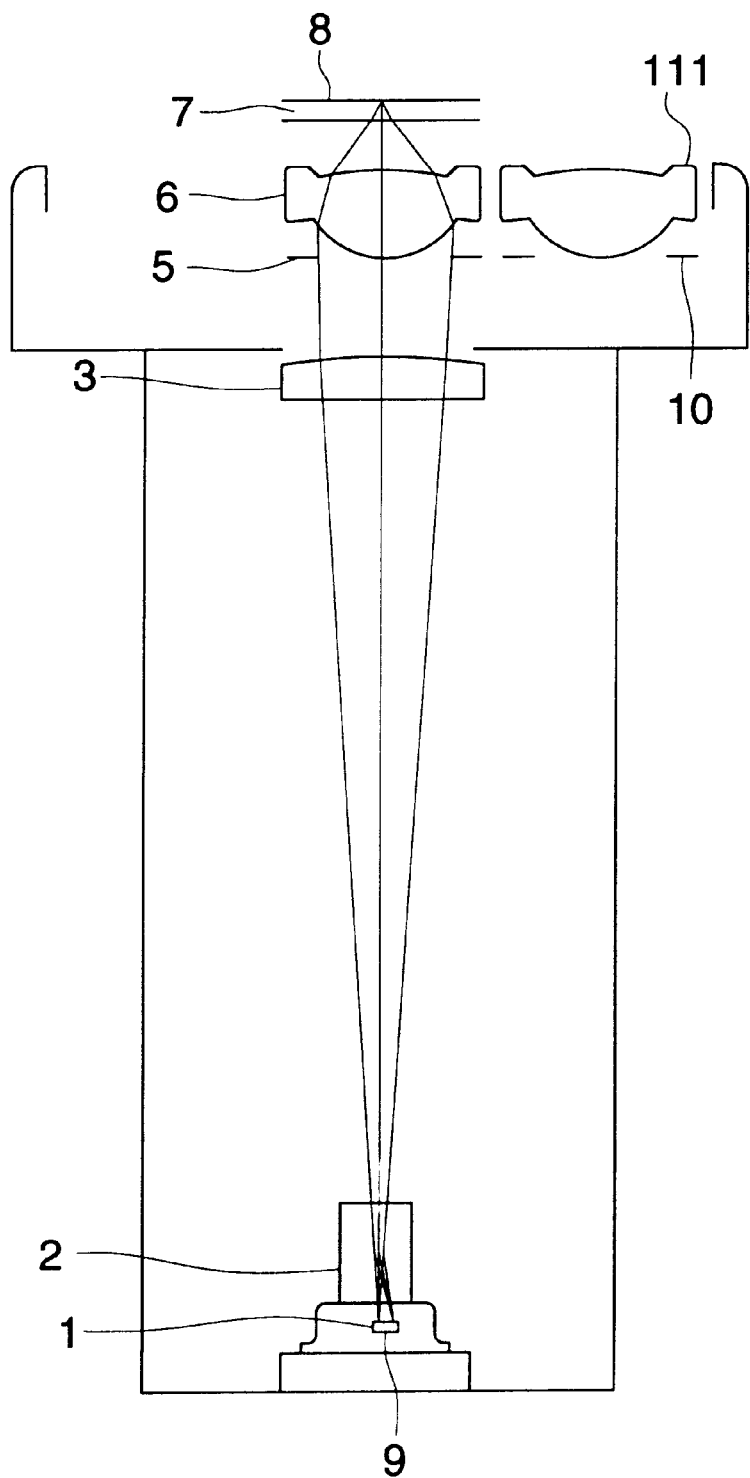
FIG. 63 is an illustration of a conventional example.
Figure 64:
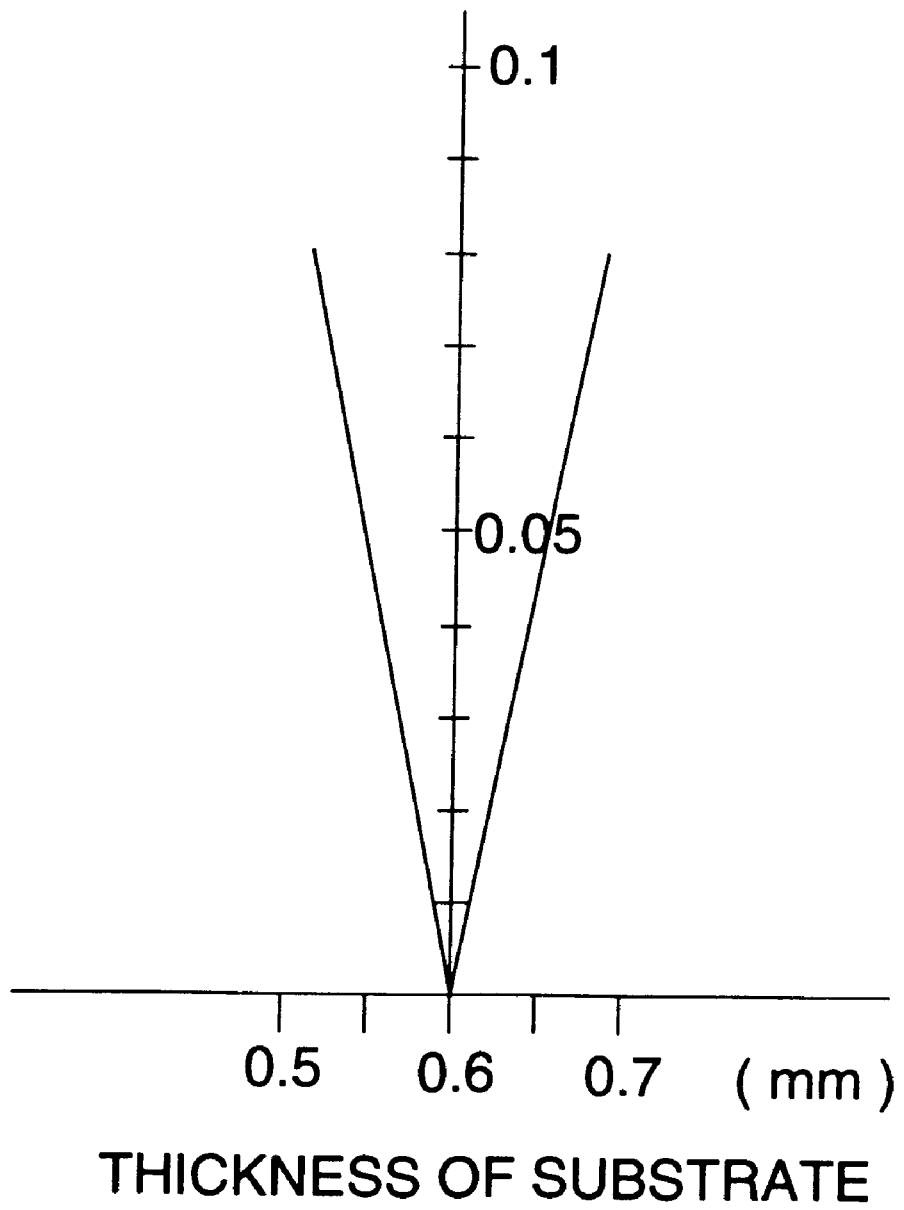
FIG. 64 is a diagram showing the change in wavefront aberration of an objective lens.

Each of FIGS. 61 and 62 shows the structure of a pickup device for optical information which switches between the convergence on the recording surface 278 of the optical information recording medium having 0.6 mm-thick transparent substrate 27 (FIG. 61) and the convergence on the recording surface 288 of the optical information recording medium having 1.2 mm-thick transparent substrate 28 (FIG. 62), by moving the first lens group 13 in the optical axis direction, as shown in FIGS. 56(a) and 56(b).

In FIG. 61, the numeral 11 represents a light source such as a semi-conductor laser or the like, 12 represents a beam splitter, 13 represents the first lens group, 14 represents a second aperture stop, 15 represents a first aperture stop, 16 represents an objective lens, 17 represents a 0.6 mm-thick transparent substrate, 18 represents an information recording surface of an optical information recording medium having the 0.6 mm-thick transparent substrate, 19 represents an optical detector, 20 represents a frame holding the first lens group 13, 21 represents a lens moving means for moving the frame 20 in the optical axis direction, and 22 represents a stopping means for inserting the second aperture stop 14 into an optical path.

A light flux emitted from the light source 11 such as a semi-conductor laser or the like passes through the beam splitter 12 and then enters the first lens group 13 to be converted into a converged light flux, and then is formed to a prescribed light flux and enters objective lens 16. The objective lens 16 forms, when the converged light flux enters it, a light spot which is almost aplanatic on the information recording surface 18 through transparent substrate 17 having a prescribed thickness.

The light flux modulated by information bit and reflected on the information recording surface 18 returns, through the objective lens 16 and the first lens group 13, to the beam splitter 12 where it is separated from an optical path of the laser light source 11 and enters the optical detector 19. The optical detector 19 is a multi-divided PIN photodiode which outputs from its element an electric current proportional to temperature of an incident light flux. This electric current is sent to an unillustrated detecting circuit where a 2-dimensional actuator composed of a magnetic circuit and a coil controls the objective lens 16 based on information signals, focus error signals and track error signals so that the position of the light spot may be brought into line with an information track.

FIG. 62 is a diagram wherein the first lens group 13 is moved to the position where recording and/or reproducing of the 1.2 mm-thick transparent substrate separated by lens moving means 21 from the objective lens 16 is conducted, and the second aperture stop 14 is inserted into the optical path by a stopping means.

When an arrangement is made so that the first lens group can be moved in the optical axis direction as in the example mentioned above, recording and/or reproducing for all optical information recording media having a transparent substrate ranging from 0.6 mm to 1.2 mm in terms of thickness can be conducted.

In the example shown in FIG. 62, a light flux emerging from the first lens group 13 is made to be converged light.

In the case of an optical information medium having a 1.2 mm-thick transparent substrate, however, when it is possible to reproduce information by making diverged light to enter the objective lens 16, diverged light also can enter the objective lens 16. However, converged light is naturally desirable.

Owing to the structures mentioned above, it is possible to obtain a simple and compact optical system for recording and reproducing for an optical information medium wherein a single pickup device makes it possible to record and reproduce an optical disks having different substrate thicknesses, mutual interchangeability is available, and a change in wavefront aberration caused by a temperature change can be held down to a level at which a tolerance of the lens can be ensured even in the case of using a resin-made objective lens under the great NA, a pickup device for an optical information medium, an objective lens for recording and reproducing for optical information used for the optical system for recording and reproducing for optical information and the pickup device for optical information, and a converging lens used for an optical system for recording and reproducing for optical information.

What is claimed is:

1. An optical system for recording or reproducing of information to or from an optical information recording medium, comprising:

(a) a light source;
    (b) a coupling lens for converting a diverging light emergent from the light source to a converging light; and
    (c) an objective lens for further converging the converted converging light and for focusing on an information recording surface of the optical information recording medium,
    wherein a lateral magnification of the objective lens in which a wavefront aberration within a Marechal criterion is minimum, a distance between a surface on an image side of the coupling lens and a surface on a light source side of the objective lens, and a focal length of the objective lens satisfy the following conditional expression, $0 < M < 1$, and $0.1 \leq D_{co}/F \leq 5.0$, where M represents the lateral magnification of the objective lens, $D_{co}$ represents the distance between the surface and the image side of the coupling lens and the surface on the light source side of the objective lens, and F represents the focal length of the objective lens.

2. The optical system of claim 1 further satisfying the following expression, $1.0 \leq D_{co}/F \leq 5.0$.

3. The optical system of claim 2 further satisfying the following expression, $1.0 \leq D_{co}/F \leq 3.0$.

4. An optical system for recording or reproducing of information to or from an optical information recording medium, comprising (a) a light source;
    (b) a coupling lens for converting a diverging light emergent from the light source to a converging light; and
    (c) an objective lens for further converging the converted converging light and for focusing on an information recording surface of the optical information recording medium,
    wherein a lateral magnification of the objective lens in which a wavefront aberration within a Marechal criterion is minimum, and a numeral aperture satisfy the following conditional expressions, $0 < m < 1$ $NA \cdot (1 \cdot M) \leq 0.65$, and $0.48 \leq NA$, where M represents the lateral magnification of the objective lens, and NA represents the numerical aperture on an image side of the optical system.

5. The optical system of claim 4 further satisfying the following expression, $0.05 \leq M \leq 0.23$.

6. An optical system for recording or reproducing of information to or from an optical information recording medium, comprising:

(a) a light source;
    (b) a coupling lens for converting a diverging light emergent from the light source to a converging light; and
    (c) an objective lens for further converging the converted converging light and for focusing on an information recording surface of the optical information recording medium,
    wherein a lateral magnification of the objective lens in which a wavefront aberration within a Marechal criterion is minimum, a lateral magnification of an entire optical system, and a numerical aperture satisfy the following conditional expressions, $0 < M < 1$, and $0.06 \leq |M_c| \cdot NA \leq 0.21$, where M represents the lateral magnification of the objective lens, $M_c$ represents a lateral magnification of an entire optical system, and NA represents a numerical aperture on an image side of the optical system.

7. The optical system of claim 6 further satisfying the following expression, $0.06 \leq |M_c| \cdot NA \leq 0.12$.

8. The optical system of claim 6 further satisfying the following expression, $0.12 \leq |M_c| \cdot NA \leq 0.21$.

9. An objective lens for use in an optical system for recording or reproducing an information to or from an optical information recording medium in which an incident converging light is light-formed on an information recording surface of the optical recording medium, the objective lens comprising:

(a) a first surface; and
    (b) a second surface provided opposite the first surface, wherein when a wavefront aberration within a Marechal criterion is minimum, a lateral magnification M, a numerical aperture NA on an image side of the objective lens, a refractive index n of material of the objective lens, a vertex radius $r_2$ of curvature of a surface on an image side of the objective lens, and a focal length F of the objective lens satisfy the following conditional expressions respectively, the objective lens is a single lens in which a surface on a light source side is aspherical, $0 < M < 1$, $0.3 \leq NA$, and $-0.30 \leq F \cdot (n-1)/r_2 \leq 0.7$.

10. An objective lens for use in an optical system for recording or reproducing an information to or from an optical information recording medium in which an incident converging light is light-formed on an information recording surface of the optical recording medium, the objective lens comprising (a) a first surface; and (b) a second surface provided opposite the first surface, wherein when a wavefront aberration within a Marechal criterion is minimum, a lateral magnification M, a numerical aperture NA on an image side of the objective lens, a refractive index n of material of the objective lens, a difference $x_2$ between an outermost periphery of effective diameter of on-axis ray of a surface on an image side of the objective lens and a vertex of the surface in an optical axis direction, and a direction in which as a point moves away from the optical axis, the point approaches toward an object side, is positive, and a focal length F of the objective lens satisfy the following conditional expressions respectively, the objective lens is a single lens in which a surface on a light source side is aspherical, $0<M<1$, $0.3 \leq NA$, and $-0.045 \leq x_2 \cdot (n-1)/\{F \cdot (NA)^2\} \leq 0.1$.

11. An objective lens for use in an optical system for recording or reproducing an information to or from an optical information recording medium in which an incident converging light is light-formed on an information recording surface of the optical recording medium, the objective lens comprising:

(a) a first surface; and (b) a second surface provided opposite the first surface, wherein when a wavefront aberration within a Marechal criterion is minimum, a lateral magnification M, a numerical aperture NA on an image side of the objective lens, a refractive index n of material of the objective lens, a difference $\Delta_2$ between an aspherical surface of an outermost periphery of effective diameter of on-axis ray of a surface on an image side of the objective lens, and a reference spherical surface having a vertex radius of curvature of the aspherical surface in an optical axis direction, and a direction in which as a point moves away from the optical axis, the point approaches toward an object side, is positive, and a focal length F of the objective lens satisfy the following conditional expressions respectively, the objective lens is a single lens in which a surface on a light source side is aspherical, $0<M<1$, $0.3 \leq NA$, and $-0.005 \leq \Delta_2 \cdot (n-1)^3/\{F \cdot (NA)^4\} \leq 0.020$.

* * * * *